(12) United States Patent
Kuwahara et al.

(10) Patent No.: US 7,039,605 B2
(45) Date of Patent: May 2, 2006

(54) SETTLEMENT INTERMEDIATION PROCESSING APPARATUS, STORAGE MEDIUM IN WHICH A PROGRAM FOR SETTLEMENT INTERMEDIATION PROCESSING IS STORED, COMPUTER PROGRAM FOR SETTLEMENT INTERMEDIATION, ONLINE SHOP APPARATUS, AND ON-LINE SHOPPING METHOD AND SYSTEM

(75) Inventors: Toru Kuwahara, Kanagawa (JP); Motoshi Asano, Tokyo (JP); Hidehiko Kakinuma, Tokyo (JP); Keiji Shiotani, Chiba (JP); Yoshitsugu Hasumi, Saitama (JP)

(73) Assignee: Sony Corporation, Tokyo (JP)

( * ) Notice: Subject to any disclaimer, the term of this patent is extended or adjusted under 35 U.S.C. 154(b) by 756 days.

(21) Appl. No.: 09/793,182

(22) Filed: Feb. 26, 2001

(65) Prior Publication Data
US 2002/0016745 A1    Feb. 7, 2002

(30) Foreign Application Priority Data
Feb. 25, 2000   (JP)   ............................ P2000-054463
Jan. 16, 2001   (JP)   ............................ P2001-008098

(51) Int. Cl.
*G06F 17/60*   (2006.01)
(52) U.S. Cl. ............................ 705/26; 705/40; 705/75; 705/77; 705/79
(58) Field of Classification Search ................... 705/26
See application file for complete search history.

(56) References Cited
U.S. PATENT DOCUMENTS

| 5,899,980 | A | 5/1999 | Wilf et al. ..................... 705/26 |
| 6,144,948 | A * | 11/2000 | Walker et al. ................ 705/38 |
| 6,615,166 | B1 * | 9/2003 | Guheen et al. ............... 703/27 |
| 6,629,135 | B1 * | 9/2003 | Ross et al. ................... 709/218 |

* cited by examiner

*Primary Examiner*—Wynn W. Coggins
*Assistant Examiner*—Jaime E. Zurita
(74) *Attorney, Agent, or Firm*—Bell, Boyd & Lloyd LLC

(57) ABSTRACT

Using a preset, temporary ID, a user accesses an on-line shop where he is not registered. When the user buys a commodity, the on-line shop sends order data to a money gate. In response to a request from the money gate, a mall-operating company where the user is registered sends the money gate information necessary for settlement such as a credit number. The money gate generates final order data by combining the order data and the information necessary for settlement. Settlement processing with a card company is performed by using the final order data.

20 Claims, 34 Drawing Sheets

FIG.2

| MONEY GATE ID | | REGISTERED CONTENTS OF USER MASTER | | |
|---|---|---|---|---|
| | | MALL ADB | MALL BDB | MALL CDB |
| FOR MALL-A MEMBERS | NAME | | MALL-A MEMBER | MALL-A MEMBER |
| | ID | | 9999000000010 | mg0000010 |
| | PASSWORD | | - | 12345678 |
| | CR.NO | | 111100000001 | 111100000001 |
| | REMARKS | | | |
| FOR MALL-B MEMBERS | NAME | MALL-B MEMBER | | MALL-B MEMBER |
| | ID | mlb@mg2 | | mg0000020 |
| | PASSWORD | 12345678 | | 12345678 |
| | CR.NO | 111100000002 | | 111100000002 |
| | REMARKS | SHOPPING MEMBER | | |
| FOR MALL-C MEMBERS | NAME | MALL-C MEMBER | MALL-C MEMBER | |
| | ID | mlc@mg2 | 9999000000030 | |
| | PASSWORD | 12345678 | - | |
| | CR.NO | 111100000003 | 111100000003 | |
| | REMARKS | SHOPPING MEMBER | | |

FIG.3

MALL-A MEMBER

MALL-A ID  [     ]
PASSWORD   [     ]

OK   CANCEL

DOCUMENT COMPLETED

|  |  | FOR MALL-A MEMBERS |
|---|---|---|
| NAME |  | MALL-A MEMBER |
| CR.NO |  | 111100000001 |
| PASSWORD |  | 123456789 |
| ID | MALL BID | 9999000000010 |
|  | MALL CID | mg0000010 |
|  | ⋮ | ⋮ |
| URL | MALL B | www.##.ne.jp/mg |
|  | MALL C | www.##.ne.jp/mg |
|  | ⋮ | ⋮ |

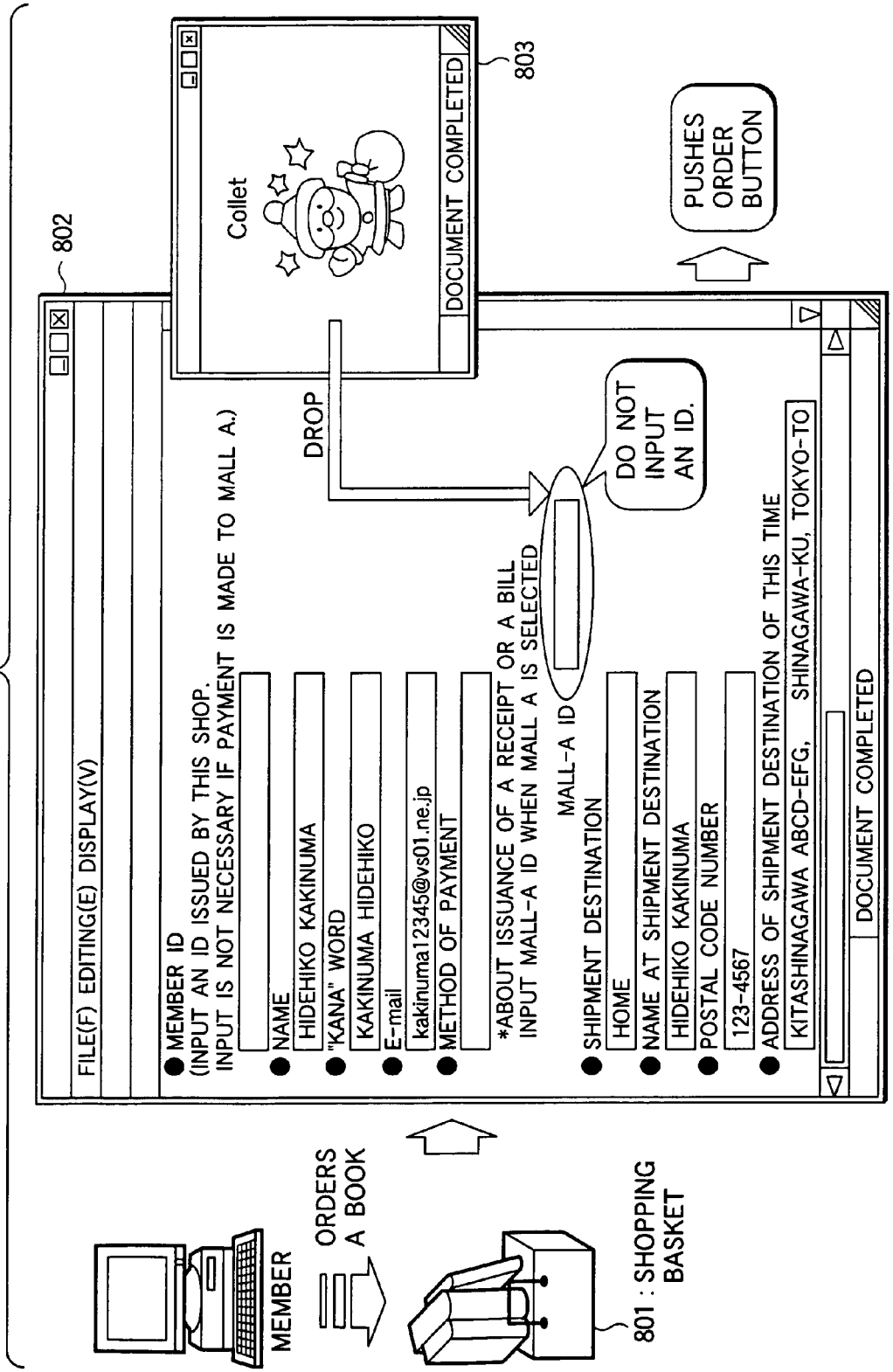

DATE : FRI,20 AUG1999 15:55:34 +0900
FROM : sales@ss2.so-net.ne.jp
TO : kakinuma@vs01.vaio.ne.jp
SUBJECT : ORDER CONFIRMATION AND SETTLEMENT REQUEST

DEAR MALL-B MEMBER :

THANK YOU FOR YOUR ORDER THAT IS SPECIFIED BELOW

◆CONTENTS OF ORDER◆

SHOP NAME : ○○ BOOK CENTER
REPRESENTATIVE COMMODITY NAME : EASY GUIDE TO NET SETTLEMENT
METHOD OF PAYMENT : CREDIT

PLEASE MAKE SETTLEMENT AFTER CONFIRMING THE CONTENTS OF THE
ORDER BY MAKING ACCESS TO THE FOLLOWING URL

==================================
ACCEPTANCE NO. : 123456789
URL : https://####.ne.jp/
==================================

FIG.16

| MEMBER SHOP | ○○ BOOK CENTER | | | | |
|---|---|---|---|---|---|
| ACCEPTANCE NO. | 123456789 | SEARCH | RESET | | |
| ACCEPTANCE DATE | 19990820 | | | | |
| COMMODITY NAME | | UNIT PRICE | QUANTITY | SUBTOTAL | REMARKS |
| EASY GUIDE TO NET SETTLEMENT | | 2000 | 1 | 2000 | |
| | | | | | |
| DISCOUNT | | CONSUMPTION TAX : 100 | | CARRIAGE : 500 | TOTAL : 2500 |
| SHIPMENT DESTINATION | 〒 123-4567 ABCD-XYZ, SHINAGAWA-KU, TOKYO-TO | | | | |
| TELEPHONE NO. | 03-1234-5678 | | | | |
| NAME | HIDEHIKO KAKINUMA | | | | |
| MESSAGE | | | | | |
| METHOD OF PAYMENT | CREDIT CARD | | | | |

FILE(F) EDITING(E) DISPLAY(V)

[BUY] [DO NOT BUY]

DOCUMENT COMPLETED

FIG.23

FILE(F) EDITING(E) DISPLAY(V)

WRIGHTING OF ORDER SHEET

AFTER FILLING IN THE FOLLOWING SPACES, PUSH "CONFIRM GENERATED ORDER SHEET" AND PROCEED TO THE NEXT STEP.

LIST OF COMMODITIES FOR ORDERING

| SHOP NAME | COMMODITY CODE | COMMODITY NAME | QUANTITY | UNIT PRICE |
|---|---|---|---|---|
| FLOUR SHOP A | 555-33 | COMMODITY NO.555 | 1 | ¥5,000 |

SUBTOTAL

TOTAL AMOUNT OF COMMODITIES
(EXCLUDING CARRIAGE AND TAX)

YOUR (SENDER'S) PLACE OF CONTACT

POSTAL CODE NUMBER : 〒 123 - 4567

ADDRESS : TOKYO-TO KITASHINAGAWA ABC-XYZ, SHINAGAWA-KU

NAME : KAKINUMA HIDEHIKO

DOCUMENT COMPLETED

816

817

FILE(F) EDITING(E) DISPLAY(V)

ORDERING METHOD

⊙ MALL-C ID SETTLEMENT

THIS IS ON-LINE CREDIT CARD PAYMENT USING A MALL-C ID. TO USE THIS METHOD, FIRST HAVE YOUR MALL-C ID REGISTERED HERE. IT HAS BECOME POSSIBLE FOR YOU TO USE THIS METHOD UPON ON-SCREEN REGISTRATION.

○ MAIL ORDERING

PAYMENT IS NOT MADE ONLINE AND ONLY MAIL TRANSMISSION FOR REQUESTING OF COMMODITIES IS PERFORMED. (BE CAREFUL THAT THE COMMODITIES ARE NOT OUT OF STOCK.) EACH STORE WILL CONTACT YOU AFTER RECEPTION OF A REQUEST.

○ SHOPPING SWITCH

CHECK THIS ITEM IF YOU USE A COLLET.

| RETURN TO BASKET | CONFIRM GENERATED ORDER SHEET |

DOCUMENT COMPLETED

FIG.26

| | | | | | | |
|---|---|---|---|---|---|---|
| FILE(F) EDITING(E) DISPLAY(V) | | | | | | |

MALL C            ORDER RECEIVED

WE HAVE RECEIVED THE FOLLOWING ORDER. RECEIPTS OF THE RESPECTIVE SHOPS ARE SHOWN. CONFIRM THEIR CONTENTS

RECEIPTS

| SHOP NAME | COMMODITY CODE | COMMODITY NAME | QUANTITY | UNIT PRICE | TAX | AMOUNT |
|---|---|---|---|---|---|---|
| FLOUR SHOP A | 555-33 | COMMODITY NO.555 | 1 | ¥5,000 | ¥250 | ¥5,250 |

CARRIAGE ¥1,000     SUBTOTAL ¥5,000

DOCUMENT COMPLETED

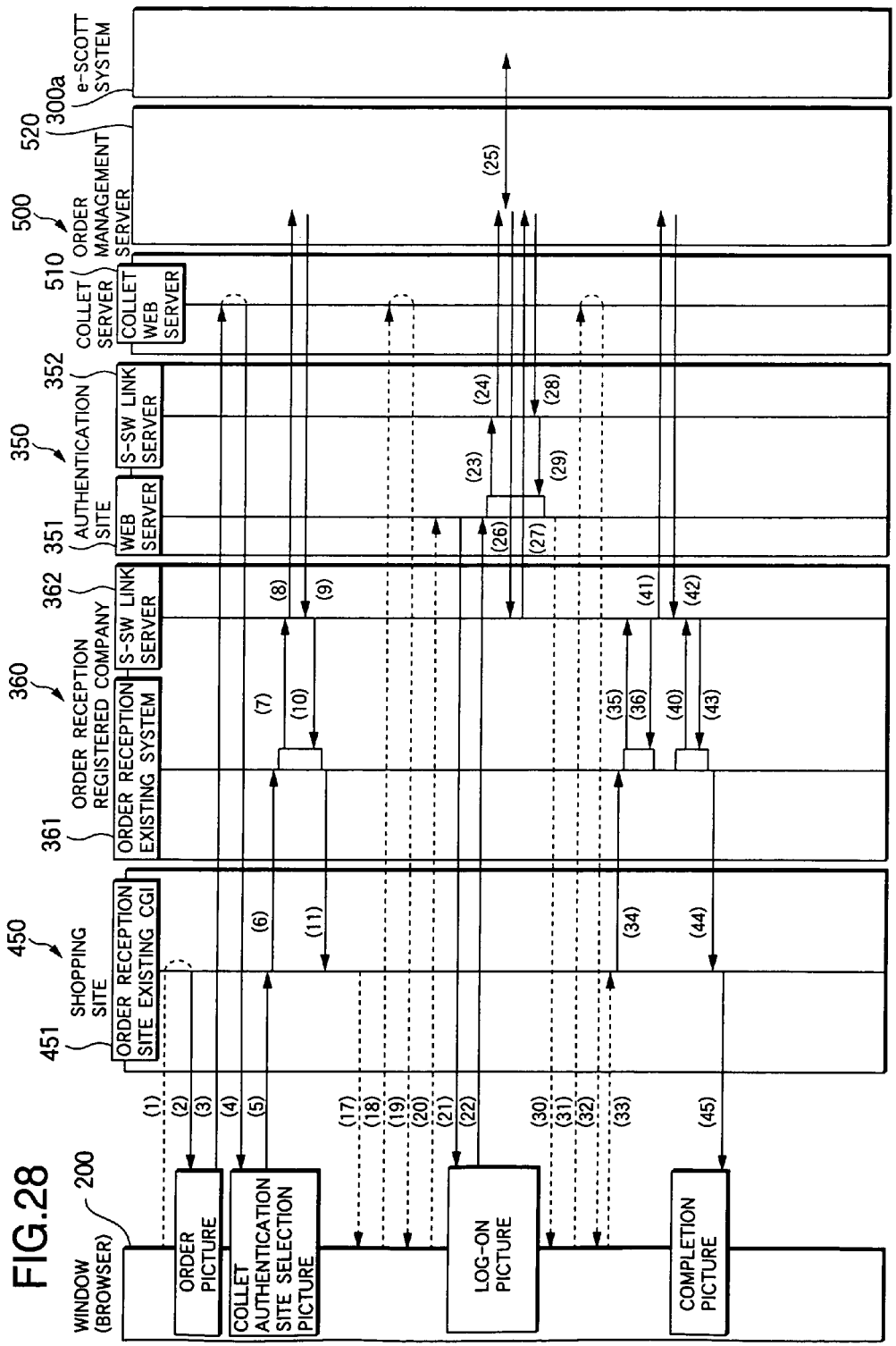

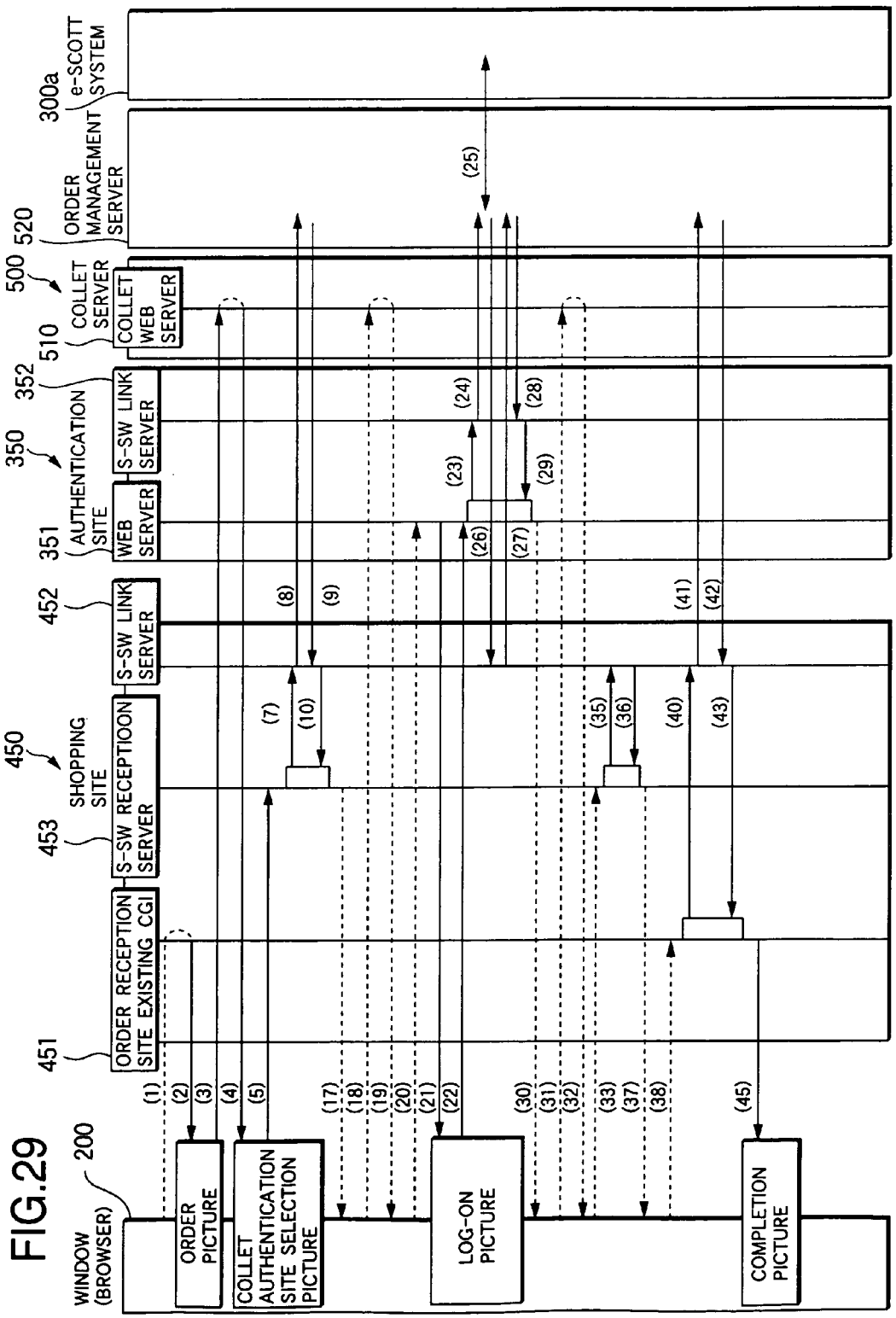

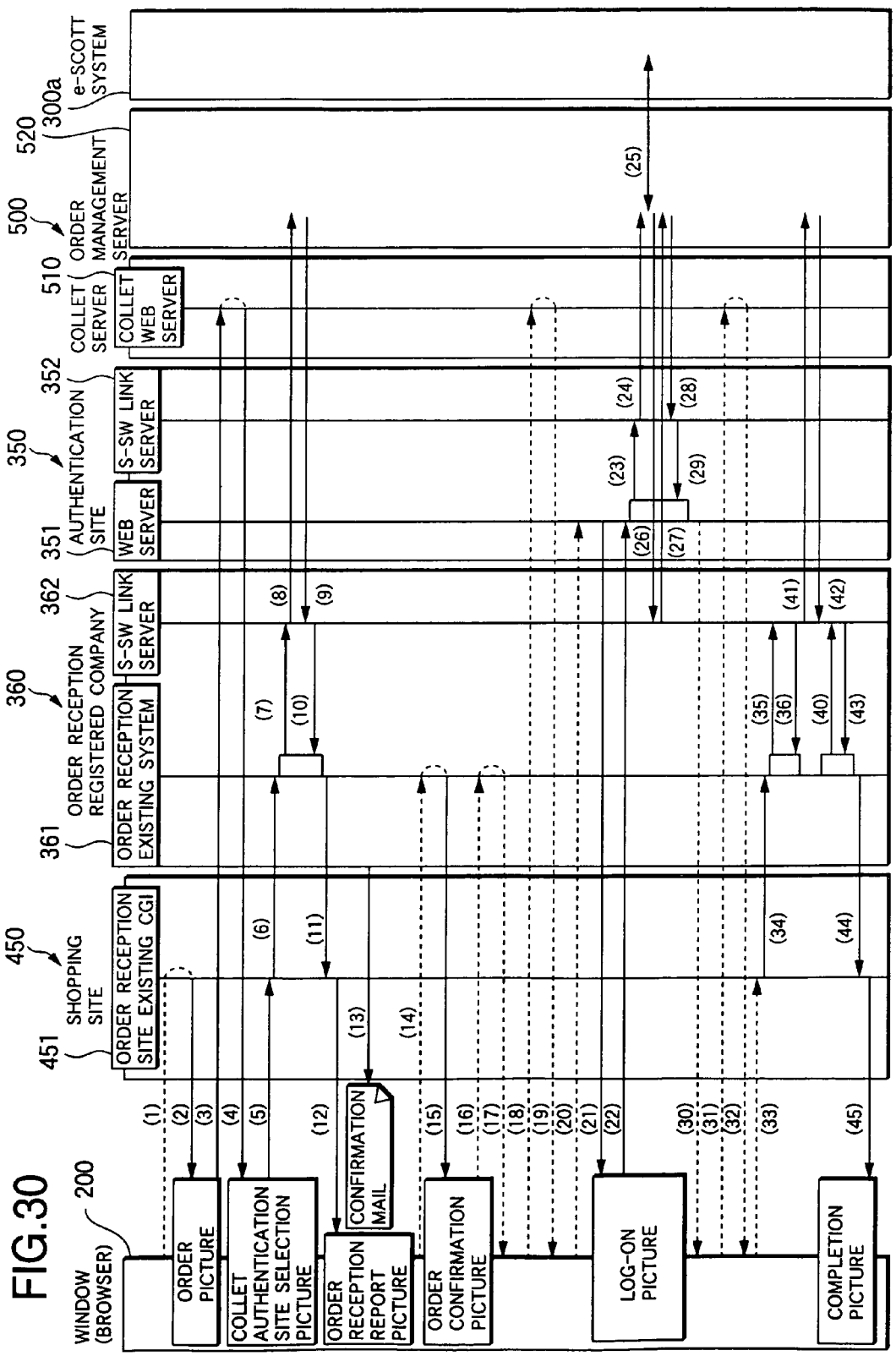

FIG. 31

| NO | I/F NAME | ITEM NAME | KEY NAME (ONLY IN THE CASE OF http/https) | REMARKS |
|---|---|---|---|---|
| 1 | ORDER SHEET REQUEST | | | SHOPPING SITE IS ARBITRARY |
| 2 | ORDER SHEET PICTURE | | | SHOPPING SITE IS ARBITRARY |
| 3 | AUTHENTICATION SITE INFORMATION REQUEST | ORDER RECEPTION REGISTERED COMPANY CUSTOMER CODE | shop_site_code | SHOPPING SITE IS ARBITRARY |
| | | TRANSACTION IDENTIFICATION NO. (ORDER INFORMATION) | tm_no | |
| 4 | AUTHENTICATION SITE SELECTION PICTURE | ORDER RECEPTION REGISTERED COMPANY CUSTOMER CODE | shop_site_code | SHOPPING SITE IS ARBITRARY |
| | | TRANSACTION IDENTIFICATION NO. (ORDER INFORMATION) (AUTHENTICATION SITE LIST) | tm_no | AUTHENTICATION SITE LIST SUITABLE FOR ORDER RECEPTION SITE |
| 5 | ORDER REQUEST | ORDER RECEPTION REGISTERED COMPANY CUSTOMER CODE | shop_site_code | SHOPPING SITE IS ARBITRARY |
| | | TRANSACTION IDENTIFICATION NO. (ORDER INFORMATION) | | |
| | | AUTHENTICATION REGISTERED COMPANY CUSTOMER CODE | | ORDER RECEPTION SITE IS ARBITRARY |
| 6 | ORDER RECEPTION REQUEST (→ REGISTERED COMPANY) | MG-ID | | |
| 7 | ORDER REGISTRATION REQUEST (API) | ORDER RECEPTION REGISTERED COMPANY CUSTOMER CODE | | |
| | | TRANSACTION IDENTIFICATION NO. | | |
| | | USER ID | | |
| | | PASSWORD | | |
| | | ORDER DATE | | |
| | | ORDER TIME | | |
| | | USED SHOP NAME | | |
| | | USED SHOP URL | | |
| | | AMOUNT USED | | |
| | | PAYMENT CATEGORY | | |
| | | COMMODITY NAME | | |
| | | COMMODITY CATEGORY | | |
| 8 | ORDER REGISTRATION REQUEST | MG-ID | | |
| | | ORDER RECEPTION REGISTERED COMPANY CUSTOMER CODE | | |
| | | TRANSACTION IDENTIFICATION NO. | | |
| | | USER ID | | |
| | | PASSWORD | | |
| | | ORDER DATE | | |
| | | ORDER TIME | | |
| | | USED SHOP NAME | | |
| | | USED SHOP URL | | |
| | | AMOUNT USED | | |
| | | PAYMENT CATEGORY | | |
| | | COMMODITY NAME | | |
| | | COMMODITY CATEGORY | | |

FIG. 32

| NO. | I/F NAME | ITEM NAME | KEY NAME (ONLY IN THE CASE OF http/https) | REMARKS |
|---|---|---|---|---|
| 9 | ORDER REGISTRATION RESPONSE | RESULT CODE | | |
| 10 | ORDER REGISTRATION RESPONSE (API) | RESULT CODE | | |
| 11 | ORDER RECEPTION RESPONSE (→REGISTERED COMPANY) | | | ORDER RECEPTION SITE IS ARBITRARY |
| 12 | ORDER RECEPTION REPORT PICTURE | | | SHOPPING SITE IS ARBITRARY |
| 13 | CONFIRMATION MAIL | | | ORDER RECEPTION REGISTERED COMPANY IS ARBITRARY |
| 14 | ORDER CONFIRMATION SHEET REQUEST | | | ORDER RECEPTION REGISTERED COMPANY IS ARBITRARY |
| 15 | ORDER CONFIRMATION PICTURE | | | ORDER RECEPTION REGISTERED COMPANY IS ARBITRARY |
| 16 | ORDER CONFIRMATION REQUEST | | | ORDER RECEPTION REGISTERED COMPANY IS ARBITRARY |
| 17 | COLLET RE-DIRECTING REQUEST (ORDER RECEPTION) | MG-ID | mg_id | ID GENERATED BY COLLET SERVER ON A TRANSACTION BASIS |
| | | ORDER RECEPTION REGISTERED COMPANY CUSTOMER CODE | shop_site_code | |
| | | TRANSACTION IDENTIFICATION NO. | trn_no | |
| | | PROCESSING ID | next_flg | |
| | | MAILING ORDER FLAG | mail_flg | SHOPPING SITE IS ARBITRARY |
| | | AUTHENTICATION COMPANY CODE (COLLET URL) | | ORDER RECEPTION SITE IS ARBITRARY |
| 18 | COLLECT RE-DIRECTING (ORDER RECEPTION) | MG-ID | mg_id | |
| | | ORDER RECEPTION REGISTERED COMPANY CUSTOMER CODE | shop_site_code | |
| | | AUTHENTICATION COMPANY CODE | | |
| | | TRANSACTION IDENTIFICATION NO. | trn_no | |
| 19 | AUTHENTICATION SITE RE-DIRECTING REQUEST | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | (AUTHENTICATION REGISTERED COMPANY URL) | | |
| 20 | LOG-ON PICTURE REQUEST | MG-ID | mg_id | |
| | | ORDER RECEPTION REGISTERED COMPANY CUSTOMER CODE | shop_site_code | |
| | | TRANSACTION IDENTIFICATION NO. | trn_no | |
| 21 | LOG-ON PICTURE | | | AUTHENTICATION REGISTERED COMPANY IS ARBITRARY |
| 22 | LOG-ON REQUEST | | | AUTHENTICATION REGISTERED COMPANY IS ARBITRARY |
| 23 | AUTHENTICATION RESULT NOTICE (API) | MG-ID | | |
| | | ORDER RECEPTION REGISTERED COMPANY CUSTOMER CODE | | |
| | | TRANSACTION IDENTIFICATION NO. | | |
| | | CARD COMPANY CODE | | |
| | | CREDIT CARD NO. | | |
| | | CREDIT CARD EXPIRATION DATE | | |
| | | NAME | | |
| | | AUTHENTICATION RESULT | | |
| | | POSTAL CODE NO. | | |
| | | AUTHENTICATION RESULT REASON | | |
| | | AUTHENTICATION RESULT REASON | | |
| | | TELEPHONE NO. | | |
| | | DATE OF BIRTH | | |
| | | AUTHENTICATION USER ID | | |
| | | MEMBER STATE | | |

FIG.33

| NO. | I/F NAME | ITEM NAME | KEY NAME (ONLY IN THE CASE OF http/https) | REMARKS |
|---|---|---|---|---|
| 24 | AUTHENTICATION RESULT NOTICE | MG-ID | | |
| | | ORDER RECEPTION REGISTERED COMPANY CUSTOMER CODE | | |
| | | TRANSACTION IDENTIFICATION NO. | | |
| | | CARD COMPANY CODE | | |
| | | CREDIT CARD NO. | | |
| | | CREDIT CARD EXPIRATION DATE | | |
| | | NAME | | |
| | | AUTHENTICATION RESULT | | |
| | | POSTAL CODE NO. | | |
| | | AUTHENTICATION RESULT REASON | | |
| | | AUTHENTICATION REQUEST REASON | | |
| | | TELEPHONE NO. | | |
| | | DATE OF BIRTH | | |
| | | AUTHENTICATION USER ID | | |
| | | MEMBER STATE | | |
| 25 | AUTHORISATION (e-SCOTT) | *) REFER TO e-SCOTT CONNECTION SPECIFICATION | | |
| 26 | AUTHORISATION RESULT REPORT | MG-ID | | |
| | | ORDER RECEPTION REGISTERED COMPANY CUSTOMER CODE | | |
| | | TRANSACTION IDENTIFICATION NO. | | |
| | | AUTHORISATION RESULT | | |
| 27 | AUTHORISATION RESULT REPORT RESPONSE | RESULT CODE | | |
| 28 | AUTHORISATION RESULT NOTIFICATION RESPONSE | RESULT CODE | | |
| | | AUTHORISATION RESULT | | |
| 29 | AUTHORISATION RESULT NOTIFICATION RESPONSE (API) | RESULT CODE | | |
| | | AUTHORISATION RESULT | | |

FIG. 34

| NO. | I/F NAME | ITEM NAME | KEY NAME (ONLY IN THE CASE OF http/https) | REMARKS |
|---|---|---|---|---|
| 30 | COLLET RE-DIRECTING REQUEST (AUTHENTICATION) | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | PROCESSING ID | next_flg | |
| | | RESULT CODE | result_code | |
| | | (COLLET URL) | | |
| 31 | COLLET RE-DIRECTING (AUTHENTICATION) | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | PROCESSING ID | next_flg | |
| | | RESULT CODE | result_code | |
| 32 | ORDER RECEPTION SITE RE-DIRECTING REQUEST | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | RESULT CODE | result_code | |
| | | (ORDER INFORMATION) | | |
| | | (SHOPPING SITE URL) | | SHOPPING SITE IS ARBITRARY |
| 33 | ORDER RECEPTION SITE RE-DIRECTING | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | RESULT CODE | result_code | |
| | | (ORDER INFORMATION) | | SHOPPING SITE IS ARBITRARY |
| 34 | AUTHORIZATION REQUEST (→ REGISTERED COMPANY) | | | ORDER RECEPTION SITE IS ARBITRARY |
| 35 | AUTHORIZATION RESULT REQUEST (API) | MG-ID | | |
| | | ORDER RECEPTION REGISTERED COMPANY CUSTOMER CODE | | |
| | | TRANSACTION IDENTIFICATION NO. | | |

FIG. 35

| NO. | I/F NAME | ITEM NAME | KEY NAME (ONLY IN THE CASE OF http/https) | REMARKS |
|---|---|---|---|---|
| 36 | AUTHORIZATION RESULT RESPONSE (API) | RESULT CODE | | |
| | | AUTHORIZATION RESULT | | |
| 37 | EXISTING CGI RE-DIRECTING REQUEST | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | RESULT CODE | result_code | |
| | | (ORDER INFORMATION) | | SHOPPING SITE IS ARBITRARY |
| | | (EXISTING CGI URL) | | |
| 38 | EXISTING CGI RE-DIRECTING | MG-ID | mg_id | |
| | | ORDER RECEPTION REGISTERED COMPANY CUSTOMER CODE | shop_site_code | |
| | | TRANSACTION IDENTIFICATION NO. | trn_no | |
| | | RESULT CODE | result_code | |
| | | (ORDER INFORMATION) | | SHOPPING SITE IS ARBITRARY |
| 39 | AUTHORIZATION REQUEST (← REGISTERED COMPANY) | | | ORDER RECEPTION SITE IS ARBITRARY |
| 40 | AUTHORIZATION REQUEST (API) | MG-ID | | |
| | | ORDER RECEPTION REGISTERED COMPANY CUSTOMER CODE | | |
| | | TRANSACTION IDENTIFICATION NO. | | |
| 41 | AUTHORIZATION REQUEST | MG-ID | | |
| | | ORDER RECEPTION REGISTERED COMPANY CUSTOMER CODE | | |
| | | RESULT CODE | | |
| 42 | AUTHORIZATION RESPONSE | RESULT CODE | | |
| | | AUTHORIZATION RESULT | | |
| 43 | AUTHORIZATION RESPONSE (API) | RESULT CODE | | |
| | | AUTHORIZATION RESULT | | |
| 44 | AUTHORIZATION RESPONSE (← REGISTERED COMPANY) | | | ORDER RECEPTION SITE IS ARBITRARY |
| 45 | COMPLETION PICTURE | | | SHOPPING SITE IS ARBITRARY |

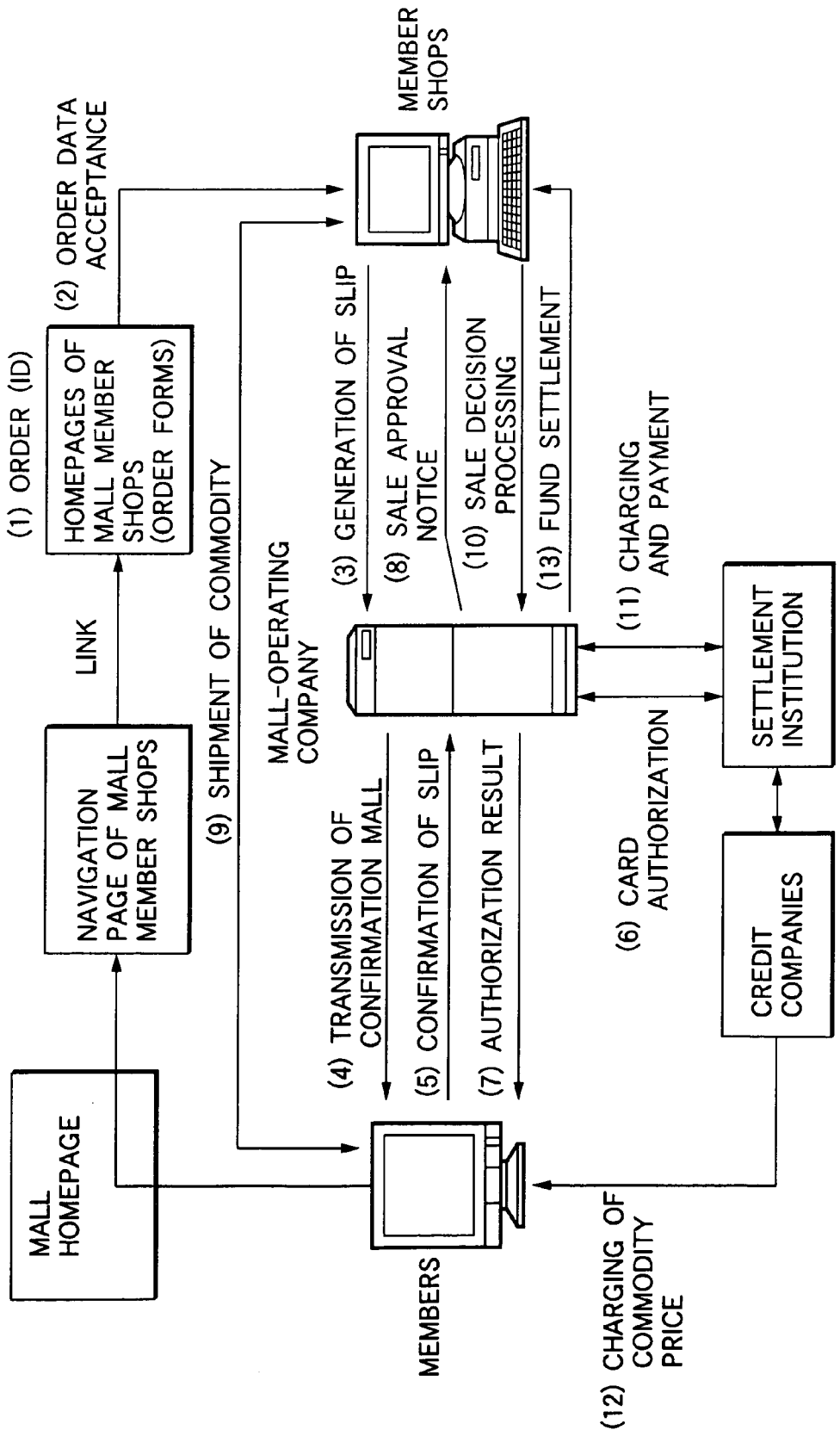

SETTLEMENT INTERMEDIATION PROCESSING APPARATUS, STORAGE MEDIUM IN WHICH A PROGRAM FOR SETTLEMENT INTERMEDIATION PROCESSING IS STORED, COMPUTER PROGRAM FOR SETTLEMENT INTERMEDIATION, ONLINE SHOP APPARATUS, AND ON-LINE SHOPPING METHOD AND SYSTEM

BACKGROUND OF THE INVENTION

1. Field of the Invention

The present invention relates to a settlement intermediation processing apparatus relating to commerce via the Internet such as on-line shopping, a storage medium in which a program for settlement intermediation processing is sotred, a computer program for settlement intermediation, an on-line shop apparatus, an on-line shopping method, and an on-line shopping system.

2. Description of the Prior Art

FIG. 36 shows a flow of conventional on-line shopping.

A registered member (user) of one on-line mall accesses the homepage of the mall where a navigation page usually exists. The navigation page is linked to the homepages of the respective member shops.

If the user orders a commodity on the homepage of one of the member shops (indicated by symbol (1)), order data is sent to the member shop (indicated by symbol (2)). The member shop generates a slip and communicates it to a mall-operating company as a virtual mall developer (indicated by symbol (3)).

The mall-operating company sends a confirmation mail message to the member to confirm that the member made the buying order (indicated by symbol (4)). If the member sends a buying confirmation signal (indicated by symbol (5)), a credit card number that is correlated with the ID and the password of the member and stored in a server of the mall-operating company is input to a settlement system of a settlement institution and communicated to a card company via this system. Authorization processing is performed in the card company (indicated by symbol If authorization is made, an authorization result is sent back to the mall-operating company (indicated by symbol (6)) and then communicated to the member and the member shop as an authorization result (indicated by symbol (7)) and a sale approval notice (indicated by symbol (8)), respectively.

The member shop sends the commodity to the member (indicated by symbol (9)) and performs sale decision processing (indicated by symbol (10)) by uploading sales data to the server of the mall-operating company. The mall-operating company collects sales data that are input from the respective member shops and inputs those to the settlement system of the settlement institution (indicated by symbol (11)).

Based on the sales data, the settlement system passes credit data to respective card companies. Each card company charges members commodity prices (indicated by symbol (12)) and passes the commodity prices to the mall-operating company via the settlement system (indicated by symbol (11)).

With the above processing, sales prices are paid to the member shops and fund settlement is performed (indicated by symbol (13)).

Incidentally, in conventional electronic commerce systems of the above kind, on-line shops and malls independently employ various kinds of settling procedures. An ID and a password that are issued in a certain mall are available for only that mall. Therefore, a user who wants to use various on-line shops and malls need to have himself registered by inputting personal information, a card number, etc. many times for a number of shops and malls.

This results in problems that registration procedures are cumbersome and a number of IDs and passwords need to be managed.

There is another problem that, repeatedly following such registration procedures, many times increases the possibility of leakage of card information.

SUMMARY OF THE INVENTION

An object of the present invention is, therefore, to provide a settlement intermediation apparatus that realizes a settlement system in which the necessary procedure is easy and the number of IDs and passwords to be managed does not increase even in commerce of a number of systems and, hence, the possibility of leakage of secret information relating to settlement is remote.

Another object of the present invention is to provide an on-line shop apparatus for providing an on-line shopping system in which a user can use, by following a simple procedure, shops and malls other than the on-line shop or mall where he is registered, whereby the number of IDs and passwords to be managed does not increase and hence the possibility of leakage of secret information relating to settlement is remote.

A further object of the present invention is to provide such an on-line shopping method and system.

To attain the above objects, a settlement intermediation processing apparatus according to the present invention includes an order information receiving part for receiving, from a first apparatus that performs a prescribed act that is accompanied by payment of a price in response to a request that is sent from a user over a network, order information relating to the request for the prescribed act; a payment information acquiring part for acquiring, based on the received order information, from a second apparatus with which the user has a contract relating to payment of money by a prescribed method, payment information that is necessary for receiving, from the user, payment of the price of the prescribed act requested by the user; and a settlement processing part for performing settlement of the price of the prescribed act requested by the user based on the received order information and the acquired payment information.

It is preferable that the prescribed act be the sale of an arbitrary commodity over the network and be accompanied by payment, that the order information receiving part receive order information relating to an order for a commodity from the first apparatus which performs the sale of an arbitrary commodity over a network, that the payment information acquiring part acquire payment information necessary for receiving, from a user, payment of a price of the commodity ordered by the user from the second apparatus based on the received order information; and that the settlement processing part perform settlement of the price of the commodity bought by the user based on the received order information and the acquired payment information.

For example, each of the first apparatus and second apparatus is one of a number of commodity selling part for which users made registration including a contract relating to payment of money by a prescribed method, and that permit at least the registered users to access themselves over the network and sell an arbitrary commodity when accessed;

the order information receiving part receives, from one of the number of commodity selling part, order information relating to an order for a commodity from a user who is registered in at least commodity selling part other than the one commodity selling part; and the payment information acquiring part acquires payment information necessary for receiving, from the user, payment of a price of the commodity ordered by the user from the commodity selling part where the user is registered based on the received order information.

Another example is such that each of the first apparatus and second apparatus is one of an on-line shop part for selling a commodity when accessed over the network and an on-line shop managing part for controlling access to the on-line shop part over the network.

A settlement intermediation processing apparatus according to another aspect of the present invention includes a part for accepting input, by a user who is going to buy a commodity in a first site, of individual identification information of the user for a second site where the user himself is registered as a member; and a part for sending the input individual identification information to the second site, and for acquiring an individual identification result and information necessary for settlement from the second site.

A settlement intermediation processing apparatus according to still another aspect of the invention includes a part for accepting input, by a user who is going to buy a commodity in a first site, of information necessary for settlement and individual identification information of the user for a second site where the user himself is registered as a member; and a part for sending the input individual identification information to the second site, and for acquiring an individual identification result from the second site.

A settlement intermediation processing apparatus according to a further aspect of the present invention includes a part for receiving, from a user who is going to buy a commodity in a first site, an input for selection of a second site that can identify the user as an individual; and a part for requesting the selected second site to send back a user individual identification result, and for performing settlement processing based on the sent-back individual identification result.

In the settlement intermediation processing apparatus according to each of the other aspects of the present invention, the second site is, for example, an on-line shop site for selling a commodity when accessed over a network or an on-line shop managing site for controlling access to the on-line shop site over the network.

The settlement intermediation processing apparatus according to the present invention may further include a commission payment processing part for performing processing of paying commissions to operating parties involved in a sale of the commodity that include an operating party of the second apparatus (second site) and an operating party of the settlement intermediation processing apparatus. In this case, for example, the commission payment processing part allots, to the commissions, part of a price of the commodity for which settlement is performed.

There may further be provided an access information providing part for storing, for each of first apparatuses (first sites), pieces of user information for respective second apparatuses (second sites) that are different from actual ones and enable users who are registered in the second apparatuses (second sites) to access said each first apparatus (first site), and for enabling access to a corresponding first apparatus (first site) when user information that is different from an actual one is input by a user. In this case, for example, each of the pieces of user information includes a user ID for the settlement intermediation processing apparatus.

The payment information acquiring part may acquire payment information including a credit card number that is necessary for settlement, using a credit card of the user, of payment for the price of the commodity ordered by the user from the second apparatus (second site) based on the received order information; and the settlement processing part may perform processing for receiving payment, by a credit card company that issued the credit card of the user, of an amount of money corresponding to the price of the commodity bought by the user based on the received order information and the acquired payment information.

For example, the payment information acquiring part (for acquiring an individual identification result and information necessary for settlement from the second site) correlates the received order information with the acquired payment information based on an order number included in the received order information and an order number included in the acquired payment information.

There may further be provided a payment method input displaying part for providing the first apparatus (first site) with a payment method selection picture that enables an input for selection of a payment method; and a settlement intermediation executing part for causing the settlement intermediation processing apparatus to perform its functions only when an input that selects settlement by the settlement intermediation processing part is made through the payment method input displaying part.

As another example, there may further be provided a list displaying part for causing an apparatus of a user who is making access over the network to display, in a selectable manner, a list of commodity selling part (first sites) with which the settlement intermediation processing part can perform settlement intermediation processing; and an automatic access part for causing selected commodity selling part (first site) to access the apparatus of the user.

As still another example, there may further be provided a search keyword storing part for storing search keywords in such a manner that one or more search keywords are correlated with each of commodities sold by commodity selling part (first sites) with which the settlement intermediate processing part can perform settlement intermediation processing; a search keyword inputting part for causing an apparatus of a user who is making access over the network to display a dialog box for input of a search keyword; and a second automatic access part for retrieving, based on a search keyword that is input through the search keyword inputting part, a name of corresponding commodity selling part (first site) from the search keyword storing part, and for making the apparatus of the user accessible to the commodity selling part (first site) thus found.

The settlement intermediation processing apparatus according to the present invention is preferably a computer that can be accessed over a network. Therefore, the present invention can also be defined as a computer program for causing execution of the functions of the settlement intermediation processing apparatus of the present invention as well as by a recording medium in which such a computer program is stored.

An on-line shop apparatus according to the present invention includes a shop managing part for registering and managing an on-line shop that sells an arbitrary commodity when accessed over a network; and a user managing part for performing, with a user, registration including a contract relating to payment of money, and for permitting the registered user to access the registered on-line shop, the user managing part permitting a user who is registered in and has a contract relating to payment of a price of a commodity bought with a second on-line shop apparatus, to access the registered on-line shop when accessed by the user via a settlement intermediation processing apparatus that acquires prescribed payment information of the user from the second on-line shop and performs settlement.

Another on-line shop apparatus according to the present invention includes a shop managing part for registering and managing an on-line shop that sells an arbitrary commodity when accessed over a network; and a user managing part for performing, with a user, registration including a contract relating to payment of money, and for permitting the registered user to access the registered on-line shop, the user managing part providing, when the registered user buys a commodity in an on-line shop managed by another on-line shop apparatus, prescribed payment information necessary for settlement to be performed with the user according to the contract with the user to a settlement intermediation processing apparatus that performs settlement of a price of the commodity bought by the user in response to a request from the settlement intermediation processing apparatus.

An on-line shopping method according to the present invention includes the steps of, in an arbitrary, first on-line shop provided on a network, generating order information based on an order for a commodity that is issued by an arbitrary user who accesses the on-line shop; sending the generated order information to a settlement intermediation processing apparatus; in the settlement intermediation processing apparatus, acquiring prescribed payment information necessary for receiving payment by the user from a second on-line shop apparatus where the user who has issued the order for the commodity is registered; performing settlement with the user based on the acquired payment information; paying prescribed commissions corresponding to a price of the commodity for which the settlement has been performed at least to the second on-line shop and the settlement intermediation processing apparatus; and paying the first on-line shop an amount of money that remains after the payment of the commissions.

An on-line shopping system according to the present invention includes a number of on-line shops for selling an arbitrary commodity when accessed over a network; a number of on-line shop apparatuses each including a shop managing part for registering and managing part of the number of on-line shops; and a user managing part for performing, with a user, registration including a contract relating to payment of money, and for permitting the registered user to access the registered online shops, the user managing part permitting a user who is registered in another on-line shop apparatus to access the registered on-line shops when accessed by the user via a settlement intermediation processing apparatus, the user managing part providing, when the registered user buys a commodity in an on-line shop managed by another on-line shop apparatus, prescribed payment information necessary for settlement to be performed with the registered user to the settlement intermediation processing apparatus; and the settlement intermediation processing apparatus including an order information receiving part for receiving order information from an arbitrary one of the number of on-line shop apparatuses; a payment information acquiring part for acquiring, based on the received order information, from one of the number of on-line shop apparatuses where a user is registered, payment information that is necessary for receiving payment of a price from the user; and a settlement processing part for performing settlement of the price of a prescribed act requested by the user based on the received order information and the acquired payment information.

Additional features and advantages of the present invention are described in, and will be apparent from, the Detailed Description of the Preferred Embodiments and the Drawings.

DESCRIPTION OF THE DRAWINGS

FIG. 2 is a schematic diagram showing registered contents of the members of the other malls that are stored as a user master in each mall-operating company of the on-line shopping system of FIG. 1;

FIG. 3 is a schematic diagram showing a pop-up picture for authentication processing that is performed in each mall-operating company of the on-line shopping system of FIG. 1 on a member who has done shopping in another mall;

FIGS. 12–18 are schematic diagrams showing pictures that appear on a user terminal and are used in the processing of FIGS. 10 and 1;

FIGS. 21–26 are schematic diagrams showing pictures that appear on a user terminal and are used in the processing of FIG. 20;

FIG. 28 is a flowchart showing a flow of inter-site communications in a case where a registered company site and a selling site are different from each other in the money gate basic mode;

FIG. 29 is a flowchart showing a flow of inter-site communications in a case where a registered company site and a selling site are the same in a shopping switch reception service use mode;

FIG. 30 is a flowchart showing a flow of inter-site communications in a case where a registered company site and a selling site are different from each other in the shopping switch reception service use mode;

FIG. 31 is a table showing formats 1–8 of e-mail that is exchanged between sites by inter-site communication;

FIG. 32 is a table showing formats 9–23 of e-mail that is exchanged between sites by inter-site communication;

FIG. 33 is a table showing formats 24–29 of e-mail that is exchanged between sites by inter-site communication;

FIG. 34 is a table showing formats 30–35 of e-mail that is exchanged between sites by inter-site communication;

FIG. 35 is a table showing formats 36–45 of e-mail that is exchanged between sites by inter-site communication; and FIG. 36 is a schematic diagram showing a flow of processing in a conventional on-line shopping system.

DETAILED DESCRIPTION OF THE PREFERRED EMBODIMENTS

Embodiments of the present invention will be hereinafter described with reference to FIGS. 1–26.

The first embodiment is directed to an on-line shopping system in which a number of on-line shopping malls (hereinafter referred to simply as "malls") are developed on a communication network and a user who is a member of one of the malls can do on-line shopping in another mall without the need for having himself newly registered therein.

First, the individual items of the on-line shopping system according to this embodiment will be described. The contents of the items are as follows.

Contents

A. Outline
 (1) Basic configuration
 (2) Basic operations
 1) Operations at the time of buying a commodity
 2) Sales and settlement processing B. Detailed Description
 (1) Exemplary configuration
 (2) operations/flows of processing
 1) Sale of an article
 2) Sale of a digital content
 a) Case where the authorization site does not know a credit card number of a user
 b) Case where the authorization site knows a credit card number of a user
 (3) Inter-site communication
 1) Inter-site communication in a case where a registered company site and a selling site are the same in the money gate basic mode
 2) Inter-site communication in a case where a registered company site and a selling site are different from each other in the money gate basic mode
 3) Inter-site communication in a case where a registered company site and a selling site are the same in the shopping switch reception service use mode
 4) Inter-site communication in a case where a registered company site and a selling site are different from each other in the shopping switch reception service use mode
 (4) Summary The embodiment will be described below according to the above items.

A. Outline (1) Basic Configuration

First, the basic configuration of the on-line shopping system according to the embodiment will be described with reference to FIGS. 1–4.

Figure 1:
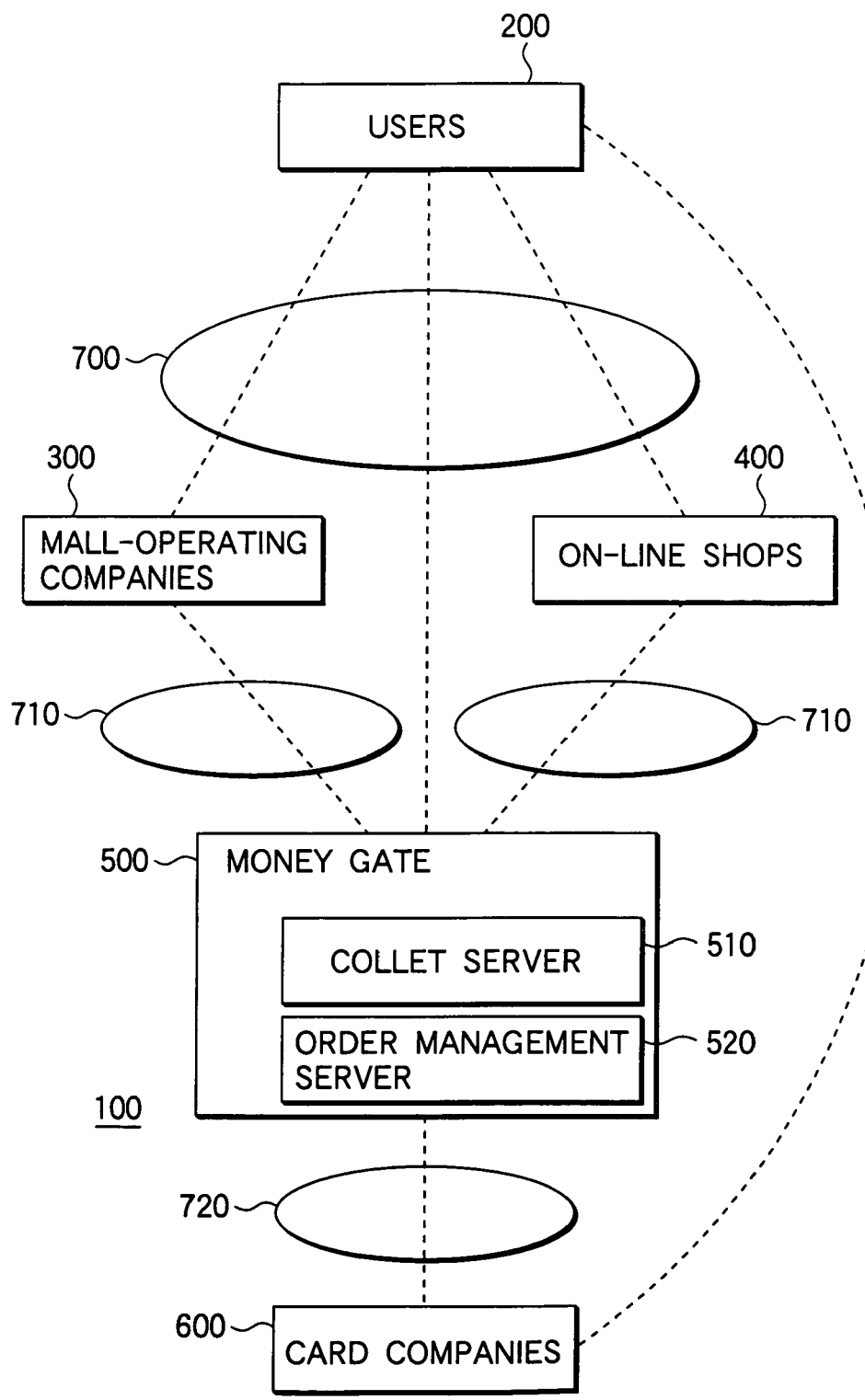
FIG. 1 is a block diagram showing an on-line shopping system according to an embodiment of the present invention.

FIG. 1 shows the basic configuration of the on-line shopping system. In the basic configuration, the on-line shopping system 100 consists of users 200, mall-operating companies 300 (first apparatuses, first sites, second apparatuses, second sites, commodity selling apparatuses, an on-line shop part, and an on-line shop managing part), an on-line shops 400 (first apparatuses, first sites, second apparatuses, second sites, commodity selling apparatuses, an on-line shop part, and an on-line shop managing part), a money gate 500 (settlement intermediation processing apparatus), card companies 600, and communication networks 700, 710 and 720.

Part of the users 200, the mall-operating companies 300, the on-line shops 400, the money gate 500, and the card companies 600 are expressed as a natural person or a corporate body at least literally. Each of these terms represents a natural person, a corporate body, or the like in a scene of commerce, and represents a computer that is owned and manipulated by a natural person, a corporate body, or the like in a scene where its function is performed. That is, in a scene where its function is performed, each of the users 200, the mall-operating companies 300, the on-line shops 400, the money gate 500, and the card companies 600 is a computer in which a processor performs data processing according to an operation program or the like that is stored in a storage device as a storage medium. Various procedures to be described later are realized by various functions that are performed by the processor according to the operation program or the like that is stored in the storage device. The storage medium for storing a computer program as the operation program is not limited to a storage device of a computer and may be a packaged, portable storage medium as typified by a CD-ROM.

In a scene of commerce, each user 200 is mainly a general individual who actually buys commodities in the on-line shops 400 via the communication network 700.

In a scene of commerce, each user 200 has an environment in which he can access, via the communication network 700, the malls that are established by the mall-operating companies 300 or the shops that are established by the on-line shops 400. Each user 200 is a registered member of the mall of at least one of a number of mall-operating companies 300 and is a user whom the one mall-operating company 300 assures of charge payment.

Usually, in a scene where its function is performed, each user 200 is a personal computer or the like that is connected to an arbitrary node of the communication network 700.

In a scene of commerce, each mall-operating company 300 is a local, individual Internet service provider (ISP), in other words, a company that establishes each on-line shopping mall. Each mall-operating company 300 develops, on the Internet 700, a mall or the like as an on-line shopping platform and provides on-line shop service to both of a person who desires to establish an on-line shop and users of on-line shops.

Specifically, in a scene where its function is performed, each mall-operating company 300 manages the on-line shops 400 of the mall that is established by itself (shop managing part).

In a scene where its function is performed, each mall-operating company 300 stores and manages, in the form of a user database, users 200 who are registered as members (user managing part).

In a scene where their function is performed, part of the mall-operating companies 300 may manage orders in the on-line shops 400 of the established mall. Such a mall-operating company 300 performs various kinds of processing relating to the entire on-line shopping such as management of all order data using an order database, requesting users 200 to confirm orders, and requesting a settlement institution to perform authorization.

In the on-line shopping system 100, a user 200 who is registered in a certain mall can do, via the money gate 500 (described later), shopping in other malls where he is not registered. To realize such a system, each mall-operating company 300 performs the following processing. Needless to say, this processing is performed by a computer.

First, each mall-operating company 300 issues, for each of the other malls, information such as IDs for allowing the members of the other malls (whose shopping via the money gate 500 should be permitted in its own mall) to be handled as members of its own mall, and registers the information as a user master.

This will be described below in a specific manner with reference to FIG. 2.

Now, assume that there are three malls A–C each of which permits shopping, in itself, by the users of the other two malls via the money gate 500. The mall-operating company 300 of each mall sets IDs, passwords, and dummy credit card numbers to the other malls.

For example, a mall-operating company 300a of mall A issues, for the members of mall B, an ID "mlb@mg2," a password "12345678," and a dummy credit number "111100000002" and issues, for the members of mall C, an ID "mlc@mg2," a password "12345678," and a dummy credit number "111100000003." The mall-operating company 300a stores these pieces of information in its own database. These IDs, passwords, and credit numbers are temporary or different from actual ones.

Such IDs to be used for accessing the money gate 500 are called money gate IDs.

Figures 4, 5:
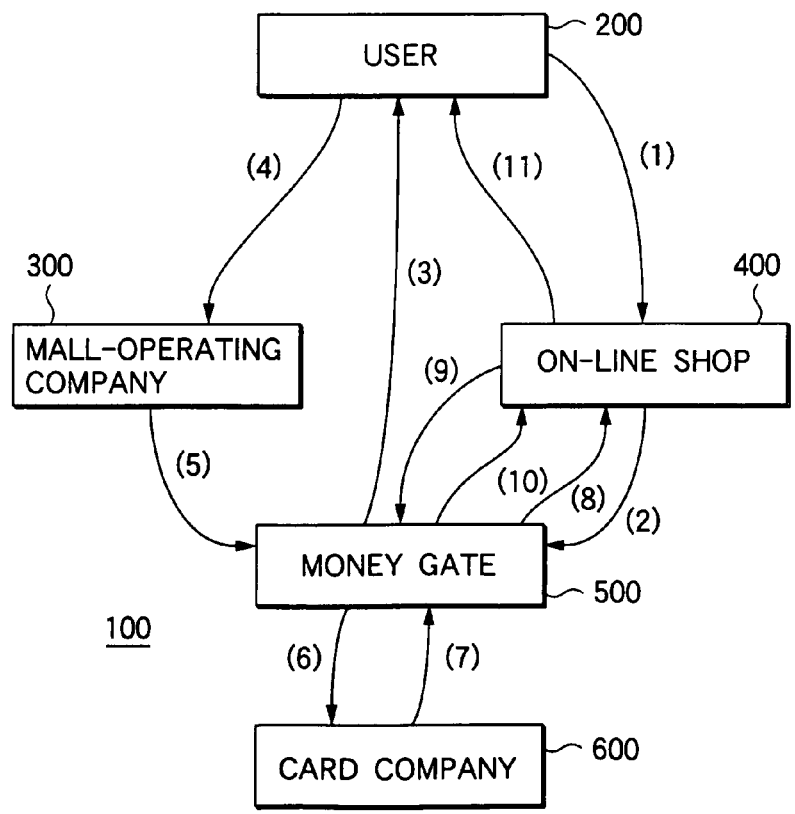
FIG. 4 is a schematic diagram showing information provided for each mall-operating company for access of other malls, the information being stored as a company master in a money gate of the on-line shopping system of FIG. 1.
FIG. 5 is a schematic diagram showing a flow of processing that is performed when a user buys a commodity in the on-line shopping system of FIG. 1.

The above information issued by each mall-operating company 300 is registered in the form of a company master as shown in FIG. 4 also in a collect server 510 (see FIG. 1) of the money gate 500 (described later). The collect server 510 performs registration management of a Web picture that is linked to attribute information of each mall-operating company 300. That is, the collect server 510 of the money gate 500 stores, for each user 200, an ID, a password, and a credit card number that are temporary or different from actual ones for each mall-operating company. With this measure, when an ID, a password, and a credit card number are sent from a mall-operating company 300 to the collect server 510, the collect server 510 can judge which of the users 200 those pieces of attribute information belong to even if those pieces of attribute information are temporary or different from actual ones.

The mall-operating company 300 of a first mall accepts access from a member of a second mall to its own mall using the ID for the members of the second mall, and allows him to do shopping in the on-line shops 400 of the first mall.

When an on-line shop 400 of the mall of one mall-operating company 300 has received an order from a member (user 200) of another mall, the mall-operating company 300 requests the user 200 to confirm the order and informs the money gate 500 of the order reception. If the order is approved by the money gate 500, the mall-operating company 300 performs order-responsive processing and requests the on-line shop 400 to, for example, ship the commodity.

When a member of one mall-operating company 300 has done shopping in another mall, the mall-operating company 300 receives a member authentication request from the money gate 500. The mall-operating company 300 performs authentication processing and sends the money gate 500 information relating to settlement such as the credit card number.

To this end, each mall-operating company 300 stores in advance a pop-up picture as shown in FIG. 3 in a Web server. When receiving an authentication request from the money gate 500, the mall-operating company 300 causes the pop-up picture to be opened on the computer screen of a user 200.

The communication channels 710 between the mall-operating companies 300 and the money gate 500 should provide a secure communication, and hence should be dedicated lines or need to have a mechanism for sending data in an SSL (secure socket layer).

As described above, each mall-operating company 300 performs various kinds of processing with a shop 400 and a user 200 and the money gate 500 to enable proper on-line shopping.

Each on-line shop 400 establishes a shop in the environment provided by the associated mall-operating company 300 and sells online arbitrary goods such as articles and digital contents to the users 200.

Each on-line shop 400 makes a request substantially to the money gate 500 that it perform authorization processing and other processing such as fund settlement. Depending on the mall form, the associated mall-operating company 300 intervenes to manage order data temporarily and then performs processing with the money gate 500.

An on-line shop 400 itself may form a single mall.

The money gate 500 is a settlement processing unification organization for performing settlement relating to a number of mall-operating companies in a unified manner.

The money gate 500 has the collect server 510 which performs registration management of a Web picture (hereinafter referred to as "collect" or "collect object") that is linked to pieces of company attribute information that are assigned to the respective mall-operating companies 300, thereby allowing each user 200 to order a commodity easily in malls other than the mall where he is registered. That is, a collect that is specific to each user 200 and includes attribute information of the user 200 is held by the computer of the user 200, and can appear on the computer screen of the user 200 as a collect object. Information relating to an ID that is temporary or different from an actual one is liked to the collect object for each accessible mall-operating company 300 or on-line shop 400.

As mentioned above, the collect server 510 stores such information as IDs that were issued for the other malls by each mall-operating company 300, that is, a company master as shown in FIG. 4 in which a name, a dummy credit card number, a password, and an ID and a URL to be used for each mall-operating company 300 are listed for the members of each mall. When a user 200 orders a commodity in a mall other than the mall where he is registered, the collect of the mall-operating company 300 of the user 200 writes prescribed information in prescribed fields of while referring to the company master.

Specifically, first, a user 200 identifies a company based on a URL and determines an ID to be used. Based on the user's manipulation of, for example, dropping a collect object, the mall-operating company 300 or on-line shop 400 being accessed by the user 200 detects fields in which to write an ID, a password, a credit card number, etc. and writes those items in the detected fields. This is done in response to an input manipulation by the user 200 on a user attribute input picture for authentication (see FIG. 3) that is displayed on the computer screen of the user 200 who is accessing the mall-operating company 300 or on-line shop 400. At this time, since the user 200 as the computer recognizes the URL of the company (mall-operating company 300 or on-line shop 400), it can identify the company. By a manipulation of, for example, dropping the collect object into such a user attribute input picture for authentication, the collect that is held by the user 200 enables selection of an ID, password, and a credit card number that are temporary or different from actual ones in accordance with the identified company. The ID, password, and credit card number as a selection result that are temporary or different from actual ones are sent to the mall-operating company 300 or on-line shop 400. The mall-operating company 300 or on-line shop 400 being accessed by the user 200 sends the collect server 510 the ID, password, and credit card number as a selection result that are temporary or different from actual ones. A function of an order information receiving part is performed in this manner.

In processing of acquiring the ID of a user 200 himself who has done shopping in a mall other than the mall where he is registered, the collect server 510 detects the mall-operating company 300 where the user 200 is registered based on an instruction from the order management server 520 of the money gate 500. The collect server 510 also performs processing of instructing the mall-operating company 300 to providing the user 200 an ID/password input with picture and to acquire data necessary for individual identification and settlement. Functions of an access information providing part and a payment information acquiring part are performed in this manner.

Another embodiment is possible in which a user ID as individual identification information in the mall-operating company 300 or on-line shop 400 where a user 200 is registered is input to a user attribute input picture for authentication that is provided by a mall-operating company 300 or on-line shop 400 being accessed by the user 200. The input method may be of any type such as dragging of a collect object or input of a value. In this case, the collect server 510 can refer to a user ID list of each user 200. The user ID list contains at least a corresponding relationship between the user 200 and information that identifies the company (mall-operating company 300, on-line shop 400, or the like) where the user 200 is registered. Therefore, the mall-operating company 300 or on-line shop 400 being accessed by the user 200 sends the user ID of the user 200 to the collect server 510. A function of the order information receiving part is performed in this manner. Upon reception of the user ID, the collect server 510 refers to and searches the user ID list to determine what mall-operating company 300 or on-line shop 400 the user 200 is registered in. And the collect server 510 instructs the mall-operating company 300 or the like to provide an ID/password input picture to the user 200 and acquire data necessary for individual identification and settlement. Functions of the access information providing part and the payment information acquiring part are performed in this manner.

Having the order management server 520 for managing order information, the money gate 500 performs all settlement processing between the users 200, the mall-operating companies 300, and the on-line shops 400 (settlement processing part).

More specifically, first, the order management server 520 generates new order data based on new order information that is sent from a mall-operating company 300 and registers the new order data.

When the order was made through the money gate 500, that is, when the order was made in a shop of a mall other than the mall where a user 200 is registered, the order data contains the ID of the mall where the user 200 is registered but does not contain the ID or the credit number of the user 200 himself. Therefore, as mentioned above, the order management server 520 instructs the collect server 510 to acquire the ID of the user 200 himself.

Another embodiment is possible. Assume that order data that is generated when a user 200 makes an order in a shop of a mall other than the mall where the user 200 is registered contains the ID of the user 200 in the mall or the like where he is registered. In this case, the order data contains the ID of the user 200 in the mall or the like where he is registered but does not contain the credit card number of the user 200 himself Also in this case, the order management server 520 instructs the collect server 510 to acquire the credit card number of the user 200 himself.

A further embodiment is possible in which not only the ID of a user 200 in the mall-operating company 300 or on-line shop 400 where he is registered but also his credit number (i.e., information necessary for settlement) is input to a user attribute input picture for authentication that is provided by a mall-operating company 300 or an on-line shop 400 being accessed by the user 200. The input method is of any type such as dragging of a collect object or input of a value. In this case, the collect server 510 can refer to a user ID list of the users 200 as described above. Therefore, the mall-operating company 300 or on-line shop 400 being accessed by the user 200 sends the user ID and the credit card number of the user 200 to the collect server 510. A function of the order information receiving part is performed in this manner. Upon reception of the user ID and the credit card number, the collect server 510 refers to and searches the user ID list to determine what mall-operating company 300 or on-line shop 400 the user 200 is registered in. And the collect server 510 instructs the mall-operating company 300 or the like to provide an ID input picture to the user 200 and acquire data necessary for individual identification. Functions of the access information providing part and the payment information acquiring part are performed in this manner.

Finally, the order management server 520 writes, in the registered order data, such information as the ID, the credit card number, etc. of the user 200 that are sent from the mall-operating company 300 where the user 200 is registered. During this process of inquiry that is made of the mall-operating company 300 where the user 200 is registered, a dialog picture that urges the user 200 to input user identification information and information necessary for settlement may be displayed to the user 200. In this case, the user 200 himself inputs such information as a user ID, a password, a credit card number etc. in the dialog picture. The order management server 520 sends those pieces of information to the mall-operating company 300 or the like where the user 200 is registered and causes the mall-operating company 300 or the like to perform a user check and send back a check result. Alternatively, where the credit card number of each user 200 is recognized by the mall-operating company 300 or the like where he is registered as a member, the order management server 520 causes the user 200 to input only user identification information such as a user ID, a password, etc. in a dialog picture as mentioned above. The order management server 520 sends those pieces of information to the mall-operating company 300 or the like where the user 200 is registered and causes the mall-operating company 300 or the like to perform a user check and a credit card number search. Thereafter, the order management server 520 causes the mall-operating company 300 or the like to send back a user check result and the credit card number as information necessary for settlement.

After execution of the above processing, the order management server 520 sends a card company 600 order data where the credit card number etc. are written regularly and requests the card company 600 to perform authorization processing. The order management server 520 receives an authorization result and sends the shop 400 such information as order approval or cancellation.

As for the authorization processing, the order management server 520 issues authorization requests in advance before receiving authorization requests from the mall-operating companies 300 and accumulates authorization results. In response to an authorization request that is sent later from a mall-operating company 300, the order management server 520 detects a corresponding authorization result based on its order number and sends back the detected authorization result.

Then, the order management server 520 performs processing of distributing profits of the sales price (commission payment processing part).

For example, in the case of a sale via the money gate 500, a card company 600 pays an amount of money that is the sales price of a commodity minus a commission of a prescribed percentage. For the above payment, the money gate 500 pays, as a commission for introduction of the user 200, a prescribed percentage of the sales price to the mall-operating company 300 where the user 200 is registered, and pays a prescribed percentage of the sales price to the mall-operating company 300 where the on-line shop 400 concerned is established. The money gate 500 itself gets a commission of a prescribed percentage and pays the remaining money to the on-line shop 400.

Each card company 600 performs settlement processing based on information that is sent from the money gate 500 and is configured in the same manner as in the conventional case.

The communication network 700 is a wide area communication network system that is provided with nodes such as the malls, shops, and customers of the on-line shopping system 100 and on which the on-line shopping system 100 is constructed. In this embodiment, the communication network 700 is the Internet. In the following description, the communication network will be called the Internet 700.

The communication channels 710 and 720 are communication networks between the mall-operating companies 300/on-line shops 400 and the money gate 500 and between the money gate 500 and the card companies 600, respectively, and should each be given an environment that assures a secure communication.

Therefore, the communication channels 710 and 720 should be dedicated lines or need to have a mechanism for sending data in an SSL (secure socket layer).

As described above, in the settlement intermediation processing according to the present invention, authentication information and information necessary for settlement of a user 200 who is not registered in a mall-operating company 300 or an on-line shop 400 are acquired from the mall-operating company 300 or the like (second site, authentication site) where the user 200 is registered, whereby the user 200 is allowed to do shopping in the mall or the like of the mall-operating company 300 or the like (first site, selling site) where he is not registered. To enable such processing, it is indispensable to acquire at least information that identifies the user 200 himself, information that identifies the mall-operating company 300 or the like where the user 200 is registered, and information necessary for settlement relating to the user 200. Therefore, in practicing the present invention, it is possible to set as appropriate stages when to acquire such various kinds of information. Part of the possible combinations of stages were described in the above embodiments. In practicing the present invention, the combination of stages is not limited to the above-described ones and may be any of other combinations.

In the above-described process of on-line shopping, information necessary for settlement, for example, a credit card number, can be handled by various manners. For example, where it is necessary to inform a mall-operating company 300 of a credit card number etc. when or after a user 200 is registered in the mall-operating company 300, the mall-operating company 300 should have in advance information necessary for settlement of the user 200 who was registered such as a credit card number. Where such a mall-operating company 300 serves as an authentication site (second site), it is not necessary for the user 200 to input a credit card number etc. in the above-described process of on-line shopping. In contrast, where a mall operating company 300 does not require a user 200 to inform it of a credit card number etc. neither when nor after the user 200 is registered in it, it is indispensable for the user 200 to input a credit card number etc. in the above-described process of on-line shopping if the mall-operating company 300 serves as an authentication site (second site).

(2) Basic Operations

Figure 6:
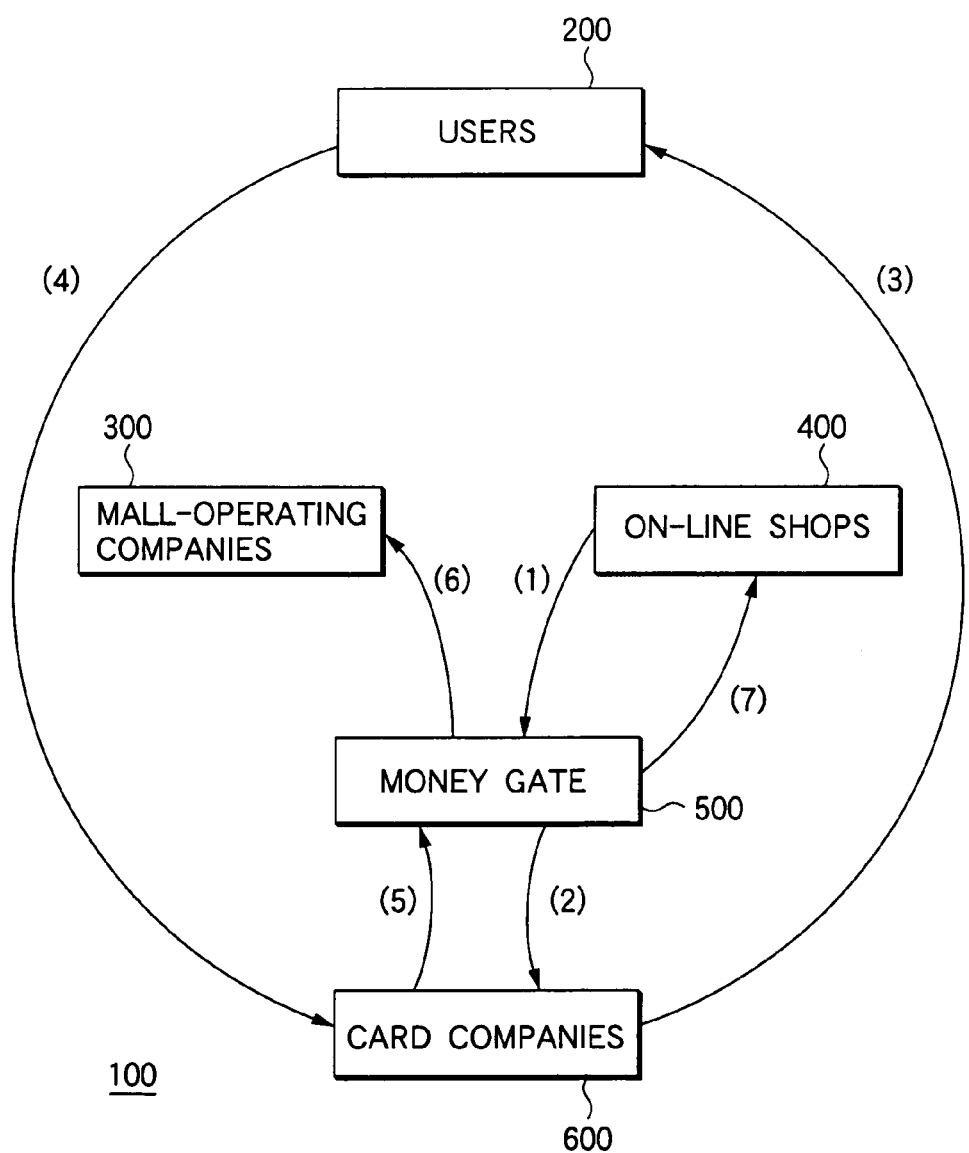
FIG. 6 is a schematic diagram showing a flow of sales and settlement processing that is performed on a closing day or the like in the on-line shopping system of FIG. 1.

Next, the basic operations of the on-line shopping system 100 having the above configuration will be described with reference to FIGS. 5 and 6.

1) Operations at the time of buying a commodity First, an operation that is performed when a user 200 buys a commodity will be described with reference to FIG. 5.

First, when a user 200 buys a commodity on the Web page or the like that is provided by an on-line shop 400, that is, when the user 200 orders a commodity in the on-line shop 400 (indicated by symbol (1)), the on-line shop 400 generates order data containing data necessary for authorization by a card company 600 such as an amount of money and sends the order data to the money gate 500 (indicated by symbol (2)).

The money gate 500 holds the order data in the order management server of the money gate 500. Further, the money gate 500 identifies the user 200 based on an IP address and the ID of a mall-operating company 300 that are included in the order data and requests the user 200 to show an ID and a password (indicated by symbol (3)).

The user 200 inputs an ID and a password in response to the request, and the ID and the password thus input are sent to the mall-operating company 300 (indicated by symbol (4)).

Based on the ID and the password, the mall-operating company 300 performs authentication processing. If it is confirmed that the user 200 is a legitimate person, the mall-operating company 300 determines credit data based on the ID and the password and sends the credit data to the money gate 500 (indicated by symbol (5)). This transmission from the mall-operating company 300 to the money gate 500 is done via a dedicated line rather than the Internet.

The money gate 500 writes the credit data that is received from the mall-operating company 300 in the order data that was received from the on-line shop 400 and stored in the order management server, and requests the card company 600 to perform authorization processing (indicated by symbol (6)).

Based on the request, the card company 600 performs authorization processing and sends back an authorization result to the money gate 500 (indicated by symbol (7)).

The money gate 500 sends the on-line shop 400 a result of decision, made based on the received authorization result, on whether to perform order-responsive processing (indicated by symbol (8)). Checking the result, the on-line shop 400 finally requests the money gate 500 to perform authorization processing (indicated by symbol (9)). In response to the authorization request, the money gate 500 does not forward the authorization request to the card company 600 and sends back the authorization result being held in the money gate 500 to the on-line shop 400 (indicated by symbol (10)).

Based on the authorization result, the on-line shop 400 informs the user 200 that the order has been accepted and ships the commodity (indicated by symbol (11)).

2) Sales and Settlement Processing

Next, sales and settlement processing that is performed on a closing day or the like will be described with reference to FIG. 6.

First, each on-line shop 400 sends sales data to the money gate 500 (indicated by symbol (1)).

The money gate 500 collates the received sales data with order data that are held in the order management server and inputs credit numbers to the sales data. Further, the money gate 500 sends the sales data containing the credit numbers to card companies 600 and charges the card companies 600 for the sales (indicated by symbol (2)).

In response, the card companies 600 charges the users 200 for the sales (indicated by symbol (3)) and receives payments (indicated by symbol (4)).

The card companies 600 pays the money gate 500 the sales prices minus prescribed commissions (indicated by symbol (5)).

The money gate 500 pays the mall-operating companies 300 prescribed percentages as customer introduction commissions (indicated by symbol (6)) and pays the on-line shops 400 after deduction of its own commissions of b°s (indicated by symbol (7)).

B. Detailed Description

Next, an actual configuration example and examples of operations flows of processing of the on-line shopping system whose basic configuration and operations were described above will be described in a specific manner with reference to FIGS. 7–26.

(1) Exemplary Configuration

Figure 7:
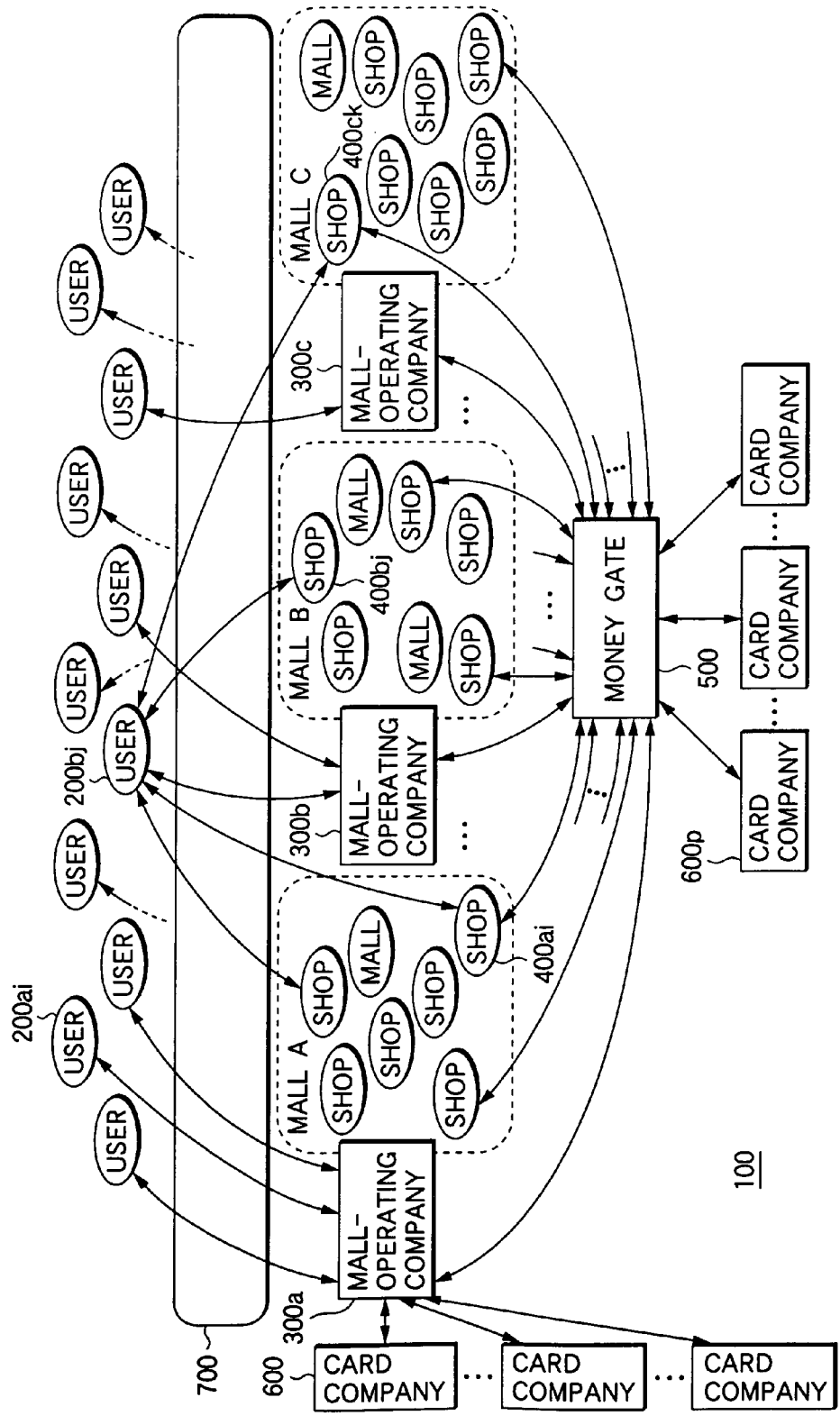
FIG. 7 is a schematic diagram showing an actual configuration of the on-line shopping system according to the embodiment.

FIG. 7 shows a configuration of the on-line shopping system 100 that is applied to an actual network.

As shown in FIG. 7, the actual on-line shopping system 100 includes a number of users 200, mall-operating companies 300, and card companies 600 and its configuration always varies dynamically.

The users 200 are arbitrary nodes that are connected to the network 700, and a user can become a user 200 of the on-line shopping system 100 by having himself registered in one of the mall-operating companies 300. That is, by having himself registered in one of the mall-operating companies 300, each of the users 200 can do shopping in the other malls of the online shopping system 100 in the same manner as in the members of the other malls.

Any mall-operating company can have itself registered as a mall-operating company 300 of the on-line shopping system 100 if it permits, on condition that the money gate 500 is used as a settlement processing part, a member user of itself to access, for shopping, the malls established by the other mall-operating companies 300 of the on-line shopping system 100 as well as permits, conversely, a user 200 who is registered in one of the other mall-operating companies 300 to access its own mall for shopping.

As described later, the mall-operating companies 300 can gain profits by establishing a mechanism that when a sale of a commodity occurs as a result of such mutual access of a member user 200, both of the mall-operating company 300 where the user 200 is registered and the mall-operating company 300 that manages the on-line shop 400 that has sold the commodity can receive prescribed commissions.

In the above on-line shopping system 100, the money gate 500 manages, in a unified manner, access and settlement processing between the users 200, the mall-operating companies 300, and the on-line shops 400 using the above-described collect server 510 and order management server 520. This enables mutual access between the users 200, the mall-operating companies 300, and the on-line shops 400 as well as shopping.

(2) Operations/flows of Processing

Operations of the actual on-line shopping system 100 shown in FIG. 7, in other words, flows of processing of the on-line shopping system 100, will be described below in a specific manner.

The following description will be directed to the actual system to which the above-described operations of the basic on-line shopping system are applied. Therefore, although flows of processing that will be described below may be somewhat different from the above-described flows of processing, they have no substantial difference in the flow of data and operation.

The embodiment will be directed to processing that is performed in a case where in the on-line shopping system 100 shown in FIG. 7 a user 200 who is registered as a member of one of the mall-operating companies 300 having the respective malls A, B, and C does on-line shopping in a shop 400 that is established in mall A, B, or C where the user 200 is not registered.

In this case, a user 200 needs to be a member of at least one mall-operating company or on-line shop 400. Among various possible modes is a mode in which a user 200 is a member of an on-line shop 400 that sells articles or digital contents. In this case, since the user is a member of the on-line-shop 400, he may be a member of a mall-operating company 300 to which the on-line shop 400 belongs. Paying attention to the mall operating company 300, the mall-operating company 300 may be such an institution as an Internet service provider (ISP) that manages and controls access of users to the on-line shops 400 that are registered in itself, or the mall-operating company 300 itself may have an on-line shop function of, for example, selling articles or digital contents. Further, as shown in FIG. 7, the mall-operating company 300 may be such as to manage another mall-operating company that manages a number of on-line shops 400. As for the mall operation form of the mall-operating company 300, an operation form is possible in which the mall-operating company 300 itself is under contract with a number of card companies 600 (see a mall-operating company 300a in FIG. 7). This provides operation in which the mall operating company 300a is under contract with a number of card companies 600 and settlement by those contracted card companies 600 is enabled for the on-line shops (member shops) and the mall-operating company 300 without the on-line shops (member shops) and the mall-operating company 300's having to contract with card companies 600 by themselves.

The user 200 can access the mall-operating company 300, the on-line shop 400, and the money gate 500 over the communication network 700 that is the Internet. As described later, the user 200 can access even a mall-operating company 300 that is not the mall-operating company 300 where he is registered as a member.

Processing that is performed when the user 200 accesses the money gate 500 will be described. The money gate 500 provides the user 200 with a homepage for user access. The user 200 is a member of one mall-operating company 300 or on-line shop 400 of the on-line shopping system 100.

Figure 8:
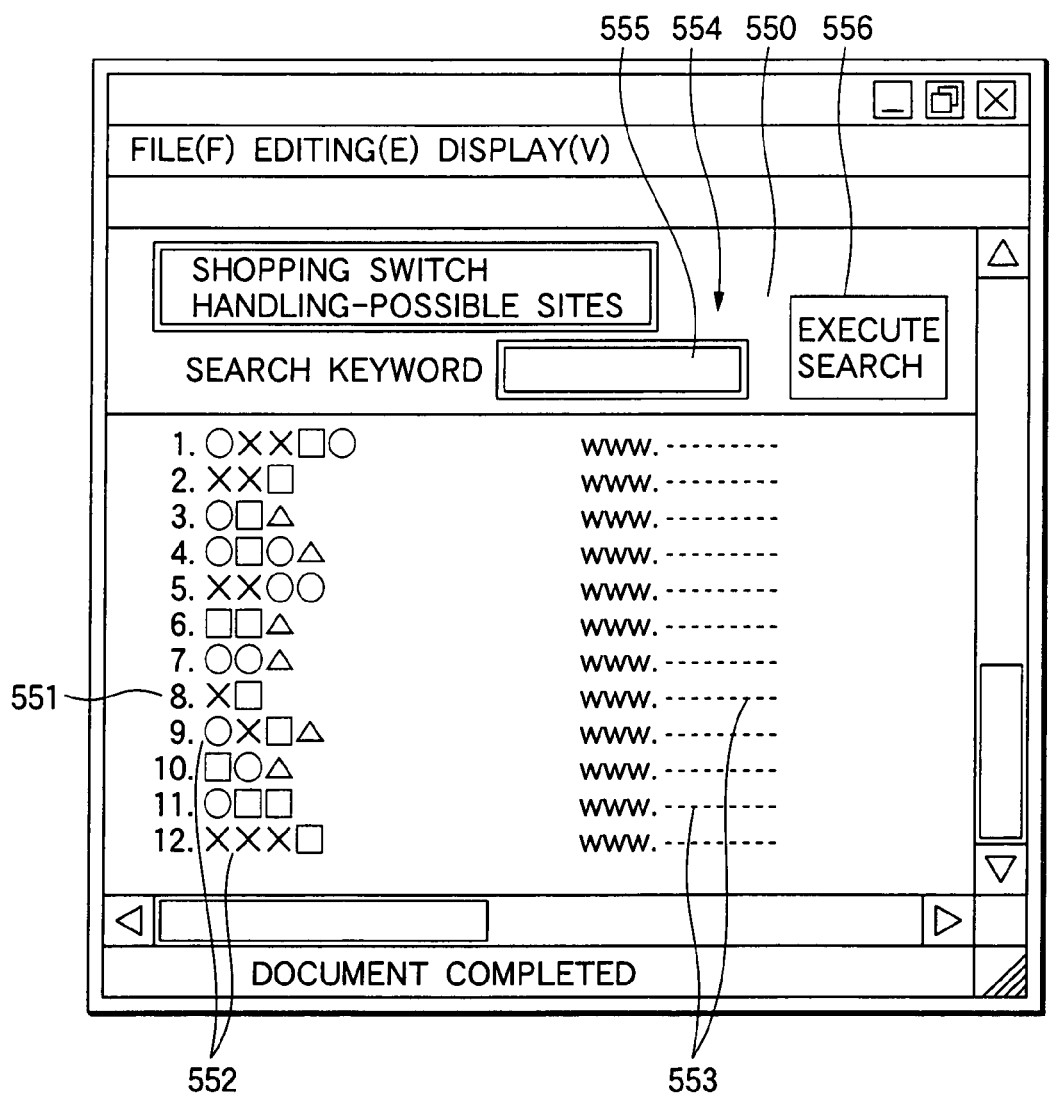
FIG. 8 is a schematic diagram showing an exemplary search page that is provided to a user who accesses a homepage for an on-line shop search of the money gate.
Figure 9:
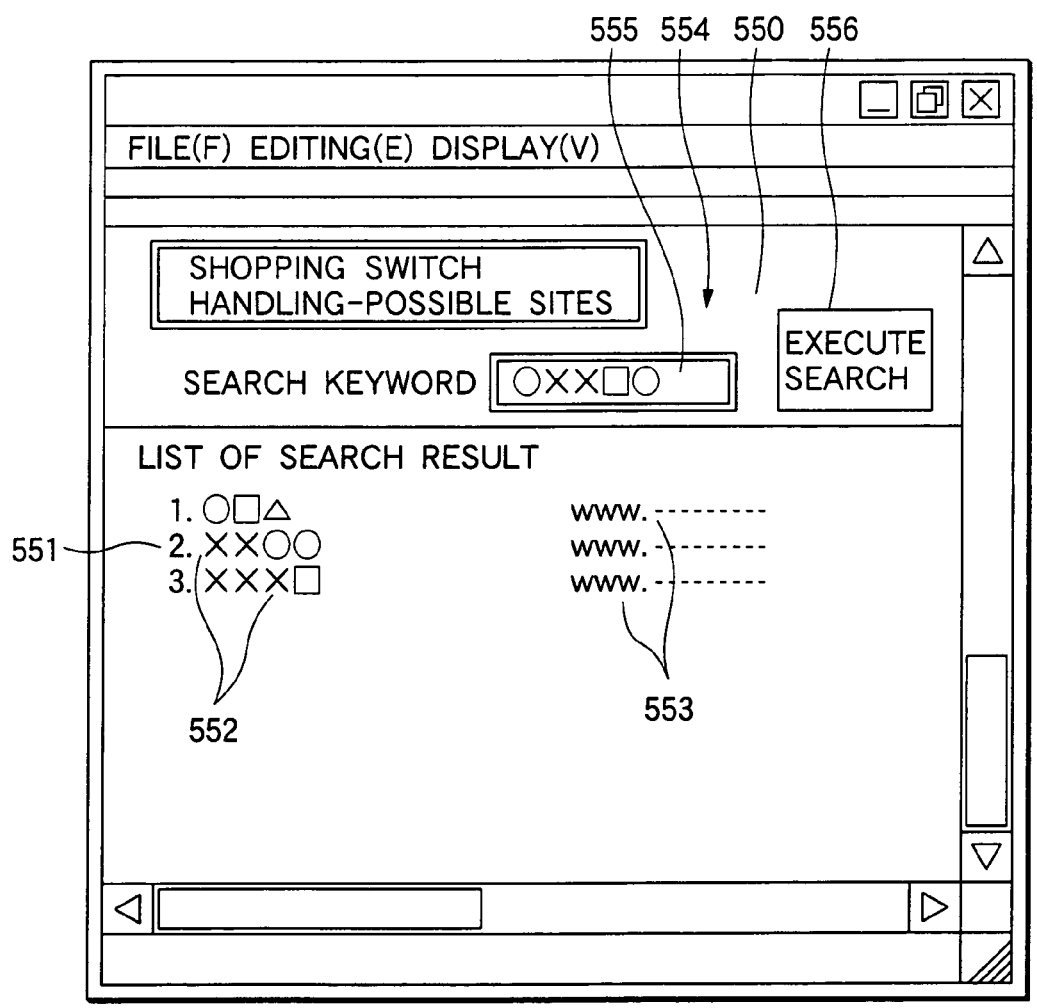
FIG. 9 is a schematic diagram showing an example picture that appears when a search is made by using an input search keyword.
Figure 10:
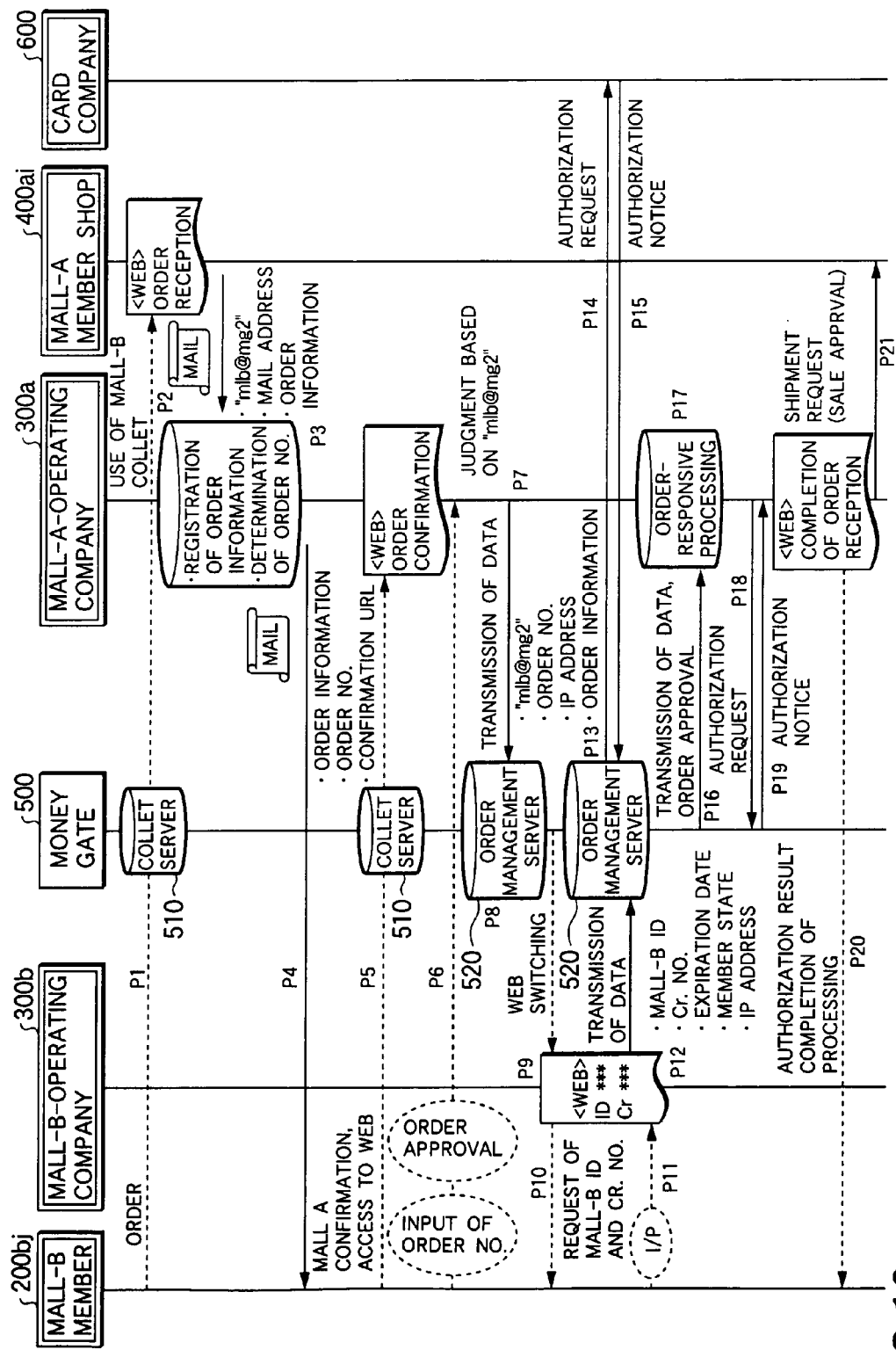
FIGS. 10 and 11 are first and second schematic diagrams, respectively, showing a flow of processing that is performed when a user buys a commodity in a shop of a mall other than the mall where he is registered in the on-line shopping system of FIG. 7.
Figure 11:
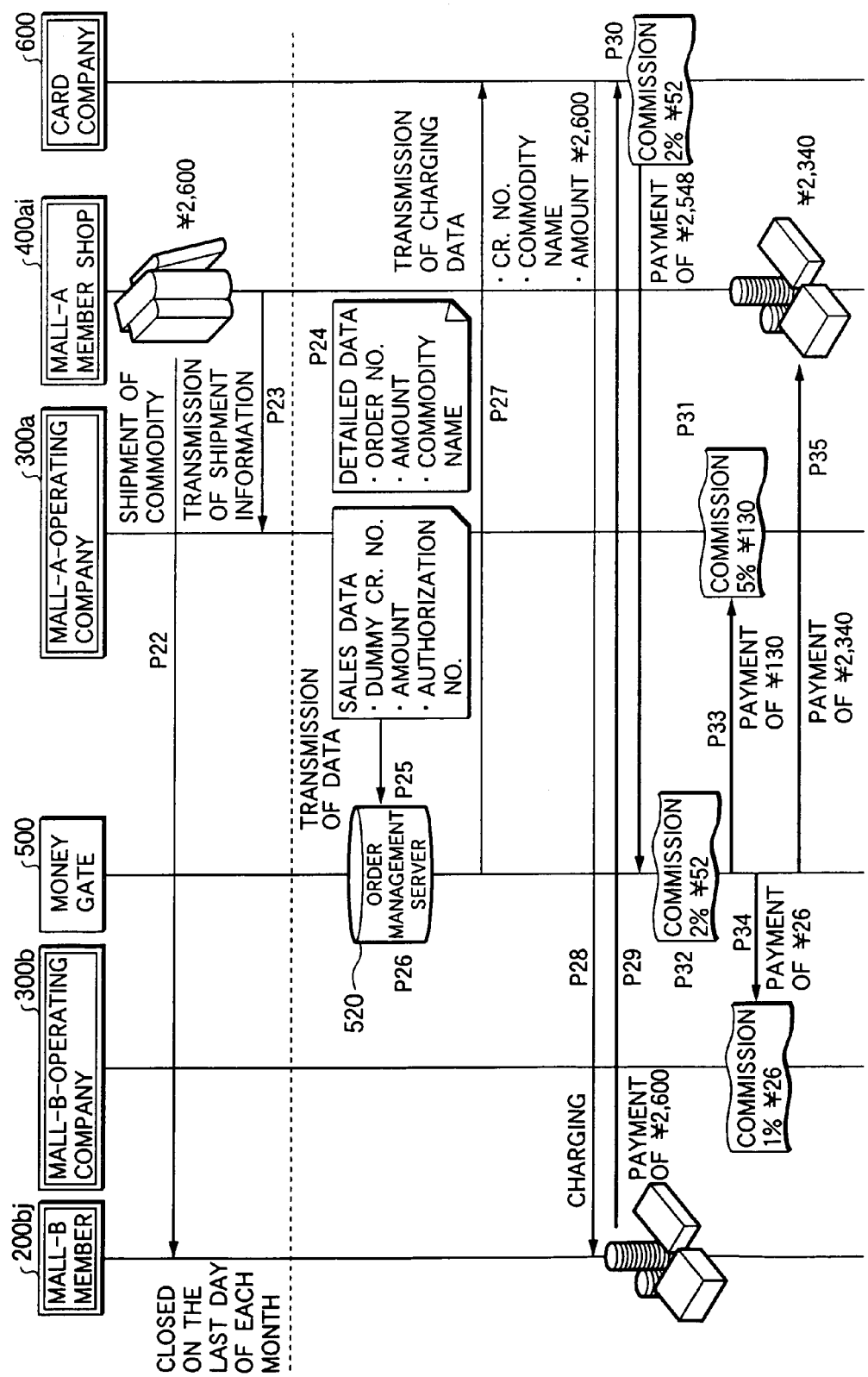

For example, the homepage that is provided to the user 200 by the money gate 500 has a search page 550 as exemplified in FIGS. 8 and 9. The search page 550 is a page to be used for searching the on-line shopping system 100 for, for the user 200 who plans to buy a certain article or digital content, an on-line shop 400 (in the following description, it may be a mall operating company 300) in which to buy the article or digital content. To this end, the money gate 500 is provided with image data for display of the search page 550, a display program, and a search engine as well as a search keyword storing part. The search keyword storing part has such a file structure that search keywords are stored in such a manner that one or two keywords are correlated with each of commodities that are sold by a commodity selling part for which the money gate 500 can perform settlement intermediation processing, that is, the on-line shops 400 of the on-line shopping system 100.

In the search page 550, a list of all on-line shops 400 of the on-line shopping system 100 is displayed in a shop display space 551 according to the display program that is installed in the money gate 500 (list displaying part). The name 552 and the link information 553 of each on-line shop 400 are displayed in the shop display space 551. Each link information 553 to be displayed is what is called a URL (universal resource locator). The search engine that is provided in the money gate 500 has a program that causes a transfer to the page of a corresponding on-line shop 400 when the cursor is located at a piece of link information 553 and clicking is made (automatic accessing part).

The display program that is installed in the money gate 500 displays, in the search page 550, not only the above shop display space 551 but also a dialog box 554 for input of a search keyword (search keyword inputting part). As shown in FIGS. 8 and 9, the dialog box 554 has an input region 555 for input of a search keyword and a commanding button 556 for commanding execution of a search. When the commanding button 556 is clicked after input of a prescribed keyword to the input region 555 of the dialog box 554, the search engine program that is installed in the money gate 500 searches the above-mentioned search keyword storing part for corresponding on-line shops 400 based on the input keyword and establishes a state that the user 200 can be linked to the pages of retrieved on-line shops 400 (second automatic accessing part). As shown in FIG. 9, an example of the link-possible state is such that a list of retrieved on-line shops 400 is displayed in the shop display space 551. The name 552 and the link information 553 of each retrieved on-line shop 400 are displayed in the shop display space 551. Another example of the link-possible state is such that if only one on-line shop 400 is retrieved, the user is automatically linked to the page of the retrieved on-line shop 400. In this case, when the user 200 accesses the page of a prescribed on-line shop 400 actively or passively, the on-line shop 400 may belong to a mall-operating company 300 where the user is not registered. In this case, according to a method in which the user 200 accesses the collect server 510 (described later), the user 200 can browse the page of the on-line shop 400 that is managed by the mall-operating company 300 where the user 200 is not registered and do shopping on the page. The details of such processing will be described later.

Descriptions will be made below separately of selling of an article and selling of a digital content.

1) Sale of an Article

A flow of a case where a user 200bj who is registered as a member of a mall-operating company 300b having mall B in the on-line shopping system 100 shown in FIG. 7 buys a commodity in a shop 400ai of mall A will be described below with reference to FIGS. 7–18. It is assumed that the mall-operating company 300b having mall B does not know information necessary for settlement such as a credit card number of the user 200bj.

When the user 200bj who is a member of mall B goes to the on-line shop 400ai (first site, selling site) of mall A for shopping on the net and finds a commodity that he wants to buy, the user 200bj opens an order sheet 802 by clicking, for example, a shopping basket object 801 as shown in FIG. 12 and makes an order by sequentially inputting pieces of information to the order sheet 802. Although the user 200bj is not a member of mall A, by designating a prescribed ID that is registered in mall B where he is registered as a member the user 200bj can pay using a credit card that is registered in the mall-operating company 300b (second site, authentication site) of mall B in the same manner as the members of mall A do, in other words, in the same manner as the user 200bj buys a commodity in a shop of mall B.

For example, to designate the prescribed ID, the user 200bj accesses the collect server 510 of the money gate 500 and makes an order by using a collect for the mall-B members (processing P1). Specifically, an object such as an object 803 shown in FIG. 12 is opened and dropped into a portion of the order sheet 802 where to write a mall-A member ID for payment. Information relating to the mall ID etc. of the user 200bj is linked to the object 803. The manipulation of dropping the object 803 into the portion of the order sheet 802 where to write a mall-A member ID for payment is equivalent to inputting the mall ID of the user 200bj there.

As shown in FIG. 4, the URLs of the other malls, IDs (money gate IDs) to be used in using those malls, and other information are listed in the collect server 510 for the members of each mall. Therefore, the above manipulation causes the money gate ID of mall B to be written in the space of the order sheet 802 for input of the ID of a person to pay.

Another example method for inputting the prescribed ID is such that the user 200 is caused to input the user ID for the mall-operating company 300 where the user 200 is registered. In this case, it is necessary that a list that correlates user IDs with mall-operating companies 300 etc. in which those user IDs are registered be stored in the collect server 510 or the like.

Finally, for example, the user 200bj pushes an order button, whereupon an order is given to the shop 400ai.

The shop 400ai of mall A that has been given the order for the commodity generates order data including order information such as the ID and the mail address of the buyer, a price, etc., and sends the order data to the mall-operating company 300*a* of mall A (processing P2). In this embodiment in which the member of mall B buys the commodity in the shop 400*ai* of mall A via the money gate 500, the ID in the order data is the money gate ID for the mall-B members that is set in the collect server 510 of the money gate 500 as money gate user registration information shown in FIG. 2.

Upon reception of the order data from the shop 400*ai*, the mall-operating company 300*a* of mall A registers the order information in a database and determines an order number (processing P3). Particularly in the case of sale of an article, a confirmation mail 804 as shown in FIG. 13 in which order information, an order number (acceptance number), a confirmation URL, etc. are written is sent to the user 200*bj* processing P4; user managing part).

Upon reception of the confirmation mail, the user 200*bj* makes access to the specified confirmation UR.L (processing P5).

Figure 14:
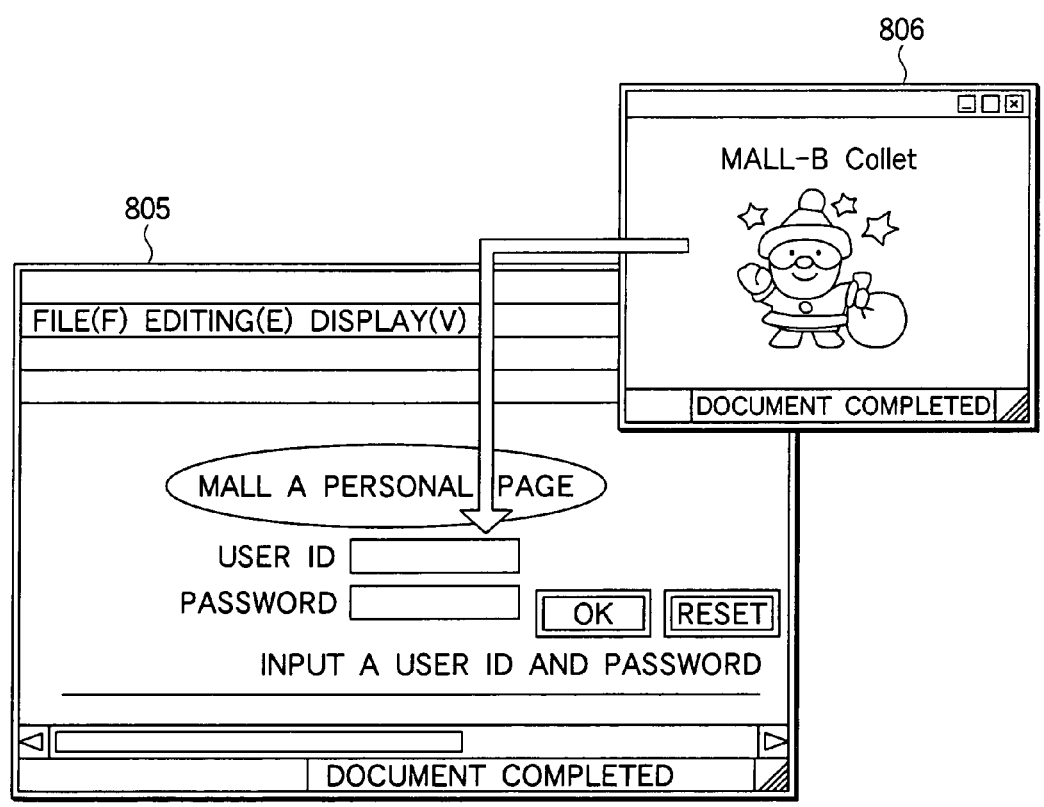

For example, also in the processing of making access to the confirmation URL, the user 200*bj* accesses the collect server 510 of the money gate 500 and makes an order using the collect for the mall-B members. Specifically, in a state that input of a user ID is requested by part of an access acceptance picture 805 as shown in FIG. 14, the user 200*bj* writes the money gate ID for the mall-B members by opening the collect object 806 and dropping it into a portion where to input an ID. Another example is such that the user 200*bj* inputs the member user ID for mall B by, for example, inputting a value.

Figure 15:
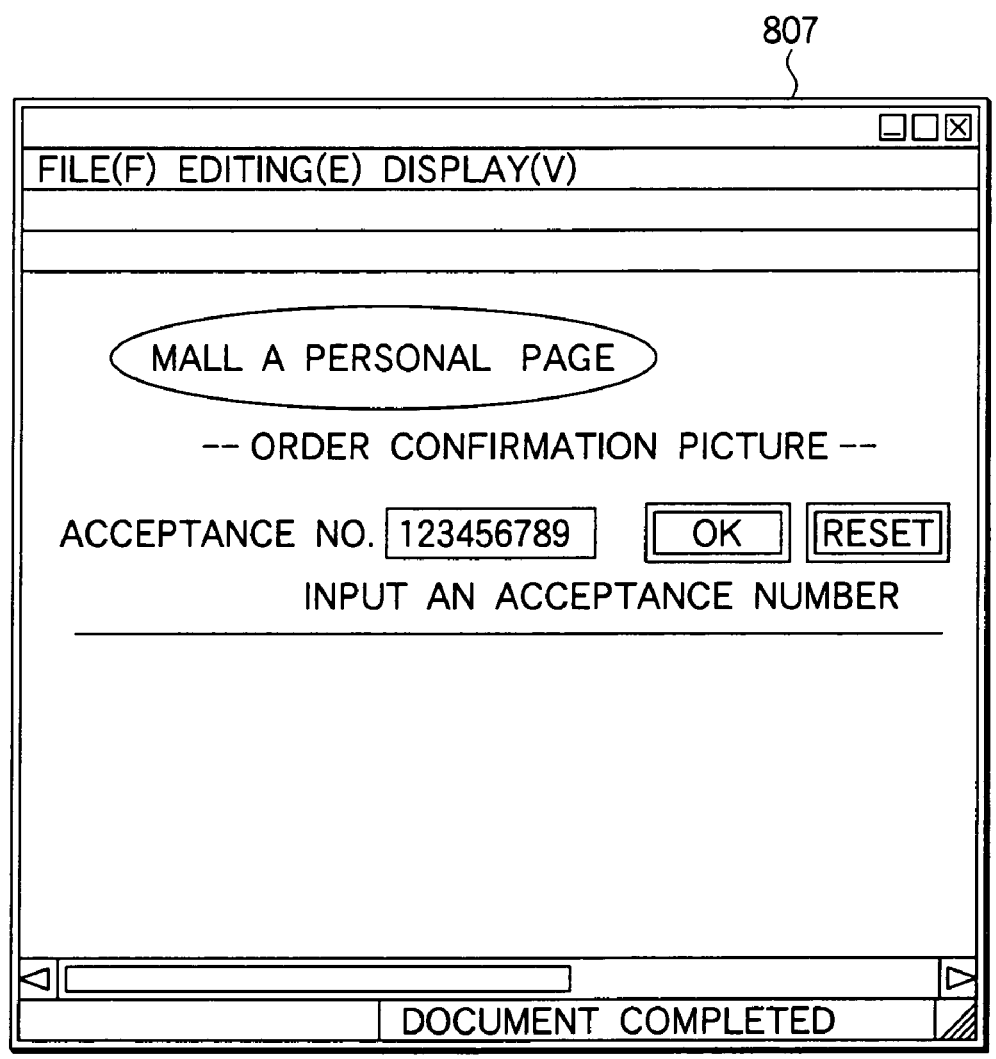

After making access to the confirmation URL, the user 200*bj* inputs the acceptance number (order number) to a picture 807 as shown in FIG. 15 and checks the contents of his order on a picture 808 as shown in FIG. 16. If there is no problem, the user 200*bj* selects a button 809 for buying and confirmation is thereby made (processing P6).

Upon having the order confirmed by the user 200*bj*, the mall-operating company 300*a* sends the money gate 500 order data containing the ID, the order number, the IP address of the user 200*bj*, the order information, etc. (processing P7).

Upon reception of the order data, the money gate 500 registers the received order data in the order management server 520 (processing P8). In this registration, the order data is recorded according to a data format that is used in requesting a card company 600 or the like to perform authorization processing. To this end, the credit card number of the user 200*bj* is necessary. At this time point, the dummy credit card number as shown in FIG. 2 that is set in the money gate user registration information is recorded.

Figure 17:
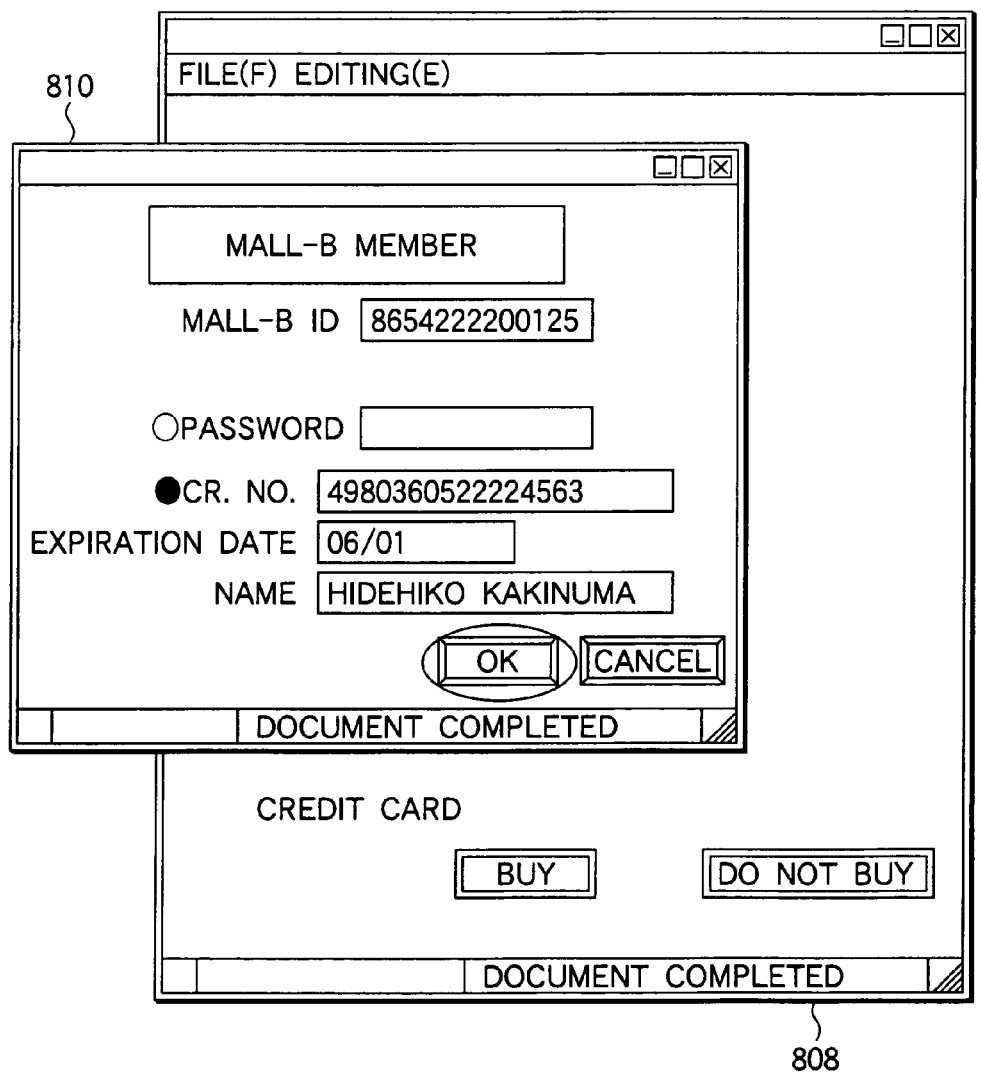

After recording the order data, the money gate 500 instructs the mall-operating company 300*b* of mall B where the user 200*bj* is registered as a member to open, in the user 200*bj*, a Web picture for input of an ID and a credit card number for mall B and to obtain the ID and the credit card number (processing P9). At this time, to enable the information of the user 200*bj* to be obtained and the order data to be correlated with each other, the money gate 500 sends the information of the order number (acceptance number) to the mall-operating company 300*b* of mall B. Based on this information, the mall-operating company 300*b* of mall B opens, in the user 200*bj*, a picture 810 as shown in FIG. 17 that requests input of an ID and a credit card number (processing P10). As a result, in the user 200*bj*, the object 810 that requests input of an ID and a credit card number is displayed on the picture 808 that requests confirmation of the order contents in such a manner that the user 200*bj* would not easily become aware that the pictures 808 and 810 are opened by different mall-operating companies. The reason for requesting the user 200*bj* to input a credit card number via the object 810 is that the mall-operating company 300*b* of mall B where the user 200*bj* is registered as a member does not know information necessary for settlement such as a credit card number of the user 200*bj*.

When the user 200*bj* inputs an ID, a password, etc. and confirms those on the picture 810, a result is sent to the mall-operating company 300*b* of mall B that opened the picture 810 (processing P11).

Based on the received result, the mall-operating company 300*b* of mall B sends, to the money gate 500, information necessary for requesting a card company 600 to perform authorization processing such as the number and expiration date of the credit card of the user 200*bj*, his member state, etc., the ID for mall B, the IP address, and the order number that was sent previously from the money gate 500 (processing P12).

The money gate 500 searches for and extracts corresponding order data that was previously recorded in the order management server 520 based on the order number that has been sent from the mall-operating company 300*b* of mall B. The money gate 500 registers the data that has been sent from the mall-operating company 300*b* of mall B by replacing the dummy credit card number that is set in the order data with the regular credit card number of the user 200*bj* that has been sent from the mall-operating company 300*b* of mall B (processing P13; payment information acquiring part).

Then, by using the order data in which the regular credit card number is set, the money gate 500 requests a card company 600 to perform authorization processing (processing P14). The card company 600 performs authorization processing in response to the request and sends back an authorization notice to the money gate 500 if everything is proper (processing P15).

Based on the received authorization result, the money gate 500 sends, to the mall-operating company 300*a* of mall A, data to the effect that the order is approved (processing P16).

A function of the settlement processing part is performed by the above processing.

Based on the received information, the mall-operating company 300*a* of mall A again performs order-responsive processing that is the same as order-responsive processing for an order that is processed without intervention of the money gate 500 (processing P17). Based on the order-responsive processing, the mall-operating company 300*a* again requests the money gate 500 to perform authorization processing (processing P18).

In response to the authorization request from the mall-operating company 300*a* of mall A, the money gate 500 sends back the authorization notice that was received from the card company 600 (processing P19).

Figure 18:
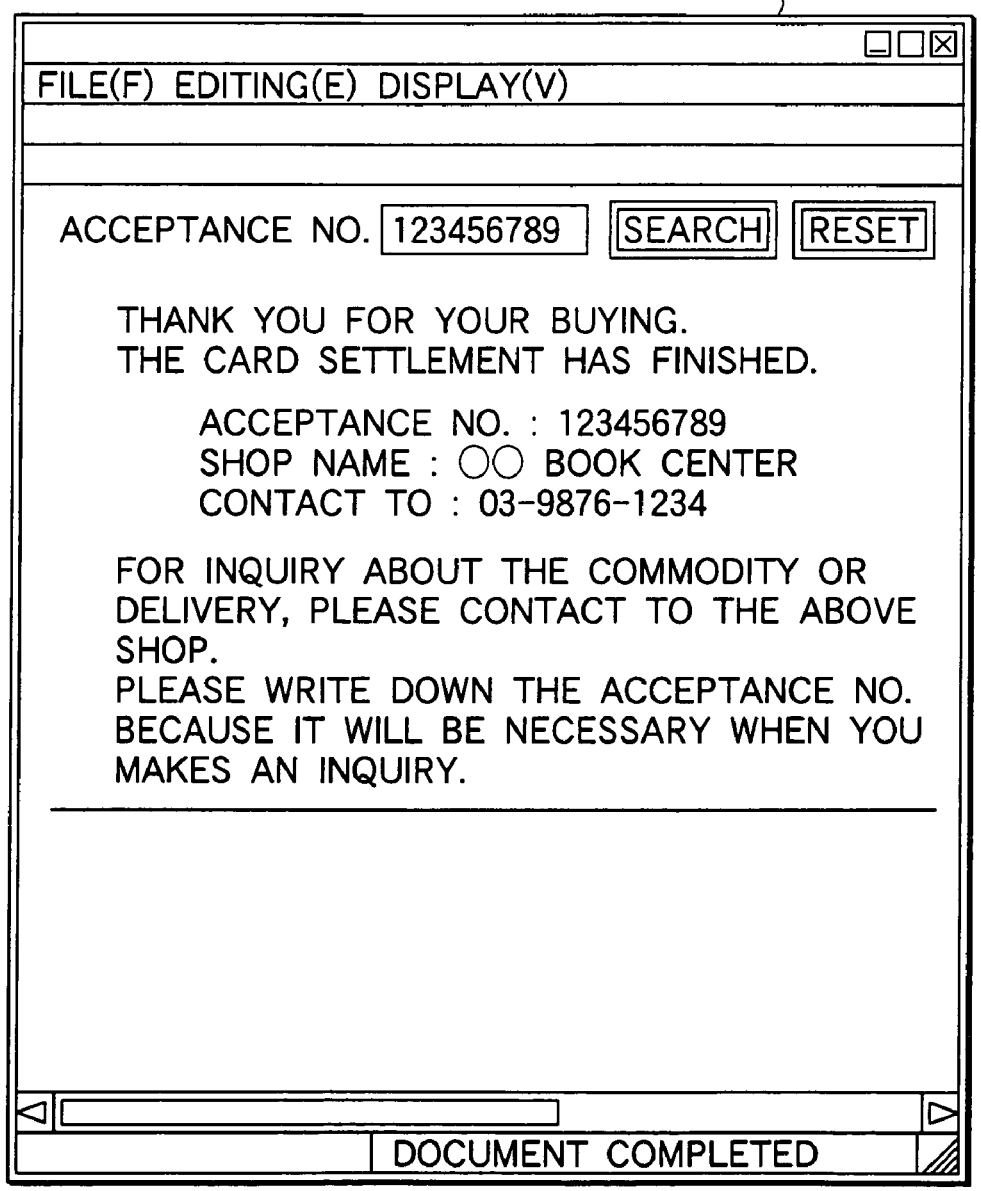

Upon reception of the authorization notice from the money gate 500, with a judgment that the order reception has completed, the mall-operating company 300*a* of mall A informs the user 200*bj* of the authorization result and the completion of processing via, for example, an object as shown in FIG. 18 (processing P20) and issues sale approval and a shipment request to the shop 400*ai* (processing P21).

As described above, in this system, there is a deviation between the time point when the money gate 500 requests the card company 600 to perform authorization processing (processing P14) and the time point when the money gate 500 sends back an authorization notice in response to a request from the mall-operating company 300b (processing P19). The reason is as follows. When a member of mall A does shopping in mall A without intervention of the money gate 500, after the user confirms the order contents mall A requests a card company 600 to perform authorization processing. To make matching with this processing, the money gate 500 sends an order approval notice to mall A based on an authorization notice from the card company 600 (processing P16) and sends back an authorization notice after an authorization request is sent from mall A based on the order approval notice (processing P18).

The reason for making an authorization request after a user confirms the contents of an order is to prevent erroneous order reception due to an erroneous manipulation by a user and erroneous shipment due to an order made by a person who pretends a true user (refer to Japanese Unexamined Patent Publication No. Hei. 10-289267 of the present assignee). However, since this measure is not indispensable for on-line shopping, where mall A does not employ the above order contents confirmation system, the money gate 500 may request the card company 600 to perform authorization processing upon recognizing the credit card number of the user 200bj and send pack an authorization result in response to an authorization request from mall A.

Upon reception of the shipment request, the shop 400ai ships the commodity to the user 200bj processing P22) and sends shipment information to the mall-operating company 300a of mall A (processing P23).

The mall-operating company 300a of mall A stores the shipment information received from the shop 400ai (pieces of shipment information are accumulated). The mall-operating company 300a generates sales data containing the dummy credit card number, the amount of money of the sale, and the authorization number and sale use detailed data containing the order number, the commodity name, and the amount of money in time for the closing day (e.g., the last day of each month) (processing P24) and sends those data to the money gate 500 (processing P25).

The money gate 500 converts the dummy credit card number data in the received sales data into the actual credit card number data (processing P26), and sends the card company 600 charging data that contains the credit card number, the commodity name, and the amount of money (processing P27).

Based on the charging data, the card company 600 charges the user 200bj for the use of the card en bloc on a prescribed day of each month (processing P28). For example, the card company 600 is paid from a bank account on a designated day (processing P29).

Upon being paid by the user 200bj, the card company 600 deducts a prescribed commission from the paid money (processing P30) and pays the money gate 500 the remaining money (processing P31).

The money gate 500 deducts its own commission from the money paid by the card company 600 (processing P32), pays the mall-operating company 300a of mall A prescribed mall operating company commission (processing P33), pays the mall-operating company 300b of mall B a commission of a prescribed percentage for member introduction (processing P34), and pays the shop 400ai of mall A the remaining money (processing P35).

The above is all the processing relating to the user 200bj's buying the desired article in the shop 400ai of mall A where he is not registered.

2) Sale of a digital content Next, with reference to FIG. 19, a description will be made a flow of processing that is performed when, for example, as in the above case, a user 200bj who is registered as a member of a mall-operating company 300b having mall B does shopping in a shop 400ai of mall A in the on-line shopping system 100 shown in FIG. 7. In this case, in particular, the user 200bj buys a digital content.

a) Case Where the Authentication Site Does not Know a Credit Card Number of a User First, a description will be made of a case where the mall-operating company 300b having mall B and to serve as an authentication site (second site) does not know information necessary for settlement such as a credit card number of the user 200bj.

The processing that is performed when a digital content is bought is basically the same as in the above-described processing that is performed when an article is bought. However, the former is different from the latter in that it is not necessary to confirm order reception by mail in the case where a digital content is distributed over the network 700. That is, the transmission of a confirmation mail to the user 200bj processing P4) and the access of the user 200bj in response to it (processing P5) that are performed by using, for example, the pictures shown in FIGS. 13–15 are not necessary.

Figure 19:
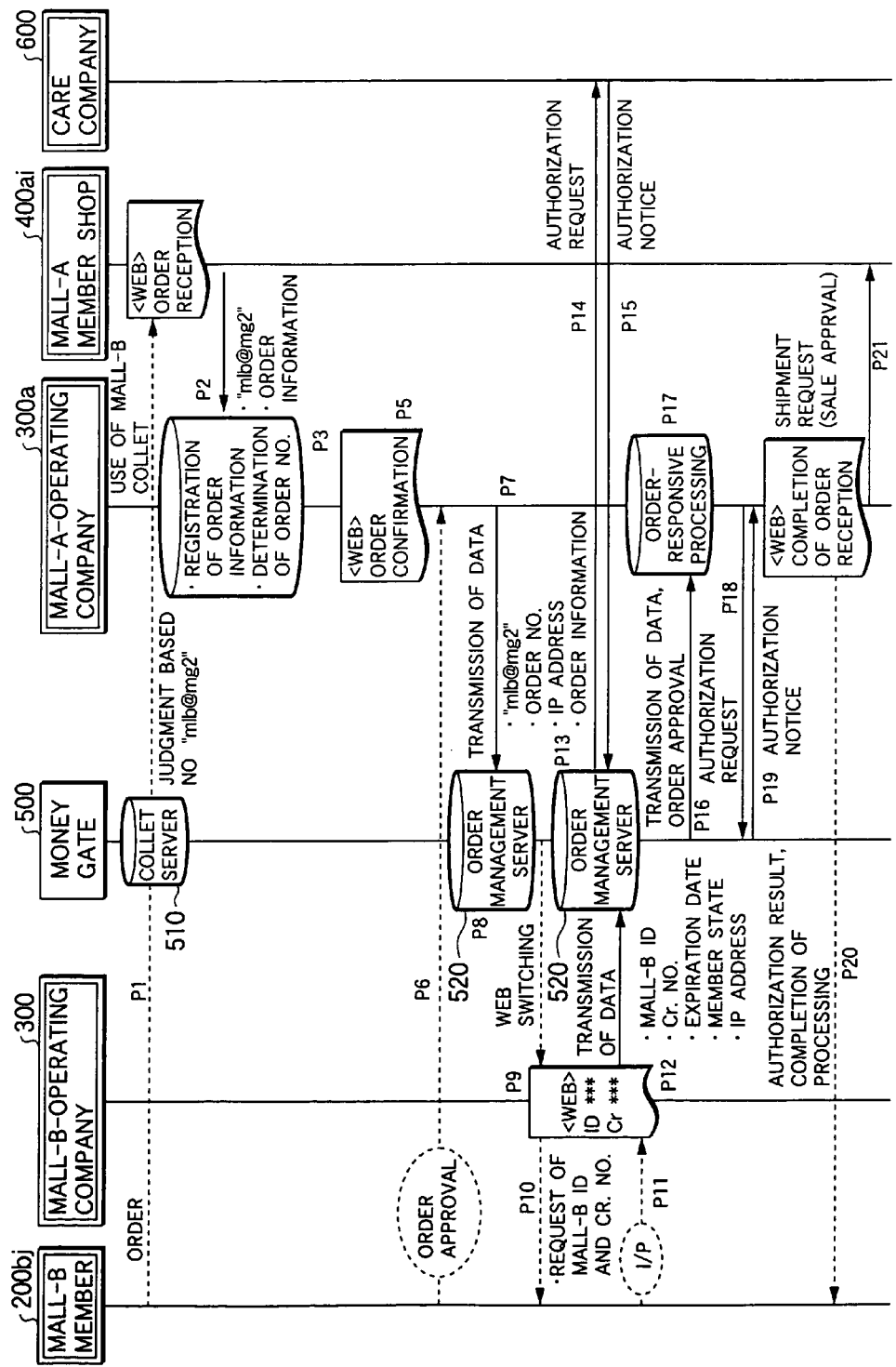
FIG. 19 is a schematic diagram a flow of processing that is performed when a user buys a digital content in a shop of a mall other than the mall where he is registered in the on-line shopping system of FIG. 7.
Figure 20:
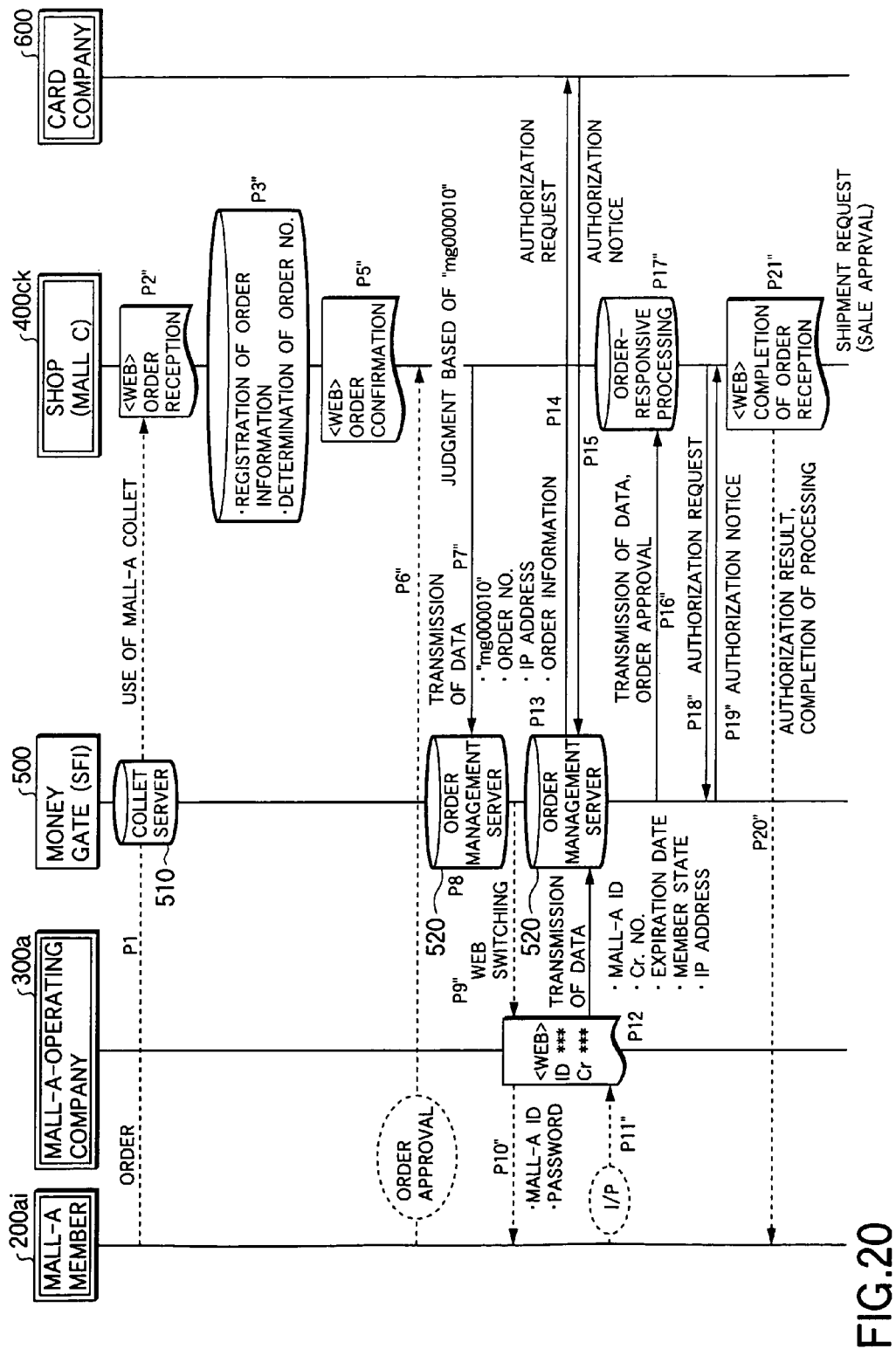
FIG. 20 is a schematic diagram a flow of processing that is performed when a user buys an article in a shop that performs settlement processing independently in the on-line shopping system of FIG. 7.

Therefore, as shown in FIG. 19, after the user 200bj makes an order to the shop 400ai by using the collect for the members of mall B of the collect server 510 of the money gate 500 or inputting the member user ID for mall B (processing P1), the shop 400ai of mall A that has received the order of a commodity sends the ID and the mail address of the buyer and order information (or the user ID) to the mall-operating company 300a (processing P2), and the mall-operating company 300a of mall A registers the order information and determines an order number (processing P3), an order confirmation picture 808 as shown in FIG. 16 is displayed immediately to the user 200bj processing P5').

The user 200bj checks the contents of his own order while looking at the picture 808. If there is no problem, the user 200bj selects a bottom 809 for buying and the order is thereby approved (processing P6').

The subsequent processing after the processing P7 that the mall-operating company 300a of mall A that has received the order confirmation from the user 200bj sends order data containing the order information to the money gate 500 is the same as in the case of buying a commodity that was described above with reference to FIGS. 10–18.

The above processing is preferable when the user 200bj buys a digital content in the shop 400ai of mall A where he is not registered.

b) Case Where the Authentication Site Knows a Credit Card Number of a User

Next, with reference to FIGS. 7 and 20–26, a description will be made of a case where a user 200ai who is registered as a member of a mall-operating company 300a having mall A buys a commodity in a shop 400ck that performs settlement processing directly. In this case, the mall-operating company 300a having mall A and to serve as an authentication site (second site) knows information necessary for settlement such as a credit card number of the user 200ai. The mall-operating company 300a having mall A is under contract with card companies 600 independently.

As shown in FIG. 7, it is assumed that the shop 400ck is established by the mall-operating company 300c of mall C. However, the mall-operating company 300c of mall C is not involved in any order reception or settlement relating to each shop of mall C and merely provides a site on the Internet 700 to the shops.

Also in on-line shopping in the above form, the processing is performed according to basically the same procedure as in each of the above-described cases.

First, the user 200ai who is a member of mall A enters the site of the shop 400ck by using the collect for the members of mall A of the collect server 510 of the money gate 500 (processing P1).

Figure 21:
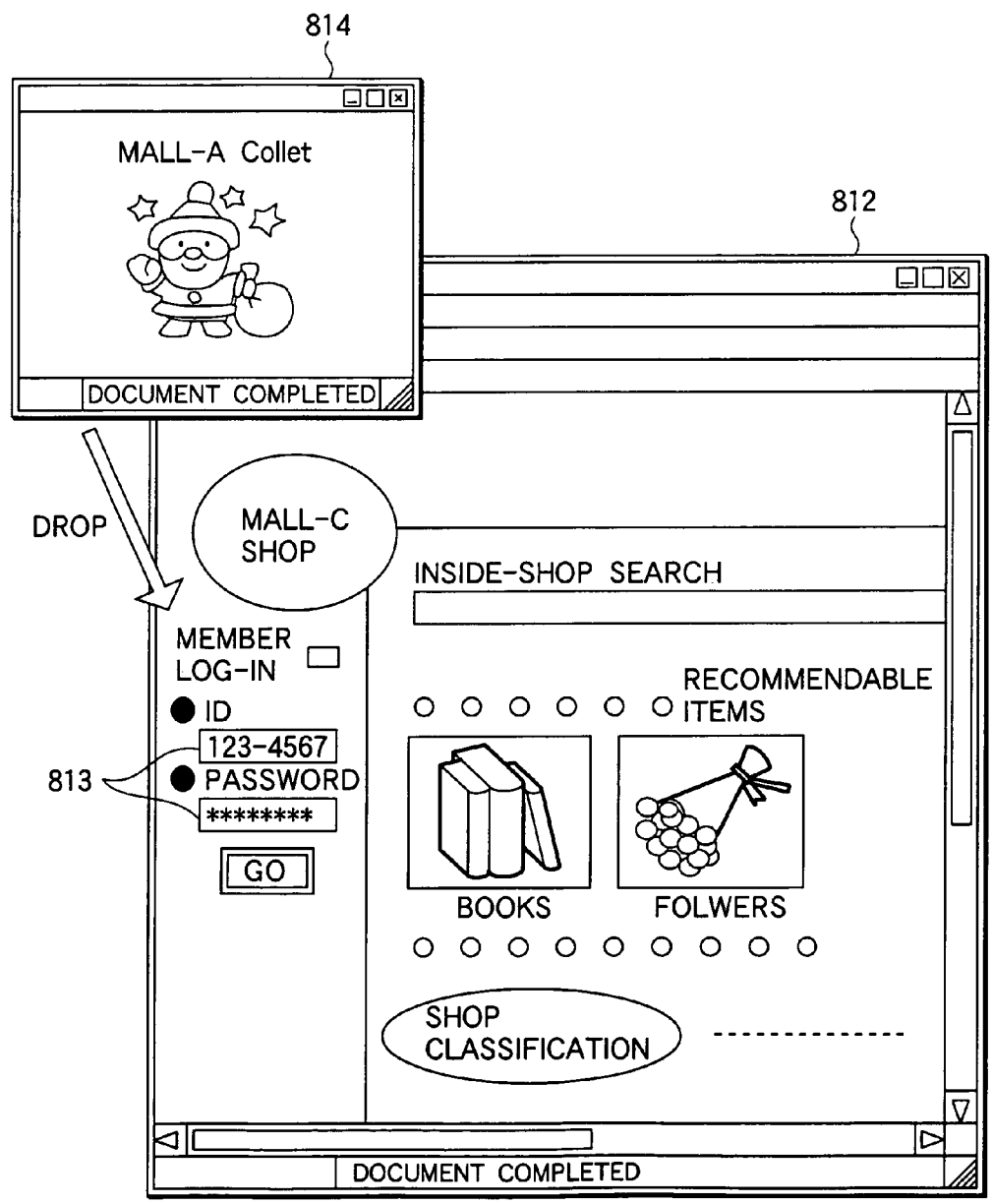
Figure 22:
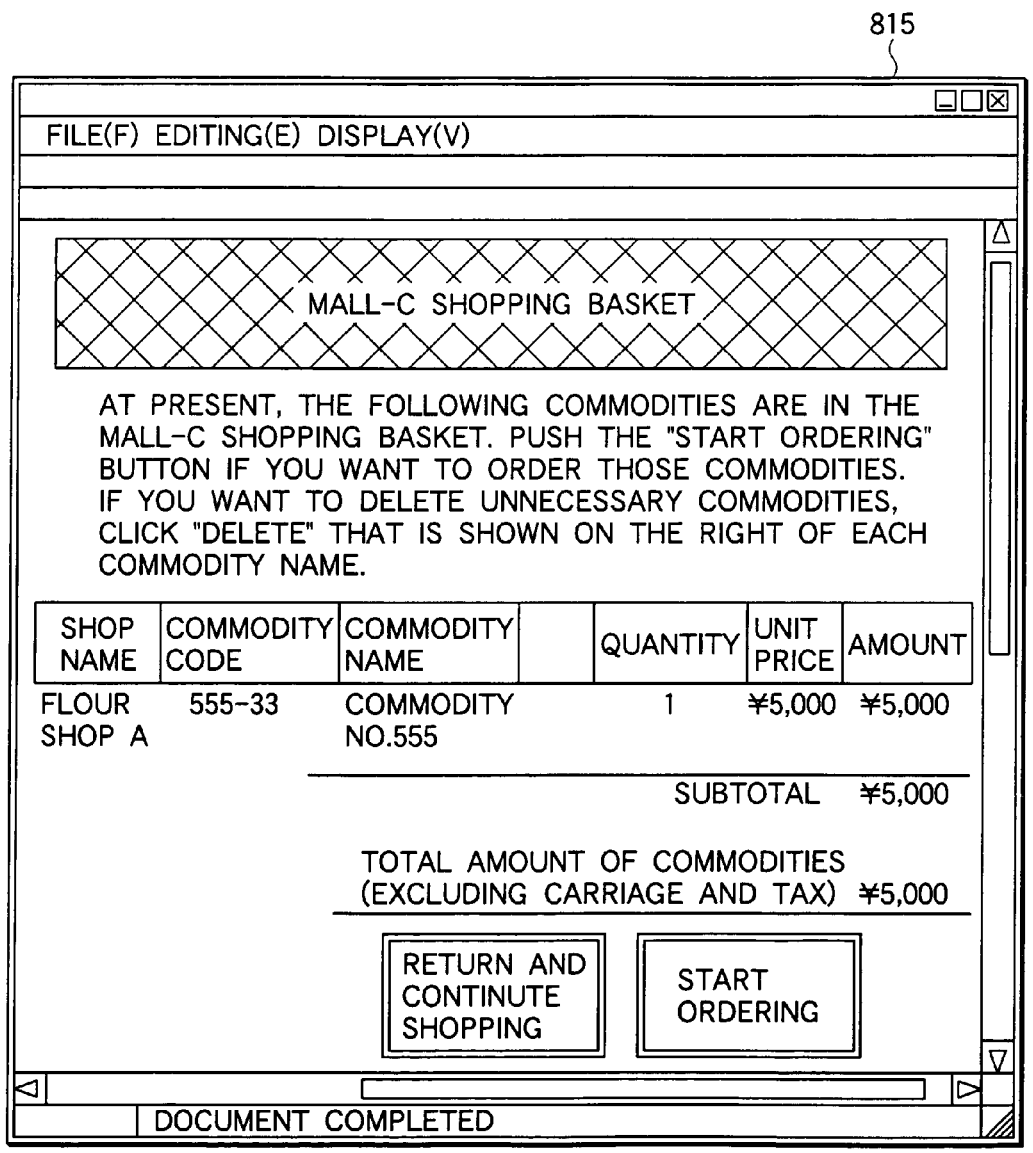

Specifically, the user 200ai opens, for example, an object 814 as shown in FIG. 21 and drops it into, for example, portions 813 where to input an ID and a password that are provided in a homepage 812 of the shop 400ck. As shown in FIG. 4, the URLs of the other malls, IDs (money gate IDs) to be used in using those malls, and other information are stored in the collect server 510 for the members of each mall. Therefore, the above manipulation causes the money gate ID and the password of mall A to be written in the spaces 813 of the homepage 812 for input of an ID and a password, whereby the user 200ai is rendered accessible to the site of the shop 400ck.

Another method is possible in which the user 200ai who is a member of mall A enters the site of the shop 400ck by using the member user ID for mall A (processing P1).

After entering the site of the shop 400ck, the user 200ai does shopping using such a function as is called a shopping basket 815 (see FIG. 22) while browsing one after another commodities that are introduced in the homepage. Finally, the user 200ai opens, for example, an order sheet 816 as shown in FIG. 23 and makes an order using it (processing P'''). At this time, for example, a window 817 as shown in FIG. 23 for selection of an ordering method and a payment method is displayed (payment method input displaying part). To select payment via the money gate 500, the user 200ai selects an item "Shopping Switch" in the window 817. With the selection of the use of the money gate 500, the following processing is performed.

Upon reception of the above order, the shop 400ck generates order data, registers it in a database, and determines an order number (processing P3").

Figure 24:
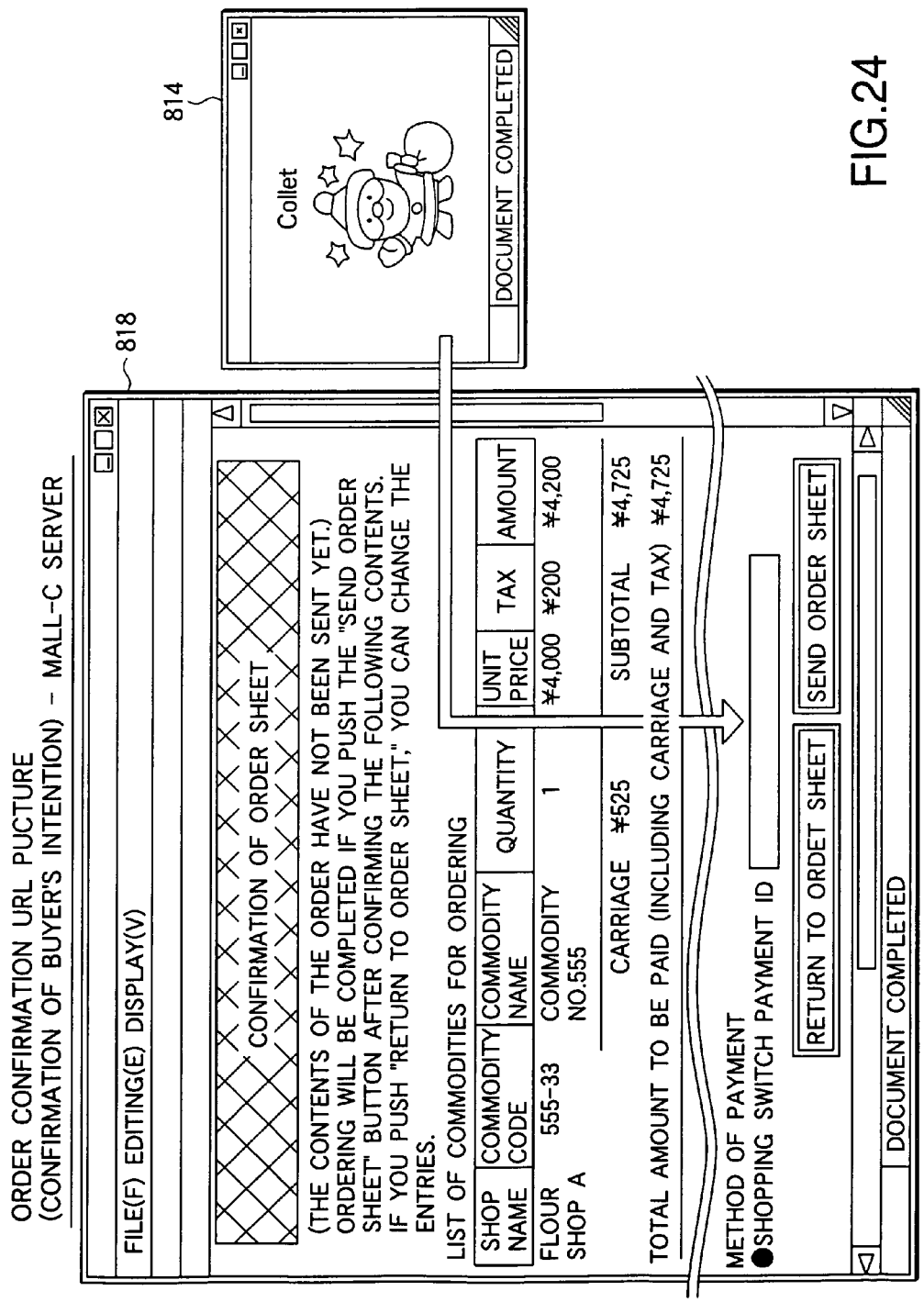

Particularly in the case of the sale of an article, the shop 400ck immediately presents an order sheet confirmation picture 818 as shown in FIG. 24 to the user 200ai and requests confirmation of the order (processing P5").

The user 200ai checks the contents of his order while looking at the picture 818. If there is no problem, the user 200ai calls the collect object 814 in the same manner as when it entered the current site and drops the collect object 814 into a portion 819 for input of an ID and thereby inputs where the ID there. Further, the user 200ai selects a button 820 for transmission of an order and the order is thereby approved (processing P6").

Upon having the order confirmed by the user 200ai, the shop 400ck sends the money gate 500 order data containing the ID, the order number, the IP address of the user 200ai, and the order information (processing P7").

The money gate 500 registers the received order data in the order management server 520 (processing P8). Then, the money gate 500 instructs the mall-operating company 300a of mall A where the user 200ai is registered to open a Web picture 821 for input of the ID and the password of the user 200ai for mall A and to obtain the ID and the password (processing P9'). At this time, to enable the information of the user 200ai to be obtained and the order data to be correlated with each other, the money gate 500 sends the information of the order number (acceptance number) to the mall-operating company 300a of mall A.

The reason for not requesting the user 200ai to input information necessary for settlement such as a credit card number is that the mall-operating company 300a of mall A can recognize the credit card number etc. of the user 200ai.

Figure 25:
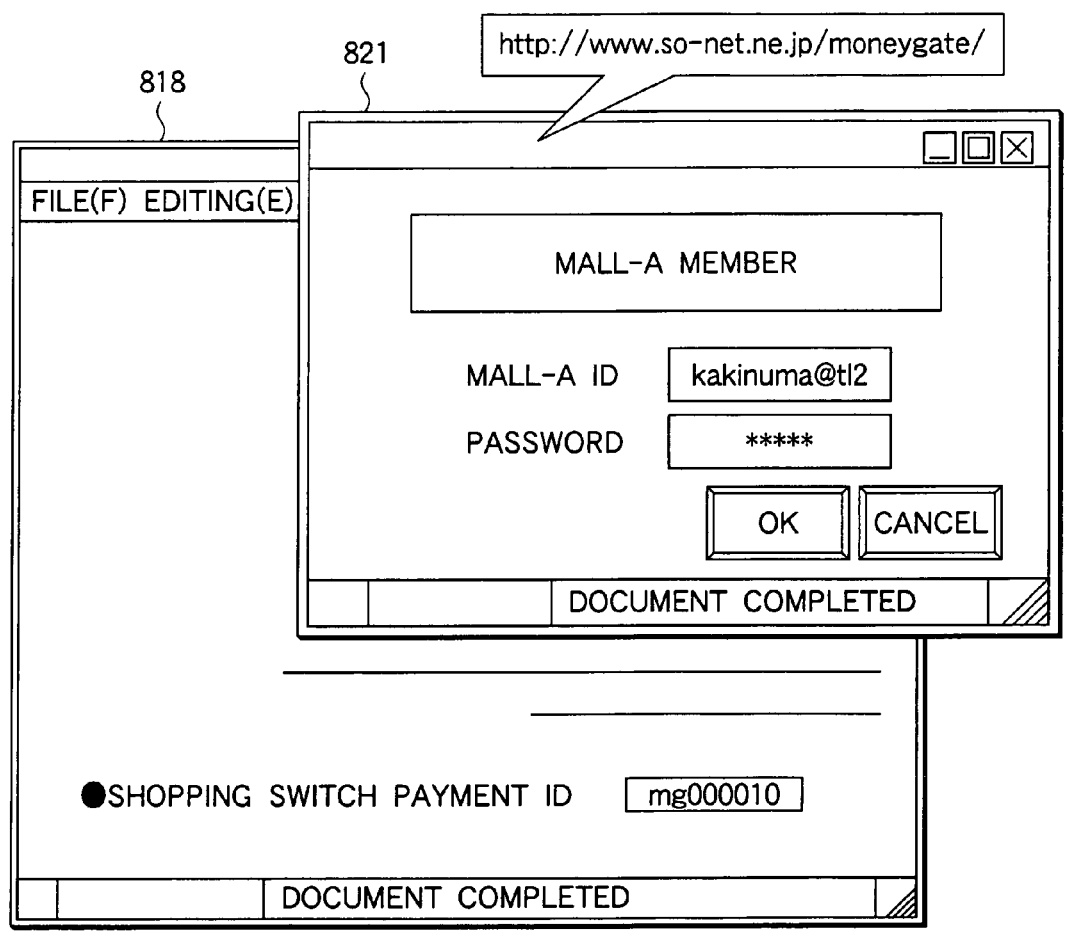

Based on the above information, the mall-operating company 300a of mall A opens, in the user 200ai, a picture 821 as shown in FIG. 25 that requests input of an ID and a password (processing P10 II). As a result, in the user 200ai, the object 821 that requests input of an ID and a password is displayed on the picture 818 that requests confirmation of the order contents in such a manner that the user 200ai would not easily become aware that the pictures 818 and 821 are opened by different mall-operating companies.

When the user 200ai inputs an ID and a password on the picture 821, a result is sent to the mall-operating company 300a of mall A (processing P11' I). Based on the received result, the mall-operating company 300a of mall A sends, to the money gate 500, information necessary for requesting a card company 600 to perform authorization processing such as the number and expiration date of the credit card of the user 200ai, his member state, etc., the ID for mall A, the IP address, and the order number that was sent previously from the money gate 500 (processing P12).

The money gate 500 searches for and extracts corresponding order data that was previously recorded in the order management server 520 based on the order number that has been sent from the mall-operating company 300a of mall A. The money gate 500 registers the data that has been sent from the mall-operating company 300a of mall A by replacing the dummy credit card number that is set in the order data with the regular credit card number of the user 200ai that has been sent from the mall-operating company 300a of mall A (processing P13).

Then, the money gate 500 requests a card company 600 to perform authorization processing (processing P14). The card company 600 performs authorization processing in response to the request and sends back an authorization notice to the money gate 500 if everything is proper (processing P15).

Another example is as follows. Since the mall-operating company 300a of mall A has settlement contracts with the card companies 600 independently, settlement may be performed with one of those card companies 600 that is under contract with the mall-operating company 300a of mall A. In this case, neither the processing P14 that the money gate 500 requests the card company 600 to perform authorization processing nor the processing P15 that the card company 600 performs authorization processing in response to the request and sends back an authorization notice to the money gate 500 if everything is proper is performed. That is, the mall-operating company 300a of mall A performs authorization requesting processing and authorization notice reception processing. For example, the mall-operating company 300a may request the card company 600 to perform authorization processing at a time point that is after the user 200ai inputs an ID and a password on the picture 821 and a result is sent to the mall-operating company 300a of mall A (processing P11"). As a result, the card company 600 performs authorization processing and sends back an authorization notice to the mall-operating company 300a if everything is proper. The mall-operating company 300a informs the money gate 500 of credit approval for the user 200ai, that is, an authorization notice. Based on the received authorization result, the money gate 500 sends, to the shop 400ck, data to the effect that the order is approved (processing P16). Based on the received information, the shop 400ck again performs order-responsive processing that is the same as order-responsive processing for an order that is processed without intervention of the money gate 500 (processing P17″). Based on the order-responsive processing, the shop 400ck again requests the money gate 500 to perform authorization processing (processing P1811).

In response to the authorization request from the shop 400ck, the money gate 500 sends back the authorization notice that was received from the card company 600 (processing P19).

With a judgment that the order reception has completed, the shop 400ckinforms the user 200ai of the authorization result and the completion of processing via, for example, an object 822 as shown in FIG. 26 (processing P2011) and issues sale approval and a shipment request by itself (processing P21″).

The processing after the shipment of the commodity (processing P22) is performed in the same manner as in the example that was described above with reference to FIG. 11 (with an exception that the mall-operating company is replaced by the shop 400ck). Because of the involvement of the shop 400ck, the processing P33 of distributing a commission to the mall operating company 300c of mall C is not necessary.

With the above processing, the user 200ai can buy commodities in, rather than a mall, the shop 400ck that directly perform settlement processing even if he is not registered in the shop 400ck.

In the above example, it is desirable that the right to determine what should perform settlement, that is, which of the shop 400ck, the money gate 500, and the mall-operating company 300a should perform settlement, be given to the user 200ai. For example, a practicable method for giving the user 200ai the selection right is to allow the user 200ai to make a selection in the window 817 shown in FIG. 23 for selection of an ordering method and a payment method.

(3) Inter-site Communication

Next, inter-site communication processing will be described with reference to FIGS. 27–35.

First, Table 1 shows modes of use of inter-site interfacing As shown in Table 1, there are three modes that are a basic mode of the money gate 500, a shopping switch reception service use mode, and a mail ordering mode. These modes are outlined in Table 1.

mode of the money gate 500 and the shopping switch reception service use mode will be described below with reference to FIGS. 27–35.

The inter-site interfacing in order reception processing varies depending on the order reception site, that is, the mall-operating company 300 and the on-line shop 400. Specifically, there are two cases, that is, a case where a registered company site (e.g., a mall-operating company 300) that is registered in the money gate 500 and a selling site (e.g., an on-line shop 400) that provides an actual shopping service to a user 200 are the same and a case where they are different from each other. A typical example of the latter case is that a registered company site is an Internet service provider (ISP). In view of the above, each of the basic mode of the money gate 500 and the shopping switch reception service use mode will be described below for the two cases, that is, the case where a registered company site and a selling site are the same and the case where they are different from each other. That is, four modes will be described below.

Figure 27:
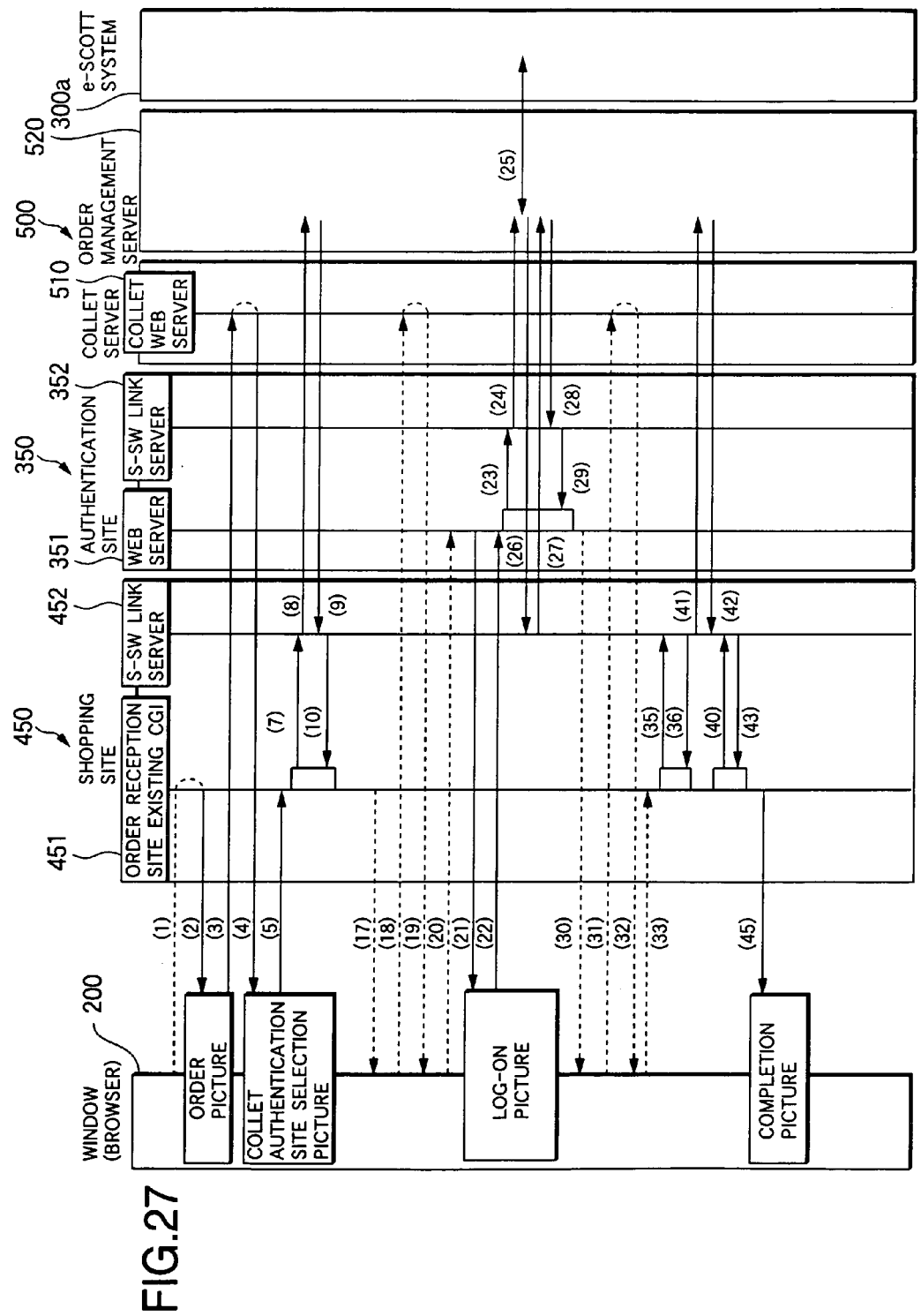
FIG. 27 is a flowchart showing a flow of inter-site communications in a case where a registered company site and a selling site are the same in a money gate basic mode.

FIG. 27 is a flowchart showing a flow of inter-site communications in a case where a registered company site and a selling site are the same in the basic mode of the money gate 500. FIG. 28 is a flowchart showing a flow of inter-site communications in a case where a registered company site and a selling site are different from each other in the basic mode of the money gate 500. FIG. 29 is a flowchart showing a flow of inter-site communications in a case where a registered company site and a selling site are the same in the shopping switch reception service use mode. FIG. 30 is a flowchart showing a flow of inter-site communications in a case where a registered company site and a selling site are different from each other in the shopping switch reception service use mode. FIGS. 31–35 show formats of e-mail that is exchanged between sites by inter-site communication.

1) Inter-site Communication in a Case Where a Registered Company Site and a Selling Site are the Same in the Money Gate Basic Mode First, as shown in FIG. 27, an actual system is such that a shopping site (first site, selling site) 450 and an authenti-

TABLE 1

| No. | Type | Outline | Remarks |
|-----|------|---------|---------|
| 1 | Money gate basic mode | A basic use mode recommended by the money gate S-SW. The money gate S-SW is used by incorporating the money gate S-SW API into an existing order processing system. | |
| 2 | S-SW reception service use mode | A mode in which the money gate S-SW is used by setting the processing destination of an ordering picture to a money gate S-SW reception service. Although influence on an existing ordering processing system can be made small, control is passed to the existing ordering processing system after authorization processing is finished on the money gate side. Even where this mode is selected, part of the money gate S-SW API is used. | |
| 3 | Mail ordering mode | A use mode of a shopping site that performs order confirmation by mail. The money gate S-SW is used by incorporating the money gate S-SW API into an existing order processing system. | |

Among those three modes, the mail ordering mode is such that order confirmation is performed by mail but settlement processing is not performed using communication. Therefore, the mail ordering mode will not be described. The basic cation site (second site) 350, each of which is a mall-operating company 300 or an on-line shop 400, are provided with not only an order reception site 451 and a Web server 351, respectively, for enabling their intrinsic functions but also shopping switch link servers 452 and 352, respectively, that cooperate with a money gate 500. In each of the above modes, a system 300a corresponding to the mall-operating company 300a shown in FIG. 7 cooperates with the sites and servers. As described above, the mall-operating company 300a itself is under contract with a number of card companies 600. And the mall-operating company 300a provides operation that enables, for the on-line shops 400 as members shops and the mall-operating companies 300, settlement by the contracted card companies 600 without their having to contract with the card companies 600 by themselves. Specifically, when a user 200 requests a credit card transaction at an on-line shop 400 or a mall-operating company 300, the mall-operating company 300a accepts an authorization request for the credit card transaction, requests a card company 600 to perform authorization processing and receives a result, and informs the on-line shop 400 or the like of the result. Further, the mall-operating company 300a collects sales of the on-line shops on a monthly basis, for example, and charges the respective card companies 600.

Inter-site communications will be described below in detail.

There is an assumption that for a user 200 to access the order reception site 451 of the shopping site 450 over the communication network 700 that is the Internet, information for identifying the authentication site 350 where the user 200 is registered as a member is necessary. Therefore, when a request for an order sheet is sent from a user 200 who is accessing the order reception site 451 of the shopping site 450 by inputting information for identifying the authentication site 350 (indicated by symbol (1)), the order reception site 451 sends an order sheet to the user 200 (indicated by symbol (2)). FIG. 31 shows the contents of e-mails of the above processing. As a result, an order picture is provided to the user 200.

The user 200 makes an order on the order picture. At this time, when the user 200 performs collect input or the like, an authentication site information request is sent to the collect server 510 (indicated by symbol (3)). That is, although the authentication site 350 is a site where the user 200 is registered as a member, the number of such sites is not always one; where there are a number of authentication sites 350, there is room for selection by the user 200. Upon reception of the authentication site information request, the collect server 510 provides an authentication site selection picture to the user 200 (indicated by symbol (4)) and gives the user 200 a chance of selecting an arbitrary authentication site 350.

When the user 200 selects a desired authentication site 350 on the authentication site selection picture, an order request is sent to the order reception site 451 (indicated by symbol (5)). The order request contains an authentication registered company customer code that has been specified by the user 200. In response, in the shopping site 450, an order registration request is sent to the shopping switch link server 452 (indicated by symbol (7)). Then, the shopping switch link server 452 sends an order registration request to the order management server 520 of the money gate 500 (indicated by symbol (8)). FIG. 31 shows the contents of e-mails of the above processing.

The following processing is performed thereafter. An order registration response is sent from the order management server 520 to the shopping switch link server 452 (indicated by symbol (9)). An order registration response is sent from the shopping switch link server 452 to the order reception site 451 (indicated by symbol (10)). A collect re-dialing request (order reception) is sent from the order reception site 451 to the user 200 (indicated by symbol (17)). The collect re-dialing request (order reception) contains a money gate ID. However, this money gate ID is an ID that is generated by the collect server 510 for each transaction, and at this stage the identity of the user 200 is not recognized by the money gate ID.

When the user 200 performs collect re-dialing (order reception), an e-mail concerned is sent to the collect server 510 (indicated by symbol (18)). Upon reception of the e-mail of the collect re-dialing (order reception), the collect server 510 sends back an authentication site re-directing request to the user 200 (indicated by symbol (19)). As shown in FIG. 32, this authentication site re-directing request contains the URL of the authentication registered company that was specified by the user 200 in the above processing (5). Using the URL of the authentication registered company, the user 200 sends a log-on request to the Web server 351 of the authentication site 350 that is the authentication registered company having the URL concerned (indicated by symbol (20)). In response, the Web server 351 of the authentication site 350 provides a log-on picture to the user 200 (indicated by symbol (21)).

Provided with the log-on picture, the user 200 inputs information enabling recognition of his identity such as an authentication user ID and a credit number etc. to the logon picture and sends a log-on request to the Web server 351 of the authentication site 350 (indicated by symbol (22)). As a result, authentication processing is performed in the Web server 351. That is, information of the user 200 that is high in secrecy such as the authentication ID and the credit card number etc. is sent online at this stage for the first time. As described above, if the Web server 351 of the authentication site 350 can search for the credit card number of the user 200 using the authentication ID or the like as a key, it is not necessary to send the credit card number at the time of log-on requesting, which further increases the safety.

After performing the authentication processing, the Web server 351 sends an authentication result notice to the shopping switch link server 352 of the authentication site 350 (indicated by symbol (23)). In response, the shopping switch link server 352 of the authentication site 350 sends an authentication result notice to the order management server 520 (indicated by symbol (24)).

Then, the order management server 520 sends an authorization request to the system (e-SCOTT) of the mall operating company 300a (indicated by symbol (25)). In response, the mall-operating company 300a sends an authorization request to a credit card company 600 that is determined for each user 200 and receives an authorization result from the card company 600. The mall-operating company 300a sends back the authorization result to the order management server 520 (indicated by symbol (25)).

Upon reception of the credit card authorization result from the system (e-SCOTT) of the mall-operating company 300a, the order management server 520 sends an authentication result report containing the authorization result to the shopping switch link server 452 that is provided in the shopping site 450 (indicated by symbol (26)). In this manner, the shopping switch link server 452 can recognize whether authorization has been made. Upon reception of the authentication result report containing the authorization result, the shopping switch link server 452 of the shopping site 450 sends an authentication result report containing a result code corresponding to the authorization result to the order management server 520 (indicated by symbol (27)) and informs the order management server 520 whether a sales transaction has been established. In response, the order management server 520 sends an authentication result notification response containing the authorization result and the result code to the shopping switch link server 352 of the authentication site 350 (indicated by symbol (28)). The shopping switch link server 352 sends an authentication result notification response containing the authorization result and the result code to the Web server 351 of the authentication site 350 (indicated by symbol (29)). In this manner, the authentication site 350 can recognize the authorization result and whether a sales transaction has been established.

Then, the Web server 351 of the authentication site 350 sends a collect re-directing request (authentication) to the user 200 (indicated by symbol (30)). In response, collect redirecting (authentication) from the user 200 to the collect server 510 is performed (indicated by symbol (31)). In response, the collect server 510 sends an order reception site re-directing request to the user 200 (indicated by symbol (32)). Redirecting from the user 200 to the order reception site 450 is performed (indicated by symbol (33)).

As a result, in the shopping site 450, an authorization result request (API) (symbol (35)), an authorization result response (API; symbol (36)), an authorization request (API; symbol (40)) are communicated between the order reception site 451 and the shopping switch link server 452. An authorization request (symbol (41)) and an authorization response (symbol (42)) are communicated between the order management server 520 and the shopping switch link server 452 that has received the authorization request (API). The shopping switch link server 452 of the shopping site 450 that has received the authorization response sends an authorization response (API) to the order reception site 451. The order reception site 451 provides a completion picture to the user 200 (indicated by symbol (45)).

With the above series of pieces of processing, even a user 200 who is not registered as a member of the shopping site 450 can do on-line shopping there if he is registered in the authentication site 350.

2) Inter-site Communication in a Case Where a Registered Company Site and a Selling Site are Different from Each Other in the Money Gate Basic Mode First, as shown in FIG. 28, an actual system is such that in addition to a shopping site (first site, selling site) 450 that is a mall-operating company 300 or an on-line shop 400, an order reception registered company site (first site) 360 and an authentication site (second site) 350 are provided. The order reception registered company site 360 serves as an on-line shop managing part for managing an order reception site 451 that is the shopping site 450. The order reception registered company site 360 and the authentication site 350 are provided with not only an order reception existing system site 361 and a Web server 351, respectively, for enabling their intrinsic functions but also shopping switch link servers 362 and 352, respectively, that cooperate with a money gate 500. In each of the above modes, a system 300a corresponding to the mall operating company 300a shown in FIG. 7 cooperates with the sites and servers.

Inter-site communications will be described below in detail.

There is an assumption that for a user 200 to access the order reception site 451 of the shopping site 450 over the communication network 700 that is the Internet, information for identifying the authentication site 350 where the user 200 is registered as a member is necessary. Therefore, when a request for an order sheet is sent from a user 200 who is accessing the order reception site 451 of the shopping site 450 by inputting information for identifying the authentication site 350 (indicated by symbol (1)), the order reception site 451 sends an order sheet to the user 200 (indicated by symbol (2)). FIG. 31 shows the contents of e-mails of the above processing. As a result, an order picture is provided to the user 200.

The user 200 makes an order on the order picture. At this time, when the user 200 performs collect input or the like, an authentication site information request is sent to the collect server 510 (indicated by symbol (3)). That is, although the authentication site 350 is a site where the user 200 is registered as a member, the number of such sites is not always one; where there are a number of authentication sites 350, there is room for selection by the user 200. Upon reception of the authentication site information request, the collect server 510 provides an authentication site selection picture to the user 200 (indicated by symbol (4)) and gives the user 200 a chance of selecting an arbitrary authentication site 350.

When the user 200 selects a desired authentication site 350 on the authentication site selection picture, an order request is sent to the order reception site 451 (indicated by symbol (5)). The order request contains an authentication registered company customer code that has been specified by the user 200. In response, the order reception site 451 sends an order reception request to the order reception existing system 361 of the order reception registered company site 360 (indicated by symbol (6)). The order reception existing system 361 sends an order registration request to the shopping switch link server 362 of the order reception registered company site 360 (indicated by symbol (7)). Then, the shopping switch link server 362 sends an order registration request to the order management server 520 of the money gate 500 (indicated by symbol (8)). FIG. 31 shows the contents of e-mails of the above processing.

The following processing is performed thereafter. An order registration response is sent from the order management server 520 to the shopping switch link server 362 (indicated by symbol (9)). An order registration response is sent from the shopping switch link server 362 to the order reception existing system 361 (indicated by symbol (10)). A collect re-dialing request (order reception) is sent to the user 200 (indicated by symbol (17)) with intervention of an order reception response from the order reception existing system 361 to the order reception site 451 (indicated by symbol (11)). The collect re-dialing request (order reception) contains a money gate ID. However, this money gate ID is an ID that is generated by the collect server 510 for each transaction, and at this stage the identity of the user 200 is not recognized by the money gate ID.

When the user 200 performs collect re-dialing (order reception), an e-mail concerned is sent to the collect server 510 (indicated by symbol (18)). Upon reception of the e-mail of the collect re-dialing (order reception), the collect server 510 sends back an authentication site re-directing request to the user 200 (indicated by symbol (19)). As shown in FIG. 32, this authentication site re-directing request contains the URL of the authentication registered company that was specified by the user 200 in the above processing (5) Using the URL of the authentication registered company, the user 200 sends a log-on request to the Web server 351 of the authentication site 350 that is the authentication registered company having the URL concerned (indicated by symbol (20)). In response, the Web server 351 of the authentication site 350 provides a log-on picture to the user 200 (indicated by symbol (21)).

Provided with the log-on picture, the user 200 inputs information enabling recognition of his identity such as an authentication user ID and a credit number etc. to the logon picture and sends a log-on request to the Web server 351 of the authentication site 350 (indicated by symbol (22)). As a result, authentication processing is performed in the Web server 351. That is, information of the user 200 that is high in secrecy such as the authentication ID and the credit card number etc. is sent online at this stage for the first time. As described above, if the Web server 351 of the authentication site 350 can search for the credit card number of the user 200 using the authentication ID or the like as a key, it is not necessary to send the credit card number at the time of log-on requesting, which further increases the safety.

After performing the authentication processing, the web server 351 sends an authentication result notice to the shopping switch link server 352 of the authentication site 350 (indicated by symbol (23)). In response, the shopping switch link server 352 of the authentication site 350 sends an authentication result notice to the order management server 520 (indicated by symbol (24)).

Then, the order management server 520 sends an authorization request to the system (e-SCOTT) of the mall operating company 300a(indicated by symbol (25)). In response, the mall-operating company 300a sends an authorization request to a credit card company 600 that is determined for each user 200 and receives an authorization result from the card company 600. The mall-operating company 300a sends back the authorization result to the order management server 520 (indicated by symbol (25)).

Upon reception of the credit card authorization result from the system (e-SCOTT) of the mall-operating company 300a, the order management server 520 sends an authentication result report containing the authorization result to the shopping switch link server 362 that is provided in the order reception registered company site 360 (indicated by symbol (26)). In this manner, the shopping switch link server 362 can recognize whether authorization has been made. Upon reception of the authentication result report containing the authorization result, the shopping switch link server 362 of the order reception registered company site 360 sends an authentication result report containing a result code corresponding to the authorization result to the order management server 520 (indicated by symbol (27)) and informs the order management server 520 whether a sales transaction has been established. In response, the order management server 520 sends an authentication result notification response containing the authorization result and the result code to the shopping switch link server 352 of the authentication site (indicated by symbol (28)). The shopping switch link server 352 sends an authentication result notification response containing the authorization result and the result code to the Web server 351 of the authentication site 350 (indicated by symbol (29)). In this manner, the authentication site 350 can recognize the authorization result and whether a sales transaction has been established.

Then, the Web server 351 of the authentication site 350 sends a collect re-directing request (authentication) to the user 200 (indicated by symbol (30)). In response, collect redirecting (authentication) from the user 200 to the collect server 510 is performed (indicated by symbol (31)). In response, the collect server 510 sends an order reception site re-directing request to the user 200 (indicated by symbol (32)). Re-directing from the user 200 to the order reception site 450 is performed (indicated by symbol (33)).

As a result, an authorization request (symbol (34)) is sent from the order reception site 451 of the shopping site 450 to the order reception existing system 361 of the order reception registered company 360. An authorization result request (API; symbol (35)), an authorization result response (API; symbol (36)), and an authorization request (API; symbol (40)) are communicated between the order reception existing system 361 of the order reception registered company 360 and the shopping switch link server 362. An authorization request (symbol (41)) and an authorization response (symbol (42)) are communicated between the order management server 520 and the shopping switch link server 362 that has received the authorization request (API) The shopping switch link server 362 of the order reception registered company site 360 that has received the authorization response sends an authorization response (API) to the order reception existing system 361. The order reception existing system 361 sends an authorization response (API) to the order reception server 451 of the shopping site 450. The order reception site 451 provides a completion picture to the user 200 (indicated by symbol (45)).

With the above series of pieces of processing, even a user 200 who is not registered as a member of the shopping site 450 can do on-line shopping there if he is registered in the authentication site 350.

3) Inter-site Communication in a Case Where a Registered Company Site and a Selling Site are the Same in the Shopping Switch Reception Service Use Mode First, as shown in FIG. 29, an actual system is such that a shopping site (first site, selling site) 450 and an authentication site (second site) 350, each of which is a mall-operating company 300 or an on-line shop 400, are provided with not only an order reception site 451 and a Web server 351, respectively, for enabling their intrinsic functions but also shopping switch link servers 452 and 352, respectively, that cooperate with a money gate 500. The shopping site 450 is also provided with a shopping switch reception server 453, which is a server to become an ordering destination of a user 200. Being provided with the shopping switch reception server 453, the shopping site 450 can minimize the influence on order processing in the existing order reception site 451 even in a case where the shopping site 450 is incorporated in the system of the money gate 500. In each of the above modes, a system 300a corresponding to the mall-operating company 300a shown in FIG. 7 cooperates with the sites and servers.

Inter-site communications will be described below in detail.

There is an assumption that for a user 200 to access the order reception site 451 of the shopping site 450 over the communication network 700 that is the Internet, information for identifying the authentication site 350 where the user 200 is registered as a member is necessary. Therefore, when a request for an order sheet is sent from a user 200 who is accessing the order reception site 451 of the shopping site 450 by inputting information for identifying the authentication site 350 (indicated by symbol (1), the order reception site 451 sends an order sheet to the user 200 (indicated by symbol (2)). FIG. 31 shows the contents of e-mails of the above processing. As a result, an order picture is provided to the user 200.

The user 200 makes an order on the order picture. At this time, when the user 200 performs collect input or the like, an authentication site information request is sent to the collect server 510 (indicated by symbol (3)). That is, although the authentication site 350 is a site where the user 200 is registered as a member, the number of such sites is not always one; where there are a number of authentication sites 350, there is room for selection by the user 200. Upon reception of the authentication site information request, the collect server 510 provides an authentication site selection picture to the user 200 (indicated by symbol (4)) and gives the user 200 a chance of selecting an arbitrary authentication site 350.

When the user 200 selects a desired authentication site 350 on the authentication site selection picture, an order request is sent to the shopping switch reception server 453 (indicated by symbol (5)). The order request contains an authentication registered company customer code that has been specified by the user 200. In response, in the shopping site 450, an order registration request is sent to the shopping switch link server 452 (indicated by symbol (7)). Then, the shopping switch link server 452 sends an order registration request to the order management server 520 of the money gate 500 (indicated by symbol (8)). FIG. 31 shows the contents of e-mails of the above processing.

The following processing is performed thereafter. An order registration response is sent from the order management server 520 to the shopping switch link server 452 (indicated by symbol (9)). An order registration response is sent from the shopping switch link server 452 to the order reception site 451 (indicated by symbol (10)). A collect re-dialing request (order reception) is sent from the order reception site 451 to the user 200 (indicated by symbol (17)). The collect re-dialing request (order reception) contains a money gate ID. However, this money gate ID is an ID that is generated by the collect server 510 for each transaction, and at this stage the identity of the user 200 is not recognized by the money gate ID.

When the user 200 performs collect re-dialing (order reception), an e-mail concerned is sent to the collect server 510 (indicated by symbol (18)). Upon reception of the e-mail of the collect re-dialing (order reception), the collect server 510 sends back an authentication site re-directing request to the user 200 (indicated by symbol (19)). As shown in FIG. 32, this authentication site re-directing request contains the URL of the authentication registered company that was specified by the user 200 in the above processing (5). Using the URL of the authentication registered company, the user 200 sends a log-on request to the Web server 351 of the authentication site 350 that is the authentication registered company having the URL concerned (indicated by symbol (20)). In response, the Web server 351 of the authentication site 350 provides a log-on picture to the user 200 (indicated by symbol (21)).

Provided with the log-on picture, the user 200 inputs information enabling recognition of his identity such as an authentication user ID and a credit number etc. to the logon picture and sends a log-on request to the Web server 351 of the authentication site 350 (indicated by symbol (22)). As a result, authentication processing is performed in the Web server 351. That is, information of the user 200 that is high in secrecy such as the authentication ID and the credit card number etc. is sent online at this stage for the first time. As described above, if the Web server 351 of the authentication site 350 can search for the credit card number of the user 200 using the authentication ID or the like as a key, it is not necessary to send the credit card number at the time of log-on requesting, which further increases the safety.

After performing the authentication processing, the Web server 351 sends an authentication result notice to the shopping switch link server 352 of the authentication site 350 (indicated by symbol (23)). In response, the shopping switch link server 352 of the authentication site 350 sends an authentication result notice to the order management server 520 (indicated by symbol (24)).

Then, the order management server 520 sends an authorization request to the system (e-SCOTT) of the mall operating company 300a (indicated by symbol (25)). In response, the mall-operating company 300a sends an authorization request to a credit card company 600 that is determined for each user 200 and receives an authorization result from the card company 600. The mall-operating company 300a sends back the authorization result to the order management server 520 (indicated by symbol (25)).

Upon reception of the credit card authorization result from the system (e-SCOTT) of the mall-operating company 300a, the order management server 520 sends an authentication result report containing the authorization result to the shopping switch link server 452 that is provided in the shopping site 450 (indicated by symbol (26)). In this manner, the shopping switch link server 452 can recognize whether authorization has been made. Upon reception of the authentication result report containing the authorization result, the shopping switch link server 452 of the shopping site 450 sends an authentication result report containing a result code corresponding to the authorization result to the order management server 520 (indicated by symbol (27)) and informs the order management server 520 whether a sales transaction has been established. In response, the order management server 520 sends an authentication result notification response containing the authorization result and the result code to the shopping switch link server 352 of the authentication site 350 (indicated by symbol (28)). The shopping switch link server 352 sends an authentication result notification response containing the authorization result and the result code to the Web server 351 of the authentication site 350 (indicated by symbol (29)). In this manner, the authentication site 350 can recognize the authorization result and whether a sales transaction has been established.

Then, the Web server 351 of the authentication site 350 sends a collect re-directing request (authentication) to the user 200 (indicated by symbol (30)). In response, collect redirecting (authentication) from the user 200 to the collect server 510 is performed (indicated by symbol (31)). In response, the collect server 510 sends an order reception site re-directing request to the user 200 (indicated by symbol (32)). Redirecting from the user 200 to the shopping switch reception server 453 is performed (indicated by symbol (33)).

As a result, in the shopping site 450, an authorization result request (API; symbol (35)) and an authorization result response (API; symbol (36)) are communicated between the shopping switch reception server 453 and the shopping switch link server 452. Upon reception of the authorization result response (API), the shopping switch reception server 453 sends an existing CGI re-directing request to the user 200 (indicated by symbol (37)). In response, the user 200 performs existing CGI re-directing to the order reception site 451 (indicated by symbol (38)). In response, the order reception site 451 sends an authorization request (API) to the shopping switch link server 452 of the shopping site 450 (indicated by symbol (40)). An authorization request (symbol (41)) and an authorization response (symbol (42)) are communicated between the order management server 520 and the shopping switch link server 452 that has received the authorization request (API). The shopping switch link server 452 of the shopping site 450 that has received the authorization response sends an authorization response (API) to the order reception site 451. The order reception site 451 provides a completion picture to the user 200 (indicated by symbol (45)).

With the above series of pieces of processing, even a user 200 who is not registered as a member of the shopping site 450 can do on-line shopping there if he is registered in the authentication site 350.

By virtue of the provision of the shopping switch reception server 453 that performs the pieces of processing (7), (10), (36), and (36), the load of the order reception site 451 is made lighter so much than in the case of FIG. 27 that is a subject of comparison. Therefore, the influence on order processing in the existing order reception site 451 can be minimized even in a case where the shopping site 450 is incorporated in the system of the money gate 500.

4) Inter-site Communication in a Case Where a Registered Company Site and a Selling Site are Different from Each Other in the Shopping Switch Reception Service Use Mode First, as shown in FIG. 30, an actual system is such that in addition to a shopping site (first site, selling site) 450 that is a mall-operating company 300 or an on-line shop 400, an order reception registered company site (first site) 360 and an authentication site (second site) 350 are provided. The order reception registered company site 360 serves as an on-line shop managing part for managing an order reception site 451 that is the shopping site 450. The order reception registered company site 360 and the authentication site 350 are provided with not only an order reception existing system site 361 and a Web server 351, respectively, for enabling their intrinsic functions but also shopping switch link servers 362 and 352, respectively, that cooperate with a money gate 500. In each of the above modes, a system 300a corresponding to the mall-operating company 300a shown in FIG. 7 cooperates with the sites and servers.

Inter-site communications will be described below in detail.

There is an assumption that for a user 200 to access the order reception site 451 of the shopping site 450 over the communication network 700 that is the Internet, information for identifying the authentication site 350 where the user 200 is registered as a member is necessary. Therefore, when a request for an order sheet is sent from a user 200 who is accessing the order reception site 451 of the shopping site 450 by inputting information for identifying the authentication site 350 (indicated by symbol (1)), the order reception site 451 sends an order sheet to the user 200 (indicated by symbol (2)). FIG. 31 shows the contents of e-mails of the above processing. As a result, an order picture is provided to the user 200.

The user 200 makes an order on the order picture. At this time, when the user 200 performs collect input or the like, an authentication site information request is sent to the collect server 510 (indicated by symbol (3)). That is, although the authentication site 350 is a site where the user 200 is registered as a member, the number of such sites is not always one; where there are a number of authentication sites 350, there is room for selection by the user 200. Upon reception of the authentication site information request, the collect server 510 provides an authentication site selection picture to the user 200 (indicated by symbol (4)) and gives the user 200 a chance of selecting an arbitrary authentication site 350.

When the user 200 selects a desired authentication site 350 on the authentication site selection picture, an order request is sent to the order reception site 451 (indicated by symbol (5)). The order request contains an authentication registered company customer code that has been specified by the user 200. In response, the order reception site 451 sends an order reception request to the order reception existing system 361 of the order reception registered company site 360 (indicated by symbol (6)). The order reception existing system 361 sends an order registration request to the shopping switch link server 362 of the order reception registered company site 360 (indicated by symbol (7)). Then, the shopping switch link server 362 sends an order registration request to the order management server 520 of the money gate 500 (indicated by symbol (8)). FIG. 31 shows the contents of e-mails of the above processing.

The following processing is performed thereafter. An order registration response is sent from the order management server 520 to the shopping switch link server 362 of the order reception registered company site 360 (indicated by symbol (9)). An order registration response is sent from the shopping switch link server 362 to the order reception existing system 361 (indicated by symbol (10)). An order reception report picture is provided to the user 200 (indicated by symbol (12)) with intervention of an order reception response from the order reception existing system 361 to the order reception site 451 of the shopping site 450 (indicated by symbol (11)). Immediately thereafter, a confirmation mail is sent from the order reception existing system 361 of the order reception registered company site 360 to the user 200 (indicated by symbol (13)). Checking the confirmation mail, the user 200 sends an order confirmation sheet request to the order reception existing system 361 (indicated by symbol (14)). In response, the order reception existing system 361 provides an order confirmation picture to the user 200 (indicated by symbol (15)). Checking the order confirmation picture, the user 200 sends an order confirmation request to the order reception existing system 361 (indicated by symbol (16)). In response, the order reception existing system 361 sends a collect re-dialing request (order reception) to the user 200 (indicated by symbol (17)). The collect re-dialing request (order reception) contains a money gate ID. However, this money gate ID is an ID that is generated by the collect server 510 for each transaction, and at this stage the identity of the user 200 is not recognized by the money gate ID.

When the user 200 performs collect re-dialing (order reception), an e-mail concerned is sent to the collect server 510 (indicated by symbol (18)). Upon reception of the e-mail of the collect re-dialing (order reception), the collect server 510 sends back an authentication site re-directing request to the user 200 (indicated by symbol (19)). As shown in FIG. 32, this authentication site re-directing request contains the URL of the authentication registered company that was specified by the user 200 in the above processing (5). Using the URL of the authentication registered company, the user 200 sends a log-on request to the Web server 351 of the authentication site 350 that is the authentication registered company having the URL concerned (indicated by symbol (20)). In response, the Web server 351 of the authentication site 350 provides a log-on picture to the user 200 (indicated by symbol (21)).

Provided with the log-on picture, the user 200 inputs information enabling recognition of his identity such as an authentication user ID and a credit number etc. to the logon picture and sends a log-on request to the Web server 351 of the authentication site 350 (indicated by symbol (22)). As a result, authentication processing is performed in the Web server 351. That is, information of the user 200 that is high in secrecy such as the authentication ID and the credit card number etc. is sent online at this stage for the first time. As described above, if the Web server 351 of the authentication site 350 can search for the credit card number of the user 200 using the authentication ID or the like as a key, it is not necessary to send the credit card number at the time of log-on requesting, which further increases the safety.

After performing the authentication processing, the web server 351 sends an authentication result notice to the shopping switch link server 352 of the authentication site 350 (indicated by symbol (23)). In response, the shopping switch link server 352 of the authentication site 350 sends an authentication result notice to the order management server 520 (indicated by symbol (24)).

Then, the order management server 520 sends an authorization request to the system (e-SCOTT) of the mall operating company 300a(indicated by symbol (25)). In response, the mall-operating company 300a sends an authorization request to a credit card company 600 that is determined for each user 200 and receives an authorization result from the card company 600. The mall-operating company 300a sends back the authorization result to the order management server 520 (indicated by symbol (25)).

Upon reception of the credit card authorization result from the system (e-SCOTT) of the mall-operating company 300a, the order management server 520 sends an authentication result report containing the authorization result to the shopping switch link server 362 that is provided in the order reception registered company site 360 (indicated by symbol (26)). In this manner, the shopping switch link server 362 can recognize whether authorization has been made. Upon reception of the authentication result report containing the authorization result, the shopping switch link server 362 of the order reception registered company site 360 sends an authentication result report containing a result code corresponding to the authorization result to the order management server 520 (indicated by symbol (27)) and informs the order management server 520 whether a sales transaction has been established. In response, the order management server 520 sends an authentication result notification response containing the authorization result and the result code to the shopping switch link server 352 of the authentication site (indicated by symbol (28)). The shopping switch link server 352 sends an authentication result notification response containing the authorization result and the result code to the web server 351 of the authentication site 350 (indicated by symbol (29)). In this manner, the authentication site 350 can recognize the authorization result and whether a sales transaction has been established.

Then, the Web server 351 of the authentication site 350 sends a collect re-directing request (authentication) to the user 200 (indicated by symbol (30)). In response, collect redirecting (authentication) from the user 200 to the collect server 510 is performed (indicated by symbol (31)). In response, the collect server 510 sends an order reception site re-directing request to the user 200 (indicated by symbol (32)). Re-directing from the user 200 to the order reception existing system 361 of the order reception registered company site 360 is performed (indicated by symbol (33)).

As a result, in the order reception registered company site 360, an authorization result request (API; symbol (35)), an authorization result response (API; symbol (36)), and an authorization request (API; symbol (40)) are communicated between the order reception existing system 361 and the shopping switch link server 362. An authorization request (symbol (41)) and an authorization response (symbol (42)) are communicated between the order management server 520 and the shopping switch link server 362 that has received the authorization request (API) The shopping switch link server 362 of the order reception registered company site 360 that has received the authorization response sends an authorization response (API) to the order reception existing system 361. The order reception existing system 361 sends an authorization response (API) to the order reception server 451 of the shopping site 450. The order reception site 451 provides a completion picture to the user 200 (indicated by symbol (45)).

With the above series of pieces of processing, even a user 200 who is not registered as a member of the shopping site 450 can do on-line shopping there if he is registered in the authentication site 350.

The number of pieces of data exchange processing performed between the user 200 and the order reception existing system 361 of the order reception registered company site 360 is larger than in the case of FIG. 28 that is a subject of comparison (e.g., the pieces of processing (13)–(16) and (33)). These pieces of processing are ones that are performed as ordinary processing by the order reception existing system 361 of the order reception registered company site 360 even in a case where the order reception registered company site 360 is not incorporated in the system of the money gate 500. In this sense, the influence on order processing in the order reception existing system 361 of an existing order reception registered company site 360 can be minimized even if the order reception registered company site 360 is incorporated in the system of the money gate 500.

(4) Summary

As described above, in the on-line shopping system according to the preferred embodiment, a user who is a member of one mall or shop having a membership system can buy a commodity even in another mall or shop where he is not registered without the need for performing no new registration processing etc. Therefore, increase in the number of malls and shops where a user needs to be registered as a member can be prevented and the possibility of leakage of secret information relating to settlement can be reduced without increasing the number of IDs and passwords to be managed by the user. The necessary procedure in the embodiment is as easy as in a case where the user does shopping in the mall or shop where he is registered. Therefore, the convenience of the user is much increased. As a result, the environment of on-line shopping systems is improved and it is expected that the number of users of on-line-shopping systems will increase and transactions will occur more actively.

Information that makes it possible to actually identify and authenticate a user, such as a true user ID, password, or a credit card number, is not passed to mall-operating companies, on-line shops, etc. where he is not registered as a member; rather, a dummy user ID and credit card number are passed to those parties. This also reduces the possibility of leakage of secret information relating to settlement.

Each mall-operating company can provide the registered members with an added value that they can do shopping in various malls and shops using their IDs registered in the mall-operating company. This enables collection of more members.

Each mall-operating company can obtain commissions when its members do shopping in other malls; new commissions of customer introduction fees are expected.

Further, since users who are not a member of each mall-operating company will also visit the shops of its mall, increase in sales is expected in each of those shops.

The present invention is not limited to the above embodiment, however, and various modifications are possible.

For example, in each processing described above, the manner of entering a mall or a shop other than the mall or shop where a user is registered, the form of shopping done there, the method of receiving an order there, the order confirmation method, the order data managing method, the authorization method, procedure, and timing, the shipment method, the sales data collecting method, the profit distribution ratios, the profit distribution method, etc. may be arbitrary ones selected from various manners, forms, and methods.

In the above embodiment, order information in a shop is correlated with such information as a credit number of a mall-operating company where a user is registered by using an order number. Instead, they may be correlated with each other by using an IP address or a cookie function.

The network to be used for constituting the on-line shopping system 100 is not limited to the Internet and may be an arbitrary network system.

In the above embodiment, each mall-operating company manages on-line shops. Rather than a mall-operating company, an Internet service provider (ISP) may manage on-line shops if users are registered there as members and data necessary for settlement are passed to it.

In addition, the settlement method is not limited to the credit settlement using a credit card. For example, other various settlement methods such as digital cash, J-Debit, and e-wallet that match various electronic settlement methods may be employed. In this case, information necessary for settlement is information necessary for such electronic settlement.

As described above, the present invention can provide a settlement intermediation processing apparatus that realizes a settlement system in which the necessary procedure is easy and the number of IDs and passwords to be managed does not increase even in commerce of a number of systems and hence the possibility of leakage of secret information relating to settlement is remote.

The present invention can provide an on-line shop apparatus for providing an on-line shopping system in which a user can use, by following a simple procedure, shops and malls other than the on-line shop or mall where he is registered, whereby the number of IDs and passwords to be managed does not increase and hence the possibility of leakage of secret information relating to settlement is remote.

Further, the invention can provide such an on-line shopping method and system.

Indeed, although the present invention has been described with reference to specific embodiments, those of skill in the art will recognize that changes may be made thereto without departing from the spirit and scope of the invention as set forth in the hereafter appended claims.

We claim as our invention:

1. A settlement intermediation processing apparatus comprising:

an order information receiving part for receiving, order information configured to perform a sale of a commodity over a network, the sale being accompanied by payment of a price in response to a request sent from a user over the network, the order information relating to the request sent from the user;

a payment information acquiring part for acquiring payment information based on the received order information from a second apparatus with which the user has a contract relating to payment of money, the payment information being necessary for receiving payment from the user of the price of a act requested by the user; and a settlement processing part for performing settlement of the price of the act requested by the user based on the received order information and the acquired payment information wherein:

the order information receiving part receives order information relating to an order for the commodity from a first apparatus which performs sale of the commodity over the network;

the payment information acquiring part acquires payment information necessary for receiving, from a user, payment of a price of the commodity ordered by the user from the second apparatus based on the received order information; the settlement processing part performs settlement of the price of the commodity bought by the user based on the received order information and the acquired payment information;

each of the first apparatus and second apparatus is one of a number of commodity selling parts for which users made registration including a contract relating to payment of money, and that permit at least the registered users to access themselves over the network and sell the commodity when accessed;

the order information receiving part receives, from one of the number of commodity selling parts, order information relating to an order for the commodity from a user who is registered in at least a commodity selling part other than the one commodity selling part;

the payment information acquiring part acquires payment information necessary for receiving, from the user, payment of a price of the commodity ordered by the user from the commodity selling part where the user is registered based on the received order information; and an access information providing part for storing, for each of the plurality of commodity selling parts, pieces of temporary user information for the other respective commodity selling parts to be used when users who are registered in the other commodity selling parts access the commodity selling part, and providing one of the pieces of temporary user information upon request, thereby enabling access to corresponding commodity selling parts other than the commodity selling parts where the user is registered.

2. A settlement intermediation processing apparatus as claimed in claim 1, further comprising:

a commission payment processing part for performing processing of paying commissions including paying commissions to the second apparatus and the settlement intermediation processing apparatus based on the price of the commodity for which the settlement is performed.

3. A settlement intermediation processing apparatus as claimed in claim 1, wherein each of the number of commodity selling parts comprises:

a plurality of on-line shop parts for selling a commodity when accessed over the network; and an on-line shop managing part for registering users and for controlling access to the number of on-line shop parts over the network; and the commission payment processing part also pays a commission to the on-line shop managing part.

4. A settlement intermediation processing apparatus as claimed in claim 1, wherein the access information providing part stores and provides, for each of the number of commodity selling parts, pieces of information for the other respective commodity selling parts to be used by the users who are registered in the other respective commodity selling parts, each of the pieces of information including a temporary user ID, a temporary password, and a temporary payment information.

5. A settlement intermediation processing apparatus as claimed in claim 1, wherein:
  the payment information acquiring part acquires payment information including a credit card number that is necessary for settlement, using a credit card of the user, of the price of the commodity ordered by the user from the second apparatus based on the received order information; and
  the settlement processing part is paid, by a credit card company that issued the credit card of the user, an amount of money corresponding to the price of the commodity bought by the user based on the received order information and the acquired payment information.

6. A settlement intermediation processing apparatus as claimed in claim 1, wherein the payment information acquiring part correlates the received order information with the acquired payment information based on an order number included in the received order information and an order number included in the acquired payment information.

7. A settlement intermediation processing apparatus as claimed in claim 1, further comprising:
  a payment method input displaying part for providing the first apparatus with a payment method selection picture that enables an input for selection of a payment method; and
  a settlement intermediation executing part for causing the order information receiving part, the payment information acquiring part, and the settlement processing part to perform their functions only when an input that selects settlement by the settlement intermediation executing part is made through the payment method input displaying part.

8. A settlement intermediation processing apparatus as claimed in claim 1, further comprising:
  a list displaying part for causing an apparatus of a user who is making access over the network to display, in a selectable manner, a list of part of the number of commodity selling parts with which the settlement processing part can perform settlement processing; and
  an automatic access part for causing the selected commodity selling parts to access the apparatus of the user.

9. A settlement intermediation processing apparatus as claimed in claim 1, further comprising:
  a search keyword storing part for storing search keywords in such a manner that one or more search keywords are correlated with each of the commodities sold by the number of commodity selling parts with which the settlement processing part can perform settlement processing;
  a search keyword inputting part for causing an apparatus of a user who is making access over the network to display a dialog box for input of a search keyword; and
  a second automatic access part for retrieving, based on a search keyword that is input through the search keyword inputting part, a name of a corresponding commodity selling part from the search keyword storing part, and for making the apparatus of the user accessible to the commodity selling part thus found.

10. A settlement intermediation processing apparatus comprising:
  an order information receiving part for receiving order information relating to a request for an act, from a first apparatus that performs the act, that is accompanied by payment of a price in response to the request that is sent from a user over a network;
  a payment information acquiring part for acquiring, based on the received order information, from a second apparatus with which the user has a contract relating to payment of money by a prescribed method, payment information that is necessary for receiving, from the user, payment of the price of the act requested by the user; and
  a settlement processing part for performing settlement of the price of the act requested by the user based on the received order information and the acquired payment information;
  the act is a sale of a commodity over the network;
  the order information receiving part receives order information relating to an order for a commodity from the first apparatus which performs sale of commodity over the network;
  the payment information acquiring part acquires payment information necessary for receiving, from a user, payment of a price of the commodity ordered by the user from the second apparatus based on the received order information;
  the settlement processing part performs settlement of the price of the commodity bought by the user based on the received order information and the acquired payment information;
  each of the first apparatus and second apparatus is one of a number of commodity selling part for which users made registration including a contract relating to payment of money by a prescribed method, and that permit at least the registered users to access themselves over the network and sell commodity when accessed;
  the order information receiving part receives, from one of the number of commodity selling parts, order information relating to an order for a commodity from a user who is registered in at least commodity selling part other than the one commodity selling part;
  the payment information acquiring part acquires payment information necessary for receiving, from the user, payment of a price of the commodity ordered by the user from the commodity selling part where the user is registered based on the received order information; and
  an access information providing parts for storing, for each of the number of commodity selling parts, pieces of temporary user information for the other respective commodity selling parts that are different from actual ones and to be used when users who are registered in the other commodity selling parts access the each commodity selling part, and providing one of the pieces of temporary user information different from an actual one upon request, thereby enabling access to corresponding commodity selling parts other than the commodity selling part where a user is registered.

11. A settlement intermediation processing apparatus as claimed in claim 10, wherein the access information providing part stores and provides, for each of the number of commodity selling parts, pieces of information for the other respective commodity selling parts to be used by the users who are registered in the other respective commodity selling parts, each of the pieces of information including a temporary user ID that is different from an actual one.

12. A settlement intermediation processing apparatus comprising:
  an order information receiving part for receiving order information relating to a request for an act, from a first apparatus that performs the act that is accompanied by payment of a price in response to the request that is sent from a user over a network;

a payment information acquiring part for acquiring, based on the received order information, from a second apparatus with which the user has a contract relating to payment of money by a prescribed method, payment information that is necessary for receiving, from the user, payment of the price of the act requested by the user; and a settlement processing part for performing settlement of the price of the act requested by the user based on the received order information and the acquired payment information;

the act is a sale of a commodity over the network;

the order information receiving part receives order information relating to an order for a commodity from the first apparatus which performs sale of a commodity over the network;

the payment information acquiring part acquires payment information necessary for receiving, from a user, payment of a price of the commodity ordered by the user from the second apparatus based on the received order information;

the settlement processing part performs settlement of the price of the commodity bought by the user based on the received order information and the acquired payment information;

an access information providing part for storing, for the first apparatus and second apparatus, pieces of temporary user information for respective second apparatus that are different from actual ones and enable the user who is registered in the second apparatus to access said first apparatus, and for enabling access to a corresponding first apparatus when the pieces of temporary user information that are different from the actual ones are input by the user;

wherein the first apparatus and the second apparatus are one of an on-line shop part for selling a commodity when accessed over the network and an on-line shop managing part for controlling access to the on-line shop part over the network.

13. A settlement intermediation processing apparatus as claimed in claim 12, further comprising:

a commission payment processing part for performing processing of paying commissions to operating parties involved in a sale of the commodity that include an operating party of the second apparatus and an operating party of the settlement intermediation processing apparatus.

14. A settlement intermediation processing apparatus as claimed in claim 13, wherein the commission payment processing part allots, to the commissions, part of a price of the commodity for which settlement is performed.

15. A settlement intermediation processing apparatus as claimed in claim 12, wherein each of the pieces of temporary user information includes a temporary user ID for the settlement intermediation processing apparatus.

16. A settlement intermediation processing apparatus as claimed in claim 12, wherein:

the payment information acquiring part acquires payment information including a credit card number that is necessary for settlement of payment, using a credit card of the user, of the price of the commodity ordered by the user from the second apparatus based on the received order information; and the settlement processing part performs processing for receiving payment, by a credit card company that issued the credit card of the user, of an amount of money corresponding to the price of the commodity bought by the user based on the received order information and the acquired payment information.

17. A settlement intermediation processing apparatus as claimed in claim 12, wherein the payment information acquiring part correlates the received order information with the acquired payment information based on an order number included in the received order information and an order number included in the acquired payment information.

18. A settlement intermediation processing apparatus as claimed in claim 12, further comprising:

a payment method input displaying part for providing the first apparatus with a payment method selection picture that enables an input for selection of a payment method; and a settlement intermediation executing part for causing the order information receiving part, the payment information acquiring part, and the settlement processing parts to perform their functions only when an input that selects settlement by the settlement intermediation executing part is made through the payment method input displaying part.

19. A settlement intermediation processing apparatus as claimed in claim 12, further comprising:

a list displaying part for causing an apparatus of a user who is making access over the network to display, in a selectable manner, a list of commodity selling parts with which the settlement processing part can perform settlement processing; and an automatic access part for causing the selected commodity selling part to access the apparatus of the user.

20. A settlement intermediation processing apparatus as claimed in claim 12, further comprising:

a search keyword storing part for storing search keywords in such a manner that one or more search keywords are correlated with each of the commodities sold by the commodity selling parts with which the settlement processing part can perform settlement processing;

a search keyword inputting part for causing an apparatus of a user who is making access over the network to display a dialog box for input of a search keyword; and a second automatic access part for retrieving, based on a search keyword that is input through the search keyword inputting part, a name of a corresponding commodity selling part from the search keyword storing part, and for making the apparatus of the user accessible to the commodity selling part thus found.

* * * * *